US011405647B2

(12) United States Patent
Krishnan et al.

(10) Patent No.: US 11,405,647 B2
(45) Date of Patent: Aug. 2, 2022

(54) PRIMARY TRANSFORMS USING 8-BIT AND 10-BIT CORES

(71) Applicant: TENCENT AMERICA LLC, Palo Alto, CA (US)

(72) Inventors: Madhu Peringassery Krishnan, Mountain View, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/077,668

(22) Filed: Oct. 22, 2020

(65) Prior Publication Data

US 2021/0258612 A1 Aug. 19, 2021

Related U.S. Application Data

(60) Provisional application No. 62/978,196, filed on Feb. 18, 2020.

(51) Int. Cl.
*H04N 19/625* (2014.01)
*G06F 17/16* (2006.01)

(52) U.S. Cl.
CPC ........... *H04N 19/625* (2014.11); *G06F 17/16* (2013.01)

(58) Field of Classification Search
CPC .................................................... H04N 19/625
USPC ..................................................... 375/240.18
See application file for complete search history.

(56) References Cited

U.S. PATENT DOCUMENTS

| | | | | |
|---|---|---|---|---|
| 2011/0153699 | A1 | 6/2011 | Reznik et al. | |
| 2012/0057630 | A1 | 3/2012 | Saxena et al. | |
| 2018/0020218 | A1 | 1/2018 | Zhao et al. | |
| 2018/0213233 | A1* | 7/2018 | Koo | H04N 19/91 |
| 2018/0220157 | A1* | 8/2018 | Koo | H04N 19/60 |
| 2018/0367796 | A1 | 12/2018 | Hendry et al. | |
| 2019/0342579 | A1 | 11/2019 | Zhao et al. | |
| 2019/0349602 | A1* | 11/2019 | Li | H04N 19/60 |
| 2020/0007892 | A1* | 1/2020 | Zhao | H04N 19/159 |

OTHER PUBLICATIONS

D. Roy et al., “Graph-Based Transform with Weighted Self-loops for Predictive Transform Coding based on Template Matching”, 2019 Data Compression Conference (DCC), 2019, pp. 329-338, [retrieved from internet < URL: https://ieeexplore.ieee.org/document/8712761 ] doi: 10.1109/DCC.2019.00041. (10 pages).

(Continued)

*Primary Examiner* — Yulin Sun
(74) *Attorney, Agent, or Firm* — Sughrue Mion, PLLC

(57) ABSTRACT

A method, computer program, and computer system is provided for coding video data. Video data is received. One or more transform cores corresponding to a transform associated with the video data are identified. The one or more transform cores include one or more of a line graph transform (LGT) and a discrete cosine transform (DCT) The video data is decoded based on the identified transform core. The transform cores correspond to one or more from among an 8-bit transform core and a 10-bit transform core. The transform corresponds to one or more from among a 2-point transform, a 4-point transform, an 8-point transform, a 16-point transform, a 32-point transform, and a 64-point transform.

14 Claims, 6 Drawing Sheets

(56) References Cited

OTHER PUBLICATIONS

International Search Report dated Apr. 15, 2021, issued by the International Searching Authority in application No. PCT/US2021/016348.
Written Opinion dated Apr. 15, 2021, issued by the International Searching Authority in application No. PCT/US2021/016348.
Extended European Search Report dated Apr. 21, 2022 in European Application No. 21756824.5.
Keng-Shih Lu et al., "Symmetric Line Draph Transforms for Inter Predictive Video Coding", 2016 Picture Coding Symposium (PCS), IEEE, Dec. 4, 2016, pp. 1-5 (5 pages total).
Xin Zhao et al., "CE6-related: On 8-bit primary transform core", Joint Video Experts Team (JVET) of ITU-T SG 16 WP 3 and ISO/IEC JTC 1/SC 29/WG 11, JVET-K0290-v1 (4 pages total).

* cited by examiner

200

300

PRIMARY TRANSFORMS USING 8-BIT AND 10-BIT CORES

CROSS-REFERENCE TO RELATED APPLICATION

This application claims priority based on U.S. Provisional Application No. 62/978,196 (filed Feb. 18, 2020), the entirety of which is incorporated herein.

FIELD

This disclosure relates generally to field of data processing, and more particularly to video encoding and decoding.

BACKGROUND

AOMedia Video 1 (AV1) was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec. AOMedia Video 2 (AV2) is currently under development.

SUMMARY

Embodiments relate to a method, system, and computer readable medium for video coding. According to one aspect, a method for coding is provided. The method may include receiving video data. One or more transform cores corresponding to a transform associated with the video data are identified. The one or more transform cores include one or more of a line graph transform (LGT) and a discrete cosine transform (DCT). The video data is encoded and/or decoded based on the identified transform core. The transform cores correspond to one or more from among an 8-bit transform core and a 10-bit transform core. The transform corresponds to one or more from among a 2-point transform, a 4-point transform, an 8-point transform, a 16-point transform, a 32-point transform, and a 64-point transform.

According to another aspect, a computer system for coding video data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data. One or more transform cores corresponding to a transform associated with the video data are identified. The one or more transform cores include one or more of a line graph transform (LGT) and a discrete cosine transform (DCT). The video data is encoded and/or decoded based on the identified transform core. The transform cores correspond to one or more from among an 8-bit transform core and a 10-bit transform core. The transform corresponds to one or more from among a 2-point transform, a 4-point transform, an 8-point transform, a 16-point transform, a 32-point transform, and a 64-point transform.

According to yet another aspect, a computer readable medium for coding video data is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data. One or more transform cores corresponding to a transform associated with the video data are identified. The one or more transform cores include one or more of a line graph transform (LGT) and a discrete cosine transform (DCT). The video data is encoded and/or decoded based on the identified transform core. The transform cores correspond to one or more from among an 8-bit transform core and a 10-bit transform core. The transform corresponds to one or more from among a 2-point transform, a 4-point transform, an 8-point transform, a 16-point transform, a 32-point transform, and a 64-point transform.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
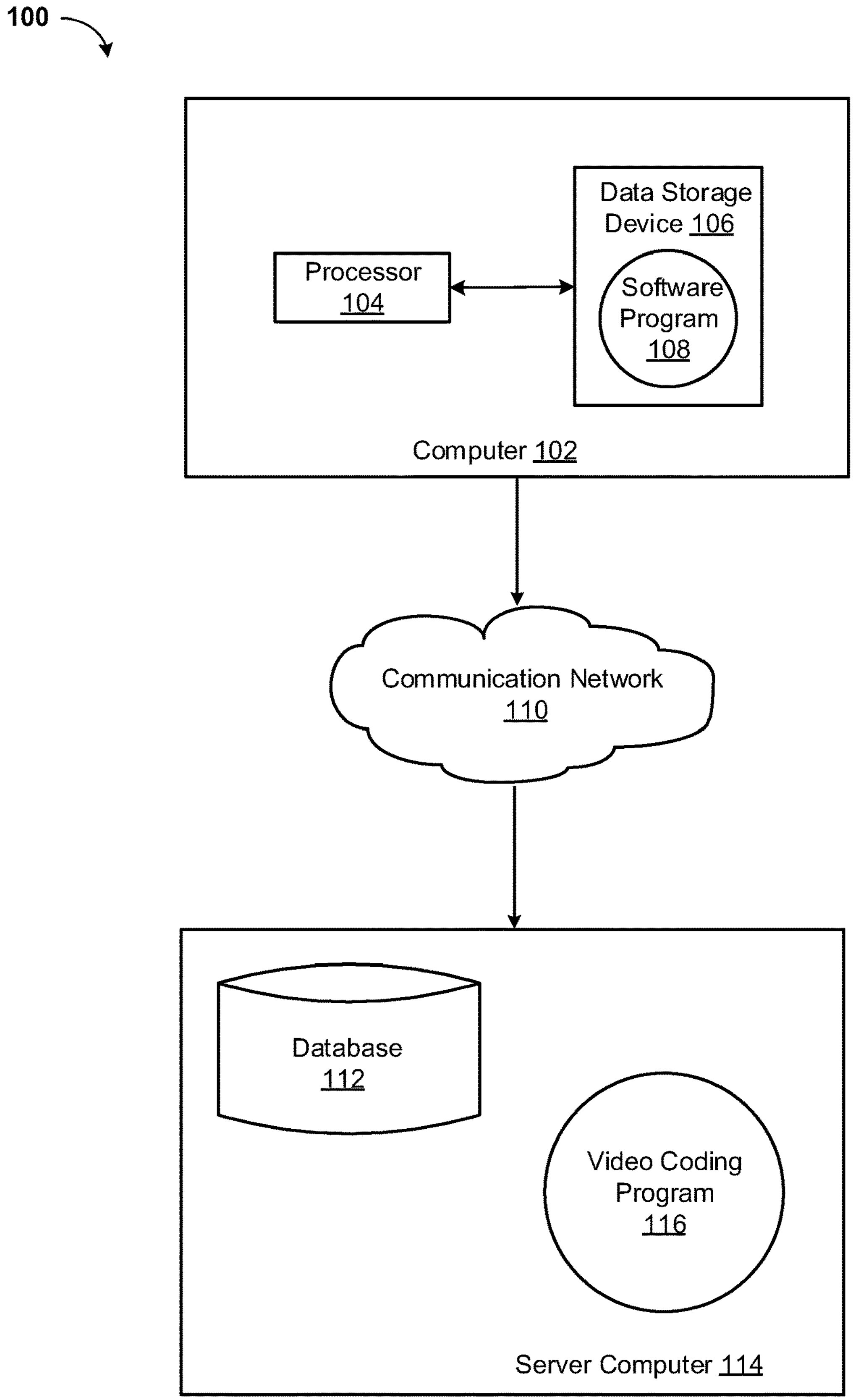
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, code video data based on 8-bit and 10-bit transform cores. Therefore, some embodiments have the capacity to improve the field of computing by allowing for improved encoding, decoding, compression, and decompression of video data.

As previously described, AOMedia Video 1 (AV1) was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec. AOMedia Video 2 (AV2) is currently under development. In AV2, 4-point and 16-point line graph transforms (LGTs) can be represented using 4 and 16 unique integers respectively (as they are DST-4 and DST-7). However, certain for certain transforms, such as an 8-point LGT, there may be no such representation. It may be advantageous, therefore, to extend the range of possible transforms by introducing a complete set of 8-bit & 10-bit 4-point, 8-point, 16-point, 32-point, and 64-point primary transform cores in that are tuned for better coding efficiency and/or accuracy.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Referring now to FIG. 1, a functional block diagram of a networked computer environment illustrating a video coding system 100 (hereinafter "system") for coding video data based on line graph transforms on 8-bit and 10-bit transform cores. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 5 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for video encoding and decoding is enabled to run a Video Coding Program 116 (hereinafter "program") that may interact with a database 112. The Video Coding Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
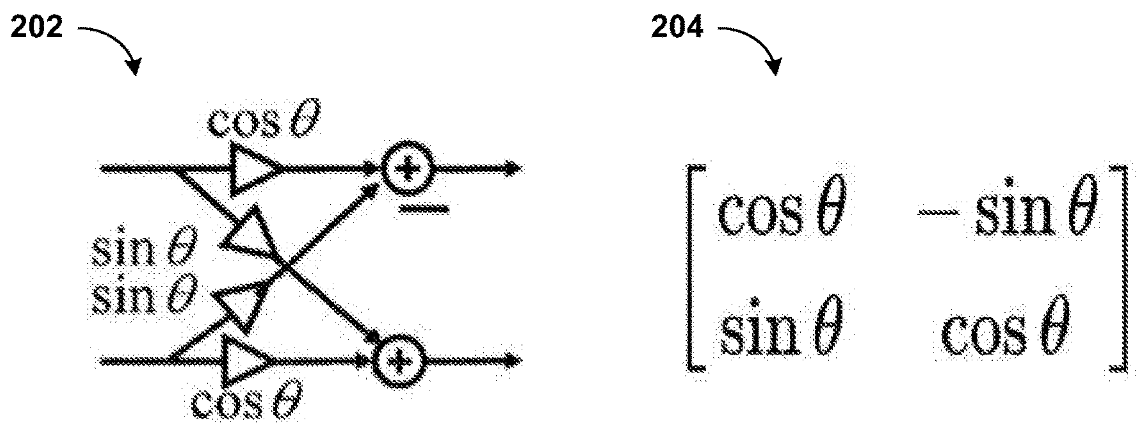
FIG. 2 is an exemplary butterfly and matrix representation of a planar rotation, according to at least one embodiment.

Referring now to FIG. 2, exemplary representations of a planar rotation 200 are depicted. The planar rotation 200 may be represented using a butterfly representation 202 and a matrix representation 204. In AV1, the primary 1D transforms are a) 4-point, 8-point, 16-point, 32-point, and 64-point DCT-2; b) 4-point, 8-point, 16-point asymmetric DST's and their flipped versions; c) 4-point, 8-point, 16-point & 32-point identity transforms. The 2D transform process involves the use of hybrid transforms (different transforms for each dimension of the coded residual block), where the selection of transform to be used for each dimension is based on a rate-distortion (RD) criterion. The DCT-2 (4-point to 64-point), DST-4 (8-point, 16-point) & DST-7 (4-point) transforms show symmetry/anti-symmetry characteristics, thus a so-called "partial butterfly" implementation is supported to reduce the number of operation counts (multiplications, adds/subs, shifts). The partial butterfly implementation involves planar rotations using trigonometric cosine and sine functions at various angles. 12-bit look up tables may be utilized for generating the values of the trigonometric functions.

Figure 3:
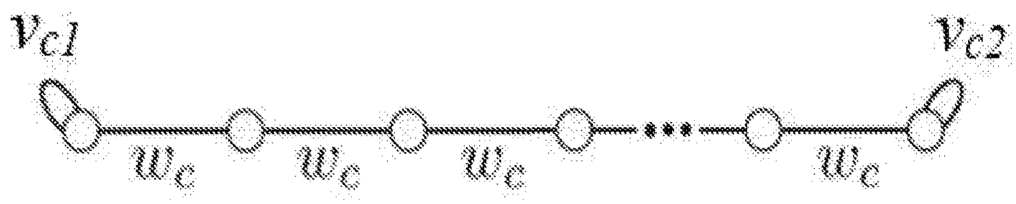
FIG. 3 is an exemplary line graph transform, according to at least one embodiment.

Referring now to FIG. 3, an exemplary line graph transform (LGT) 300 is depicted. Graphs may be generic mathematical structures consisting of sets of vertices and edges, which are used for modelling affinity relations between the objects of interest. In practice, weighted graphs (for which a set of weights are assigned to edges and potentially to vertices) may provide sparse representations for robust modeling of signals/data. LGTs can improve coding efficiency by providing a better adaptation for diverse block statistics. Separable LGTs may be designed and optimized by learning line graphs from data to model underlying row and column-wise statistics of blocks residual signals, where the associated generalized graph Laplacian (GGL) matrices are used to derive LGTs.

For example, given a weighted graph G (W, V) a GGL matrix may be defined as $L_c=D-W+V$, where W may be the adjacency matrix consisting of non-negative edge weights $w_c$, D may be the diagonal degree matrix, and V may be the diagonal matrix denoting weighted self-loops $v_{c1}$, $v_{c2}$. The matrix $L_c$ can be represented as:

$$L_c = \begin{bmatrix} \omega_c + v_{c1} & -\omega_c & & & 0 \\ -\omega_c & 2\omega_c & -\omega_c & & \\ & \ddots & \ddots & \ddots & \\ & & -\omega_c & 2\omega_c & -\omega_c \\ 0 & & & -\omega_c & \omega_c + v_{c2} \end{bmatrix} \text{ for } \omega_c > 0 \quad \text{(Eq. 1)}$$

The LGTs can then be derived by the eigen-decomposition of the GGL $L_c$: $L_c=U\Phi U^T$, where columns of orthogonal matrix U are the basis vectors of the LGT, and Φ is the diagonal eigenvalue matrix. In fact, DCTs and DSTs, including DCT-2, DCT-8 and DST-7, are LGTs derived from certain forms of GGLs. DCT-2 is derived by setting $v_{c1}=0$. DST-7 is derived by setting $v_{c1}=w_c$. DCT-8 is derived by setting $v_{c2}=w_c$. DST-4 is derived by setting $v_{c1}=2w_c$. DCT-4 is derived by setting $v_{c2}=2w_c$.

The LGTs are implemented using matrix multiplications for transform sizes 4, 8 & 16. The 4-point LGT core is derived by setting $v_{c1}=2w_c$ in $L_c$, which means that it is a DST-4. The 8-point LGT core is derived by setting $v_{c1}=1.5w_c$ in $L_c$ & the 16-point LGT core is derived by setting $v_{c1}=w_c$ in $L_c$, which means that it is a DST-7. The 4-point, 8-point and 16-point cores are represented using 10-bit integers (excluding the sign bit). The LGT cores are described below:

4-Point LGT (DST-4):

{a, b, c, d,
b, d, a, −c,
c, a, −d, b,
d, −c, b, −a} where {a, b, c, d}={200, 569, 851, 1004}

8-Point LGT:

{130, 319, 497, 657, 792, 899, 972, 1009, 382, 832, 1012, 865, 438,
−130, −657, −971, 614, 1010, 545, −386, −987, −746, 131, 897, 808, 770,
−459, −978, 15, 985, 432, −790, 945, 190, −1002, 110, 969, −400, −850,
654, 993, −497, −497, 993, −497, −497, 993, −497, 895, −941, 564, 66,
−666, 968, −835, 327, 566, −786, 920, −951, 878, −707, 458, −159}

16-Point LGT (DST-7):

{a, b, c, d, e, f, g, h, i, j, k, l, m, n, o, p,
c, f, i, l, o, o, l, i, f, c, 0, −c, −f, −l, −o,
e, j, o, m, h, c, −b, −g, −l, −p, −k, −f, −a, d, i, n,
g, n, l, e, −b, −p, −j, −c, d, k, o, h, a, −f, −m,
o, f, −c, −l, −l, −c, f, o, i, 0, −o, −f, c, l,
k, k, 0, −k, −k, 0, k, k, 0, −k, −k, 0, k, k, 0, −k,
m, g, −f, −n, −a, l, h, −e, −o, −b, k, i, −d, −p, −c, j,
o, c, −l, −f, i, i, −f, −l, c, o, 0, −o, −c, l, f,
p, −a, −o, b, n, −c, −m, d, l, −e, −k, f, j, −g, h,
n, −e, j, d, −o, a, m, −f, −h, k, c, −p, b, l, −g,
l, −c, o, −f, −f, o, −c, l, 0, −l, i, c, −o, f,
j, −m, c, g, −p, f, d, −n, i, a, −k, l, −b, −h, o, −e,
h, −p, i, −a, −g, o, −j, b, f, −n, k, −c, −e, m, −l, d,
f, −l, o, c, c, o, −l, f, 0, −f, l, −o, i, −c,
d, −h, l, −p, m, e, −a, −c, g, −k, o, −n, j, −f, b,
b, −d, f, −h, j, −l, n, −p, o, −m, k, g, −e, c, −a,} where {a, b, c, d, e, f, g, h, i, j, k, l, m, n, o, p}={96, 191, 284, 375, 462, 545, 623, 696, 762, 821, 873, 917, 953, 980, 998, 1007}.

The 4-point and 16-point LGTs can be represented using 4 and 16 unique integers respectively (as they are DST-4 and DST-7), while the 8-point LGT has no such representation.

A set of 8-bit and 10-bit 4-point, 8-point, 16-point, 32-point & 64-point primary transform cores may be used. These may include:

8-Bit 4-Point DCT-2:

{a, a, a, a}
{b, c, −c, −b}
{a, −a, −a, a}
{c, −b, b, −c} where {a, b, c} can be any element of the set {{91, 118, 49}, {90, 118, 50}, {90, 119, 47}, {91, 118, 50}, {91, 119, 47}}.

8-Bit 8-Point DCT-2:

{a, a, a, a, a, a, a, a}
{d, e, f, g, −g, −f, −e, −d}
{b, c, −c, −b, −b, −c, c, b}
{e, −g, −d, −f, f, d, g, −e}
{a, −a, −a, a, a, −a, −a, a}
{f, −d, g, e, −e, −g, d, −f}
{c, −b, b, −c, −c, b, −b, c}
{g, −f, e, −d, d, −e, f, −g} where {a, b, c, d, e, f, g} can be any element of the set {{91, 118, 49, 126, 106, 71, 25}, {90, 118, 50, 126, 106, 71, 25}, {90, 119, 47, 125, 106, 73, 23},
{90, 119, 47, 126, 106, 71, 25}, {91, 118, 50, 126, 106, 71, 25}, {91, 119, 47, 125, 106, 73, 23},
{91, 119, 47, 126, 106, 71, 25}.

8-Bit 16-Point DCT-2:

{a, a, a, a, a, a, a, a, a, a, a, a, a, a, a, a}
{h, i, j, k, l, m, n, o, −o, −n, −m, −l, −k, −j, −h}
{d, e, f, g, −g, −f, −e, −d, −d, −e, −f, −g, g, f, e, d}
{i, l, o, −m, −j, −h, −k, −n, n, k, h, j, m, −o, −l, −i}
{b, c, −c, −b, −b, −c, c, b, b, c, −c, −b, −b, −c, c, b}
{j, o, −k, −n, l, h, m, −m, −h, −l, n, i, k, −o, −j}
{e, −g, −d, −f, f, d, g, −e, −e, g, d, f, −f, −d, −g, e}
{k, −m, o, h, n, −j, −l, l, j, −n, −h, −o, i, m, −k}
{a, −a, −a, a, a, −a, −a, a, a, −a, −a, a, a, −a, −a, a}
{l, −j, −n, h, −o, m, k, −k, −m, i, o, −h, n, j, −l}
{f, −d, g, e, −e, −g, d, −f, −f, d, −g, −e, e, g, −d, f}
{m, −h, l, n, k, o, −j, j, −o, −k, i, −n, −l, h, −m}
{c, −b, b, −c, −c, b, −b, c, c, −b, b, −c, −c, b, −b, c}
{n, −k, h, −j, m, o, −l, i, −i, l, −o, −m, j, −h, k, −n}
{g, −f, e, −d, d, −e, f, −g, −g, f, −e, d, −d, e, −f, g}
{o, −n, m, −l, k, −j, i, −h, h, j, −k, l, −m, n, −o} where {a, b, c, d, e, f, g, h, i, j, k, l, m, n, o} can be any element of the set
{{91, 119, 47, 126, 106, 71, 25, 127, 122, 113, 99, 81, 60, 37, 13},
{91, 119, 47, 126, 106, 71, 25, 125, 123, 112, 100, 83, 62, 35, 15},
{91, 119, 47, 126, 106, 71, 25, 126, 121, 115, 100, 81, 58, 38, 15},
{91, 119, 47, 126, 106, 71, 25, 126, 121, 115, 100, 82, 58, 38, 15},
{91, 119, 47, 126, 106, 71, 25, 126, 122, 114, 100, 82, 59, 38, 15}
{91, 118, 49, 126, 106, 71, 25, 127, 122, 113, 99, 81, 60, 37, 13}}.

8-Bit 32-Point DCT-2:

{a, a, a, a, a, a, a, a, a, a, a, a, a, a, a, a, a, a, a, a, a, a, a, a, a, a, a, a, a, a, a, a}
{p, q, r, s, t, u, v, w, x, y, z, A, B, C, D, E, −E, −D, −C, −B, −A, −z, −y, −x, −w, −v, −u, −t, −s, −r, −q, −p}
{h, i, j, k, l, m, n, o, −o, −n, −m, −l, −k, −j, −h, −h, −j, −k, −l, −m, −n, −o, o, n, m, l, k, j, i, h}
{q, t, w, z, C, −E, −B, −y, −v, −s, −p, −r, −u, −x, −A, −D, D, A, x, u, r, p, s, v, y, B, E, −C, −z, −w, −t, −q}
{d, e, f, g, −g, −f, −e, −d, −d, −e, −f, −g, g, f, e, d, d, e, f, g, −g, −f, −e, −d, −d, −e, −f, −g, g, f, e, d}
{r, w, B, −D, −y, −t, −p, −u, −z, −E, A, v, q, s, x, C, −C, −x, −s, −q, −v, −A, E, z, u, p, t, y, D, −B, −w, −r}
{i, l, o, −m, −j, −h, −k, −n, n, k, h, j, m, −o, −l, −i, −l, −o, m, j, h, k, n, −n, −k, −h, −j, −m, o, l, i}
{s, z, −D, −w, −p, −v, −C, A, t, r, y, −E, −x, −q, −u, −B, B, u, q, x, E, −y, −r, −t, −A, C, v, p, w, D, −z, −s}
{b, c, −c, −b, −b, −c, c, b, b, c, −c, −b, −b, −c, c, b, b, c, −c, −b, −b, −c, c, b, b, c, −c, −b, −b, −c, c, b}
{t, C, −y, −p, −x, D, u, s, B, −z, −q, −w, E, v, r, A, −A, −r, −v, −E, w, q, z, −B, −s, −u, −D, x, p, y, −C, −t}
{j, o, −k, −n, l, h, m, −m, −h, −l, n, i, k, −o, −j, −j, −o, k, i, n, −l, −h, −m, m, h, l, −n, −k, o, j}
{u, −E, −t, −v, D, s, w, −C, −r, −x, B, q, y, −A, −p, −z, z, p, A, −y, −q, −B, x, r, C, −w, −s, −D, v, t, E, −u}
{e, −g, −d, −f, f, d, g, −e, −e, g, d, f, −f, −d, −g, e, e, −g, −d, −f, f, d, g, −e, −e, g, d, f, −f, −d, −g, e}
{v, −B, −p, −C, u, w, −A, −q, −D, t, x, −z, −r, −E, s, y, −y, −s, E, r, z, −x, −t, D, q, A, −w, −u, C, p, B, −v}
{k, −m, o, h, n, −j, −l, l, j, −n, −h, −o, i, m, −k, −k, m, i, −o, −h, −n, j, l, −l, −j, n, h, o, −m, k}
{w, −y, −u, A, s, −C, −q, E, p, D, −r, −B, t, z, −v, −x, x, v, −z, −t, B, r, −D, −p, −E, q, C, −s, −A, u, y, −w}
{a, −a, −a, a, a, −a, −a, a, a, −a, −a, a, a, −a, −a, a, a, −a, −a, a, a, −a, −a, a, a, −a, −a, a, a, −a, −a, a}
{x, −v, −z, t, B, −r, −D, p, −E, −q, C, s, −A, −u, y, w, −w, −y, u, A, −s, −C, q, E, −p, D, r, −B, −t, z, v, −x}
{l, −j, −n, h, −o, m, k, −k, −m, i, o, −h, n, j, −l, −l, j, n, −h, o, i, −m, −k, k, m, −o, h, −n, −j, l}
{y, −s, −E, r, −z, −x, t, D, −q, A, w, −u, −C, p, −B, −v, v, B, −p, C, u, −w, −A, q, −D, −t, x, z, −r, E, s, −y}
{f, −d, g, e, −e, −g, d, −f, −f, d, −g, −e, e, g, −d, f, f, −d, g, e, −e, −g, d, −f, −f, d, −g, −e, e, g, −d, f}
{z, −p, A, y, −q, B, x, −r, C, w, −s, D, v, −t, E, u, −u, −E, t, −v, −D, s, −w, −C, r, −x, −B, q, −y, −A, p, −z}
{m, −h, l, n, k, o, −j, j, −o, −k, i, −n, −l, h, −m, −m, h, −l, −n, i, −k, −o, j, −j, o, k, n, l, −h, m}
{A, −r, v, −E, −w, q, −z, −B, s, −u, D, x, −p, y, C, −t, t, −C, −y, p, −x, −D, u, −s, B, z, −q, w, E, −v, r, −A}
{c, −b, b, −c, −c, b, −b, c, c, −b, b, −c, −c, b, −b, c, c, −b, b, −c, −c, b, −b, c, c, −b, b, −c, −c, b, −b, c}
{B, −u, q, −x, E, y, −r, t, −A, −C, v, −p, w, −D, −z, s, −s, z, D, −w, p, −v, C, A, −t, r, −y, −E, x, −q, u, −B}
{n, −k, h, −j, m, o, −l, i, −i, l, −o, −m, j, −h, k, −n, −n, k, −h, j, −m, −o, l, −i, i, −l, o, m, −j, h, −k, n}
{C, −x, s, −q, v, −A, −E, z, −u, p, −t, y, −D, −B, w, −r, r, −w, B, D, −y, t, −p, u, −z, E, A, −v, q, −s, x, −C}
{g, −f, e, −d, d, −e, f, −g, −g, f, −e, d, −d, e, −f, g, g, −f, e, −d, d, −e, f, −g, −g, f, −e, d, −d, e, −f, g}
{D, −A, x, −u, r, −p, s, −v, y, −B, E, C, −z, w, −t, q, −q, t, −w, z, −C, −E, B, −y, v, −s, p, −r, u, −x, A, −D}
{o, −n, m, −l, k, −j, i, −h, h, j, −k, l, −m, n, −o, −o, n, −m, l, −k, j, h, −h, i, −j, k, −l, m, −n, o}
{E, −D, C, −B, A, −z, y, −x, w, −v, u, −t, s, −r, q, −p, p, −q, r, −s, t, −u, v, −w, x, −y, z, −A, B, −C, D, −E} where {a, b, c, d, e, f, g, h, i, j, k, l, m, n, o, p, q, r, s, t, u, v, w, x, y, z, A, B, C, D, E} can be elements of the set
{191, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6},
{91, 119, 47, 126, 106, 71, 25, 126, 122, 114, 100, 82, 59, 38, 15, 126, 125, 125, 120, 116, 111, 101, 96, 86, 76, 66, 55, 43, 31, 19, 6},
{91, 119, 47, 126, 106, 71, 25, 126, 122, 114, 100, 82, 59, 38, 15, 126, 125, 125, 121, 116, 111, 102, 96, 86, 76, 66, 55, 43, 31, 19, 6},
{91, 119, 47, 126, 106, 71, 25, 126, 122, 114, 100, 82, 59, 38, 15, 126, 125, 126, 120, 116, 111, 101, 97, 86, 76, 66, 55, 43, 31, 19, 6},
{91, 119, 47, 126, 106, 71, 25, 126, 122, 114, 100, 82, 59, 38, 15, 126, 125, 126, 121, 116, 111, 101, 96, 86, 76, 66, 55, 43, 31, 19, 6},
{91, 119, 47, 126, 106, 71, 25, 126, 122, 114, 100, 82, 59, 38, 15, 126, 126, 125, 121, 116, 110, 102, 96, 86, 76, 66, 55, 43, 31, 19, 6},
{91, 119, 47, 126, 106, 71, 25, 126, 122, 114, 100, 82, 59, 38, 15, 128, 127, 124, 121, 114, 110, 102, 96, 87, 77, 65, 53, 43, 31, 19, 6}, {91, 118, 49, 126, 106, 71, 25, 127, 122, 113, 99, 81, 60, 37, 13, 128, 127, 124, 121, 116, 110, 103, 95, 86, 76, 6 6, 55, 43, 31, 19, 6}}

8-Bit 64-Point DCT-2:

{aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa}

{bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck, −ck, −cj, −ci, −ch, −cg, −cf, −ce, −cd, −cc, −cb, −ca, −bz, −by, −bx, −bw, −by, −bu, −bt, −bs, −br, −bq, −bp, −bo, −bn, −bm, −bl, −bk, −bj, −bi, −bh, −bg, −bf}

{ap, aq, ar, as, at, au, av, aw, ax, ay, az, ba, bb, bc, bd, be, −be, −bd, −bc, −bb, −ba, −az, −ay, −ax, −aw, −av, −au, −at, −as, −ar, −aq, −ap, −ap, −aq, −ar, −as, −at, −au, −av, −aw, −ax, −ay, −az, −ba, −bb, −bc, −bd, −be, be, bd, bc, bb, ba, az, ay, ax, aw, av, au, at, as, ar, aq, ap}

{bg, bj, bm, bp, bs, by, by, cb, ce, ch, ck, −ci, −cf, −cc, −bz, −bw, −bt, −bq, −bn, −bk, −bh, −bf, −bi, −bl, −bo, −br, −bu, −bx, −ca, −cd, −cg, −cj, cj, cg, cd, ca, bx, bu, br, bo, bl, bi, bf, bh, bk, bn, bq, bt, bw, bz, cc, cf, ci, −ck, −ch, −ce, −cb, −by, −by, −bs, −bp, −bm, −bj, −bg}

{ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah, ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah}

{bh, bm, br, bw, cb, cg, −ck, −cf, −ca, −by, −bq, −bl, −bg, −bi, −bn, −bs, −bx, −cc, −ch, cj, ce, bz, bu, bp, bk, bf, bj, bo, bt, by, cd, ci, −ci, −cd, −by, −bt, −bo, −bj, −bf, −bk, −bp, −bu, −bz, −ce, −cj, ch, cc, bx, bs, bn, bi, bg, bl, bq, bv, ca, cf, ck, −cg, −cb, −bw, −br, −bm, −bh}

{aq, at, aw, az, bc, −be, −bb, −ay, −av, −as, −ap, −ar, −au, −ax, −ba, −bd, bd, ba, ax, au, ar, ap, as, av, ay, bb, be, −bc, −az, −aw, −at, −aq, −aq, −at, −aw, −az, −bc, be, bb, ay, av, as, ap, ar, au, ax, ba, bd, −bd, −ba, −ax, −au, −ar, −ap, −as, −av, −ay, −bb, −be, bc, az, aw, at, aq}

{bi, bp, bw, cd, ck, −ce, −bx, −bq, −bj, −bh, −bo, −by, −cc, −cj, cf, by, br, bk, bg, bn, bu, cb, ci, −cg, −bz, −bs, −bl, −bf, −bm, −bt, −ca, −ch, ch, ca, bt, bm, bf, bl, bs, bz, cg, −ci, −cb, −bu, −bn, −bg, −bk, −br, −by, −cf, cj, cc, by, bo, bh, bj, bq, bx, ce, −ck, −cd, −bw, −bp, −bi}

{ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad}

{bj, bs, cb, ck, −cc, −bt, −bk, −bi, −br, −ca, −cj, cd, bu, bl, bh, bq, bz, ci, −ce, −by, −bm, −bg, −bp, −by, −ch, cf, bw, bn, bf, bo, bx, cg, −cg, −bx, −bo, −bf, −bn, −bw, −cf, ch, by, bp, bg, bm, by, ce, −ci, −bz, −bq, −bh, −bl, −bu, −cd, cj, ca, br, bi, bk, bt, cc, −ck, −cb, −bs, −bj}

{ar, aw, bb, −bd, −ay, −at, −ap, −au, −az, −be, ba, av, aq, as, ax, bc, −bc, −ax, −as, −aq, −av, −ba, be, az, au, ap, at, ay, bd, −bb, −aw, −ar, −ar, −aw, −bb, bd, ay, at, ap, au, az, be, −ba, −av, −aq, −as, −ax, −bc, bc, ax, as, aq, av, ba, −be, −az, −au, −ap, −at, −ay, −bd, bb, aw, ar}

{bk, by, cg, −ce, −bt, −bi, −bm, −bx, −ci, cc, br, bg, bo, bz, ck, −ca, −bp, −bf, −bq, −cb, cj, by, bn, bh, bs, cd, −ch, −bw, −bl, −bj, −bu, −cf, cf, bu, bj, bl, bw, ch, −cd, −bs, −bh, −bn, −by, −cj, cb, bq, bf, bp, ca, −ck, −bz, −bo, −bg, −br, −cc, ci, bx, bm, bi, bt, ce, −cg, −by, −bk}

{ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai, ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai}

{bl, by, −ck, −bx, −bk, −bm, −bz, cj, bw, bj, bn, ca, −ci, −by, −bi, −bo, −cb, ch, bu, bh, bp, cc, −cg, −bt, −bg, −bq, −cd, cf, bs, bf, br, ce, −ce, −br, −bf, −bs, −cf, cd, bq, bg, bt, cg, −cc, −bp, −bh, −bu, −ch, cb, bo, bi, by, ci, −ca, −bn, −bj, −bw, −cj, bz, bm, bk, bx, ck, −by, −bl}

{as, az, −bd, −aw, −ap, −av, −bc, ba, at, ar, ay, −be, −ax, −aq, −au, −bb, bb, au, aq, ax, be, −ay, −ar, −at, −ba, bc, av, ap, aw, bd, −az, −as, −as, −az, bd, aw, ap, av, bc, −ba, −at, −ar, −ay, be, ax, aq, au, bb, −bb, −au, −aq, −ax, −be, ay, ar, at, ba, −bc, −av, −ap, −aw, −bd, az, as}

{bm, cb, −cf, −bq, −bi, −bx, cj, bu, bf, bt, ci, −by, −bj, −bp, −ce, cc, bn, bl, ca, −cg, −br, −bh, −bw, ck, by, bg, bs, ch, −bz, −bk, −bo, −cd, cd, bo, bk, bz, −ch, −bs, −bg, −by, −ck, bw, bh, br, cg, −ca, −bl, −bn, −cc, ce, bp, bj, by, −ci, −bt, −bf, −bu, −cj, bx, bi, bq, cf, −cb, −bm}

{ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab}

{bn, ce, −ca, −bj, −br, −ci, bw, bf, by, −cj, −bs, −bi, −bz, cf, bo, bm, cd, −cb, −bk, −bq, −ch, bx, bg, bu, −ck, −bt, −bh, −by, cg, bp, bl, cc, −cc, −bl, −bp, −cg, by, bh, bt, ck, −bu, −bg, −bx, ch, bq, bk, cb, −cd, −bm, −bo, −cf, bz, bi, bs, cj, −by, −bf, −bw, ci, br, bj, ca, −ce, −bn}

{at, bc, −ay, −ap, −ax, bd, au, as, bb, −az, −aq, −aw, be, av, ar, ba, −ba, −ar, −av, −be, aw, aq, az, −bb, −as, −au, −bd, ax, ap, ay, −bc, −at, −at, −bc, ay, ap, ax, −bd, −au, −as, −bb, az, aq, aw, −be, −av, −ar, −ba, ba, ar, av, be, −aw, −aq, −az, bb, as, au, bd, −ax, −ap, −ay, bc, at}

{bo, ch, −by, −bh, −ca, cc, bj, bt, −cj, −bq, −bm, −cf, bx, bf, by, −ce, −bl, −br, −ck, bs, bk, cd, −bz, −bg, −bw, cg, bn, bp, ci, −bu, −bi, −cb, cb, bi, bu, −ci, −bp, −bn, −cg, bw, bg, bz, −cd, −bk, −bs, ck, br, bl, ce, −by, −bf, −bx, cf, bm, bq, cj, −bt, −bj, −cc, ca, bh, by, −ch, −bo}

{aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj, aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj}

{bp, ck, −bq, −bo, −cj, br, bn, ci, −bs, −bm, −ch, bt, bl, cg, −bu, −bk, −cf, by, bj, ce, −bw, −bi, −cd, bx, bh, cc, −by, −bg, −cb, bz, bf, ca, −ca, −bf, −bz, cb, bg, by, −cc, −bh, −bx, cd, bi, bw, −ce, −bj, −by, cf, bk, bu, −cg, −bl, −bt, ch, bm, bs, −ci, −bn, −br, cj, bo, bq, −ck, −bp}

{au, −be, −at, −av, bd, as, aw, −bc, −ar, −ax, bb, aq, ay, −ba, −ap, −az, az, ap, ba, −ay, −aq, −bb, ax, ar, bc, −aw, −as, −bd, av, at, be, −au, −au, be, at, av, −bd, −as, −aw, bc, ar, ax, −bb, −aq, −ay, ba, ap, az, −az, −ap, −ba, ay, aq, bb, −ax, −ar, −bc, aw, as, bd, −av, −at, −be, au}

{bq, −ci, −bl, −by, cd, bg, ca, −by, −bi, −cf, bt, bn, ck, −bo, −bs, cg, bj, bx, −cb, −bf, −cc, bw, bk, ch, −br, −bp, cj, bm, bu, −ce, −bh, −bz, bz, bh, ce, −bu, −bm, −cj, bp, br, −ch, −bk, −bw, cc, bf, cb, −bx, −bj, −cg, bs, bo, −ck, −bn, −bt, cf, bi, by, −ca, −bg, −cd, by, bl, ci, −bq}

{ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae}

{br, −cf, −bg, −cc, bu, bo, −ci, −bj, −bz, bx, bl, ck, −bm, −bw, ca, bi, ch, −bp, −bt, cd, bf, ce, −bs, −bq, cg, bh, cb, −by, −bn, cj, bk, by, −by, −bk, −cj, bn, by, −cb, −bh, −cg, bq, bs, −ce, −bf, −cd, bt, bp, −ch, −bi, −ca, bw, bm, −ck, −bl, −bx, bz, bj, ci, −bo, −bu, cc, bg, cf, −br}

{av, −bb, −ap, −bc, au, aw, −ba, −aq, −bd, at, ax, −az, −ar, −be, as, ay, −ay, −as, be, ar, az, −ax, −at, bd, aq, ba, −aw, −au, bc, ap, bb, −av, −av, bb, ap, bc, −au, −aw, ba, aq, bd, −at, −ax, az, ar, be, −as, −ay, ay, as, −be, −ar, −az, ax, at, −bd, −aq, −ba, aw, au, −bc, −ap, −bb, av}

{bs, −cc, −bi, −cj, bl, bz, −by, −bp, cf, bf, cg, −bo, −bw, by, bm, −ci, −bh, −cd, br, bt, −cb, −bj, −ck, bk, ca, −bu, −bq, ce, bg, ch, −bn, −bx, bx, bn, −ch, −bg, −ce, bq, bu, −ca, −bk, ck, bj, cb, −bt, −br, cd, bh, ci, −bm, −by, bw, bo, −cg, −bf, −cf, bp, by, −bz, −bl, cj, bi, cc, −bs}

{ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak, ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak}

{bt, −bz, −bn, cf, bh, ck, −bi, −ce, bo, by, −bu, −bs, ca, bm, −cg, −bg, −cj, bj, cd, −bp, −bx, by, br, −cb, −bl, ch, bf, ci, −bk, −cc, bq, bw, −bw, −bq, cc, bk, −ci, −bf, −ch, bl, cb, −br, −by, bx, bp, −cd, −bj, cj, bg, cg, −bm, −ca, bs, bu, −by, −bo, ce, bi, −ck, −bh, −cf, bn, bz, −bt}

{aw, −ay, −au, ba, as, −bc, −aq, be, ap, bd, −ar, −bb, at, az, −av, −ax, ax, av, −az, −at, bb, ar, −bd, −ap, −be, aq, bc, −as, −ba, au, ay, −aw, −aw, ay, au, −ba, −as, bc, aq, −be, −ap, −bd, ar, bb, −at, −az, av, ax, −ax, −av, az, at, −bb, −ar, bd, ap, be, −aq, −bc, as, ba, −au, −ay, aw}

{bu, −bw, −bs, by, bq, −ca, −bo, cc, bm, −ce, −bk, cg, bi, −ci, −bg, ck, bf, cj, −bh, −ch, bj, cf, −bl, −cd, bn, cb, −bp, −bz, br, bx, −bt, −by, by, bt, −bx, −br, bz, bp, −cb, −bn, cd, bl, −cf, −bj, ch, bh, −cj, −bf, −ck, bg, ci, −bi, −cg, bk, ce, −bm, −cc, bo, ca, −bq, −by, bs, bw, −bu}

{aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa}

{bv, −bt, −bx, br, bz, −bp, −cb, bn, cd, −bl, −cf, bj, ch, −bh, −cj, bf, −ck, −bg, ci, bi, −cg, −bk, ce, bm, −cc, −bo, ca, bq, −by, −bs, bw, bu, −bu, −bw, bs, by, −bq, −ca, bo, cc, −bm, −ce, bk, cg, −bi, −ci, bg, ck, −bf, cj, bh, −ch, −bj, cf, bl, −cd, −bn, cb, bp, −bz, −br, bx, bt, −bv}

{ax, −av, −az, at, bb, −ar, −bd, ap, −be, −aq, bc, as, −ba, −au, ay, aw, −aw, −ay, au, ba, −as, −bc, aq, be, −ap, bd, ar, −bb, −at, az, av, −ax, −ax, av, az, −at, −bb, ar, bd, −ap, be, aq, −bc, −as, ba, au, −ay, −aw, aw, ay, −au, −ba, as, bc, −aq, −be, ap, −bd, −ar, bb, at, −az, −av, ax}

{bw, −bq, −cc, bk, ci, −bf, ch, bl, −cb, −br, by, bx, −bp, −cd, bj, cj, −bg, cg, bm, −ca, −bs, bu, by, −bo, −ce, bi, ck, −bh, cf, bn, −bz, −bt, bt, bz, −bn, −cf, bh, −ck, −bi, ce, bo, −by, −bu, bs, ca, −bm, −cg, bg, −cj, −bj, cd, bp, −bx, −by, br, cb, −bl, −ch, bf, −ci, −bk, cc, bq, −bw}

{al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al, al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al}

{bx, −bn, −ch, bg, −ce, −bq, bu, ca, −bk, −ck, bj, −cb, −bt, br, cd, −bh, ci, bm, −by, −bw, bo, cg, −bf, cf, bp, −by, −bz, bl, cj, −bi, cc, bs, −bs, −cc, bi, −cj, −bl, bz, by, −bp, −cf, bf, −cg, −bo, bw, by, −bm, −ci, bh, −cd, −br, bt, cb, −bj, ck, bk, −ca, −bu, bq, ce, −bg, ch, bn, −bx}

{ay, −as, −be, ar, −az, −ax, at, bd, −aq, ba, aw, −au, −bc, ap, −bb, −av, av, bb, −ap, bc, au, −aw, −ba, aq, −bd, −at, ax, az, −ar, be, as, −ay, −ay, as, be, −ar, az, ax, −at, −bd, aq, −ba, −aw, au, bc, −ap, bb, av, −av, −bb, ap, −bc, −au, aw, ba, −aq, bd, at, −ax, −az, ar, −be, −as, ay}

{by, −bk, cj, bn, −by, −cb, bh, −cg, −bq, bs, ce, −bf, cd, bt, −bp, −ch, bi, −ca, −bw, bm, ck, −bl, bx, bz, −bj, ci, bo, −bu, −cc, bg, −cf, −br, br, cf, −bg, cc, bu, −bo, −ci, bj, −bz, −bx, bl, −ck, −bm, bw, ca, −bi, ch, bp, −bt, −cd, bf, −ce, −bs, bq, cg, −bh, cb, by, −bn, −cj, bk, −by}

{af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af}

{bz, −bh, ce, bu, −bm, cj, bp, −br, −ch, bk, −bw, −cc, bf, −cb, −bx, bj, −cg, −bs, bo, ck, −bn, bt, cf, −bi, by, ca, −bg, cd, by, −bl, ci, bq, −bq, −ci, bl, −by, −cd, bg, −ca, −by, bi, −cf, −bt, bn, −ck, −bo, bs, cg, −bj, bx, cb, −bf, cc, bw, −bk, ch, br, −bp, −cj, bm, −bu, −ce, bh, −bz}

{az, −ap, ba, ay, −aq, bb, ax, −ar, bc, aw, −as, bd, av, −at, be, au, −au, −be, at, −av, −bd, as, −aw, −bc, ar, −ax, −bb, aq, −ay, −ba, ap, −az, −az, ap, −ba, −ay, aq, −bb, −ax, ar, −bc, −aw, as, −bd, −av, at, −be, −au, au, be, −at, av, bd, −as, aw, bc, −ar, ax, bb, −aq, ay, ba, −ap, az}

{ca, −bf, bz, cb, −bg, by, cc, −bh, bx, cd, −bi, bw, ce, −bj, by, cf, −bk, bu, cg, −bl, bt, ch, −bm, bs, ci, −bn, br, cj, −bo, bq, ck, −bp, bp, −ck, −bq, bo, −cj, −br, bn, −ci, −bs, bm, −ch, −bt, bl, −cg, −bu, bk, −cf, −by, bj, −ce, −bw, bi, −cd, −bx, bh, −cc, −by, bg, −cb, −bz, bf, −ca}

{am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am, am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am}

{cb, −bi, bu, ci, −bp, bn, −cg, −bw, bg, −bz, −cd, bk, −bs, −ck, br, −bl, ce, by, −bf, bx, cf, −bm, bq, −cj, −bt, bj, −cc, −ca, bh, −by, −ch, bo, −bo, ch, by, −bh, ca, cc, −bj, bt, cj, −bq, bm, −cf, −bx, bf, −by, −ce, bl, −br, ck, bs, −bk, cd, bz, −bg, bw, cg, −bn, bp, −ci, −bu, bi, −cb}

{ba, −ar, av, −be, −aw, aq, −az, −bb, as, −au, bd, ax, −ap, ay, bc, −at, at, −bc, −ay, ap, −ax, −bd, au, −as, bb, az, −aq, aw, be, −av, ar, −ba, −ba, ar, −av, be, aw, −aq, az, bb, −as, au, −bd, −ax, ap, −ay, −bc, at, −at, bc, ay, −ap, ax, bd, −au, as, −bb, −az, aq, −aw, −be, av, −ar, ba}

{cc, −bl, bp, −cg, −by, bh, −bt, ck, bu, −bg, bx, ch, −bq, bk, −cb, −cd, bm, −bo, cf, bz, −bi, bs, −cj, −by, bf, −bw, −ci, br, −bj, ca, ce, −bn, bn, −ce, −ca, bj, −br, ci, bw, −bf, by, cj, −bs, bi, −bz, −cf, bo, −bm, cd, cb, −bk, bq, −ch, −bx, bg, −bu, −ck, bt, −bh, by, cg, −bp, bl, −cc}

{ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac}

{cd, −bo, bk, −bz, −ch, bs, −bg, by, −ck, −bw, bh, −br, cg, ca, −bl, bn, −cc, −ce, bp, −bj, by, ci, −bt, bf, −bu, cj, bx, −bi, bq, −cf, −cb, bm, −bm, cb, cf, −bq, bi, −bx, −cj, bu, −bf, bt, −ci, −by, bj, −bp, ce, cc, −bn, bl, −ca, −cg, br, −bh, bw, ck, −by, bg, −bs, ch, bz, −bk, bo, −cd}

{bb, −au, aq, −ax, be, ay, −ar, at, −ba, −bc, av, −ap, aw, −bd, −az, as, −as, az, bd, −aw, ap, −av, bc, ba, −at, ar, −ay, −be, ax, −aq, au, −bb, −bb, au, −aq, ax, −be, −ay, ar, −at, ba, bc, −av, ap, −aw, bd, az, −as, as, −az, −bd, aw, −ap, av, −bc, −ba, at, −ar, ay, be, −ax, aq, −au, bb}

{ce, −br, bf, −bs, cf, cd, −bq, bg, −bt, cg, cc, −bp, bh, −bu, ch, cb, −bo, bi, −by, ci, ca, −bn, bj, −bw, cj, bz, −bm, bk, −bx, ck, by, −bl, bl, −by, −ck, bx, −bk, bm, −bz, −cj, bw, −bj, bn, −ca, −ci, by, −bi, bo, −cb, −ch, bu, −bh, bp, −cc, −cg, bt, −bg, bq, −cd, −cf, bs, −bf, br, −ce}

{an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an, an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an}

{cf, −bu, bj, −bl, bw, −ch, −cd, bs, −bh, bn, −by, cj, cb, −bq, bf, −bp, ca, ck, −bz, bo, −bg, br, −cc, −ci, bx, −bm, bi, −bt, ce, cg, −by, bk, −bk, by, −cg, −ce, bt, −bi, bm, −bx, ci, cc, −br, bg, −bo, bz, −ck, −ca, bp, −bf, bq, −cb, −cj, by, −bn, bh, −bs, cd, ch, −bw, bl, −bj, bu, −cf}

{bc, −ax, as, −aq, av, −ba, −be, az, −au, ap, −at, ay, −bd, −bb, aw, −ar, ar, −aw, bb, bd, −ay, at, −ap, au, −az, be, ba, −av, aq, −as, ax, −bc, −bc, ax, −as, aq, −av, ba, be, −az, au, −ap, at, −ay, bd, bb, −aw, ar, −ar, aw, −bb, −bd, ay, −at, ap, −au, az, −be, −ba, av, −aq, as, −ax, be}

{cg, −bx, bo, −bf, bn, −bw, cf, ch, −by, bp, −bg, bm, −by, ce, ci, −bz, bq, −bh, bl, −bu, cd, cj, −ca, br, −bi, bk, −bt, cc, ck, −cb, bs, −bj, bj, −bs, cb, −ck, −cc, bt, −bk, bi, −br, ca, −cj, −cd, bu, −bl, bh, −bq, bz, −ci, −ce, by, −bm, bg, −bp, by, −ch, −cf, bw, −bn, bf, −bo, bx, −cg}

{ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag}

{ch, −ca, bt, −bm, bf, −bl, bs, −bz, cg, ci, −cb, bu, −bn, bg, −bk, br, −by, cf, cj, −cc, by, −bo, bh, −bj, bq, −bx, ce, ck, −cd, bw, −bp, bi, −bi, bp, −bw, cd, −ck, −ce, bx, −bq, bj, −bh, bo, −by, cc, −cj, −cf, by, −br, bk, −bg, bn, −bu, cb, −ci, −cg, bz, −bs, bl, −bf, bm, −bt, ca, −ch}

{bd, −ba, ax, −au, ar, −ap, as, −av, ay, −bb, be, bc, −az, aw, −at, aq, −aq, at, −aw, az, −bc, −be, bb, −ay, av, −as, ap, −ar, au, −ax, ba, −bd, −bd, ba, −ax, au, −ar, ap, −as, av, −ay, bb, −be, −bc, az, −aw, at, −aq, aq, −at, aw, −az, bc, be, −bb, ay, −av, as, −ap, ar, −au, ax, −ba, bd}

{ci, −cd, by, −bt, bo, −bj, bf, −bk, bp, −bu, bz, −ce, cj, ch, −cc, bx, −bs, bn, −bi, bg, −bl, bq, −bv, ca, −cf, ck, cg, −cb, bw, −br, bm, −bh, bh, −bm, br, −bw, cb, −cg, −ck, cf, −ca, by, −bq, bl, −bg, bi, −bn, bs, −bx, cc, −ch, ce, −bz, bu, −bp, bk, −bf, bj, −bo, bt, −by, cd, −ci}

{ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao, ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao}

{cj, −cg, cd, −ca, bx, −bu, br, −bo, bl, −bi, bf, −bh, bk, −bn, bq, −bt, bw, −bz, cc, −cf, ci, ck, −ch, ce, −cb, by, −by, bs, −bp, bm, −bj, bg, −bg, bj, −bm, bp, −bs, by, −by, cb, −ce, ch, −ck, −ci, cf, −cc, bz, −bw, bt, −bq, bn, −bk, bh, −bf, bi, −bl, bo, −br, bu, −bx, ca, −cd, cg, −cj}

{be, −bd, bc, −bb, ba, −az, ay, −ax, aw, −av, au, −at, as, −ar, aq, −ap, ap, −aq, ar, −as, at, −au, av, −aw, ax, −ay, az, −ba, bb, −bc, bd, −be, −be, bd, −bc, bb, −ba, az, −ay, ax, −aw, av, −au, at, −as, ar, −aq, ap, −ap, aq, −ar, as, −at, au, −av, aw, −ax, ay, −az, ba, −bb, bc, −bd, be}

{ck, −cj, ci, −ch, cg, −cf, ce, −cd, cc, −cb, ca, −bz, by, −bx, bw, −by, bu, −bt, bs, −br, bq, −bp, bo, −bn, bm, −bl, bk, −bj, bi, −bh, bg, −bf, bf, −bg, bh, −bi, bj, −bk, bl, −bm, bn, −bo, bp, −bq, br, −bs, bt, −bu, by, −bw, bx, −by, bz, −ca, cb, −cc, cd, −ce, cf, −cg, ch, −ci, cj, −ck} where {aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck} can be elements of the set {{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 114, 111, 108, 105, 101, 97, 93, 88, 84, 79, 74, 68, 63, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 127, 127, 127, 126, 125, 123, 122, 120, 117, 114, 111, 108, 105, 101, 97, 93, 88, 84, 79, 74, 68, 63, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 116, 115, 111, 109, 105, 101, 96, 93, 88, 84, 79, 74, 68, 63, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 114, 111, 108, 105, 101, 96, 93, 88, 84, 79, 74, 68, 63, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 115, 111, 108, 105, 101, 95, 93, 88, 84, 79, 74, 68, 63, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 115, 111, 108, 105, 101, 96, 93, 88, 84, 79, 74, 68, 63, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 114, 111, 108, 105, 101, 96, 93, 88, 83, 79, 73, 68, 64, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 114, 111, 108, 105, 101, 96, 93, 88, 83, 79, 74, 68, 64, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 114, 111, 108, 105, 101, 97, 93, 88, 83, 78, 73, 68, 64, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 114, 111, 108, 105, 101, 97, 93, 88, 83, 79, 73, 68, 64, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 114, 111, 108, 105, 101, 97, 93, 88, 83, 79, 74, 68, 64, 58, 52, 46, 40, 34, 28, 22, 16, 9, 3}

{91, 119, 47, 126, 106, 71, 25, 126, 122, 114, 100, 82, 59, 38, 15, 128, 127, 124, 121, 116, 110, 103, 95, 86, 76, 66, 55, 43, 31, 19, 6, 128, 128, 127, 126, 125, 123, 122, 119, 117, 114, 111, 108, 105, 101, 97, 93, 89, 83, 79, 74, 68, 64, 58, 52, 46, 40, 34, 28, 22, 16, 9, 3}

{91, 118, 49, 126, 106, 71, 25, 127, 122, 113, 99, 81, 60, 37, 13, 128, 127, 124, 121, 116, 110, 103, 95, 86, 76, 6 6, 55, 43, 31, 19, 6, 128, 128, 127, 126, 125, 123, 122, 119, 117, 114, 111, 108, 105, 101, 97, 93, 88, 84, 79, 74, 6 8, 63, 58, 52, 46, 40, 34, 28, 22, 16, 9, 3}}.

8-Bit 32-Point LGT (DST-7):

{a, b, c, d, e, f, g, h, i, j, k, l, m, n, o, p, q, r, s, t, u, v, w, x, y, z, A, B, C, D, E, F,}

{c, f, i, l, o, r, u, x, A, D, F, C, z, w, t, q, n, k, h, e, b, −a, −d, −g, −j, −m, −p, −s, −v, −y, −B, −E,}

{e, j, o, t, y, D, D, y, t, o, j, e, 0, −e, −j, −o, −t, −y, −D, −D, −y, −t, −o, −j, −e, 0, e, j, o, t, y, D,}
{g, n, u, B, D, w, p, i, b, −e, −l, −s, −z, −F, −y, −r, −k, −d, c, j, q, x, E, A, t, m, f, −a, −h, −o, −v, −C,}
{i, r, A, C, t, k, b, −g, −p, −y, −E, −v, −m, −d, e, n, w, F, x, o, f, −c, −l, −u, −D, −z, −q, −h, a, j, s, B,}
{k, v, F, u, j, −a, −l, −w, −E, −t, b, m, x, D, s, h, −c, −n, −y, −C, −r, −g, d, o, z, B, q, f, −e, −p, −A,}
{m, z, z, m, 0, −m, −z, −z, −m, 0, m, z, z, m, 0, −m, −z, −z, −m, 0, m, z, z, m, 0, −m, −z, −z, −m, 0, m, z,}
{o, D, t, e, −j, −y, −y, −j, e, t, D, o, 0, −o, −D, −t, −e, j, y, y, j, −e, −t, −D, −o, 0, o, D, t, e, −j, −y,}
{q, E, n, −c, −t, −B, −k, f, w, y, h, −z, −v, −e, l, C, s, b, −o, −F, −p, a, r, D, m, −d, −u, −A, −j, g, x,}
{s, A, h, −k, −D, −p, c, v, x, e, −n, −F, −m, f, y, u, b, −q, −C, −j, i, B, r, −a, −t, −z, −g, l, E, o, −d, −w,}
{u, w, b, −s, −y, −d, q, A, f, −o, −C, −h, m, E, j, −k, −F, −l, i, D, n, −g, −B, −p, e, z, r, −c, −x, −t, a, v,}
{w, s, −d, −A, −o, h, E, k, −l, −D, −g, p, z, c, −t, −v, a, x, r, −e, −B, −n, i, F, j, −m, −C, −f, q, y, b, −u,}
{y, o, −j, −D, −e, t, t, −e, −D, −j, o, y, 0, −y, −o, j, D, e, −t, −t, e, D, j, −o, −y, 0, y, o, −j, −D, −e, t,}
{A, k, −p, −v, e, F, f, −u, −q, j, B, a, −z, −l, o, w, −d, −E, −g, t, r, −C, −b, y, m, −n, −x, c, D, h, −s,}
{C, g, −v, −n, o, u, −h, −B, a, D, f, −w, −m, p, t, −i, −A, b, E, e, −x, −l, q, s, −j, −z, c, F, d, −y, −k, r,}
{E, c, −B, −f, y, i, −v, −l, s, o, −p, −r, m, u, −j, −x, g, A, −d, −D, a, F, b, −C, −e, z, h, −w, −k, t, n, −q,}
{F, −a, −E, b, D, −c, −C, d, B, −e, −A, f, z, −g, −y, h, x, −w, j, v, −k, −u, l, t, −m, −s, n, r, −o, −q, p,}
{D, −e, −y, j, t, −o, −o, t, j, −y, −e, D, 0, −D, e, y, −j, −t, o, o, −t, −j, y, e, −D, 0, D, −e, −y, j, t, −o,}
{B, −s, r, j, −A, −a, C, −h, −t, q, k, −z, −b, D, −g, −u, p, l, −y, −c, E, −f, −v, o, m, −x, −d, F, −e, −w, n,}
{z, −m, −m, z, 0, −z, m, m, −z, 0, z, −m, −m, z, 0, −z, m, m, −z, 0, z, −m, −m, z, 0, −z, m, m, −z, 0, z, −m,}
{x, −q, −g, E, −j, −n, A, −c, −u, t, d, −B, m, k, −D, f, r, −w, −a, y, −p, −h, F, −o, z, −b, −v, s, e, −C, l,}
{v, −u, −a, w, −t, −b, x, −s, −c, y, −r, −d, z, −q, −e, A, −p, −f, B, −o, −g, C, −n, −h, D, −m, E, −l, −j, F, −k,}
{t, −y, e, o, −D, j, j, −D, o, e, −y, t, 0, −t, y, −e, −o, D, −j, −j, D, −o, −e, y, −t, 0, t, −y, e, o, −D, j,}
{r, −C, k, g, −y, v, −d, −n, F, −o, −c, u, −z, h, j, −B, s, −a, −q, D, −l, −f, x, −w, e, m, −E, p, b, −t, A, −i,}
{p, −F, q, −a, −o, E, −r, b, n, −D, s, −c, −m, C, −t, d, l, −B, u, −e, −k, A, −v, f, j, −z, w, −g, y, −x, h,}
{n, −B, w, −e, s, −F, r, −d, −j, x, −A, m, a, −o, C, −v, h, f, −t, E, −q, c, k, −y, z, −l, −b, p, −D, u, −g,}
{l, −x, C, −q, e, g, −s, E, −v, j, b, −n, z, −A, o, −c, u, −F, t, −h, −d, p, −B, y, −m, a, k, −w, D, −r, f,}
{j, −t, D, −y, o, −e, −e, o, −y, D, −t, j, 0, −j, t, −D, y, −o, e, e, −o, y, −D, t, −j, 0, j, −t, D, −y, o, −e,}
{h, −p, x, −F, y, −q, i, −a, −g, o, −w, E, −z, r, −j, b, f, −n, v, −D, A, −s, k, −c, −e, m, −u, C, −B, t, −l, d,}
{f, −l, r, −x, D, −C, w, −q, k, −e, −a, g, −m, s, −y, E, −B, v, −p, j, −d, −b, h, −n, t, −z, F, −A, u, −o, i, −c,}
{d, −h, l, −p, t, −x, B, −F, C, −y, u, −q, m, e, −a, −c, g, −k, o, −s, w, −A, E, −D, z, −v, r, −n, j, −f, b,}
{b, −d, f, −h, j, −l, n, −p, r, −t, v, −x, z, −B, D, −F, E, −C, A, −y, w, −u, s, −q, o, −m, k, g, −e, c, −a,}.

In one embodiment, {a, b, c, d, e, f, g, h, i, j, k, l, m, n, o, p, q, r, s, t, u, v, w, x, y, z, A, B, C, D, E, F} can be any element of the set {{16, 12, 18, 24, 30, 36, 42, 48, 54, 59, 64, 70, 75, 80, 84, 89, 93, 97, 101, 105, 108, 111, 114, 116, 119, 121, 123, 1 24, 125, 126, 127, 127},
{6, 12, 19, 24, 30, 36, 42, 48, 54, 59, 64, 70, 75, 80, 84, 89, 93, 97, 101, 105, 108, 111, 114, 116, 119, 121, 123, 1 24, 125, 126, 127, 127},
{6, 12, 19, 24, 30, 36, 43, 48, 54, 59, 64, 70, 75, 80, 84, 89, 93, 97, 101, 105, 108, 111, 114, 116, 119, 121, 123, 1 24, 125, 126, 127, 127}}.

10-Bit 4-Point DCT-2:

{a, a, a, a}
{b, c, −c, −b}
{a, −a, −a, a}
{c, −b, b, −c} where {a, b, c} is {724, 946, 392}.

10-Bit 8-Point DCT-2:

{a, a, a, a, a, a, a, a}
{d, e, f, g, −g, −f, −e, −d}
{b, c, −c, −b, −b, −c, c, b}
{e, −g, −d, −f, f, d, g, −e}
{a, −a, −a, a, a, −a, −a, a}
{f, −d, g, e, −e, −g, d, −f}
{c, −b, b, −c, −c, b, −b, c}
{g, −f, e, −d, d, −e, f, −g} where {a, b, c, d, e, f, g} can be any element of the set

{{724, 946, 392, 1004, 851, 569, 200},
{724, 944, 394, 1003, 852, 571, 198},
{724, 945, 392, 1003, 852, 571, 198},
{724, 945, 393, 1003, 852, 571, 198},
{724, 945, 394, 1003, 852, 571, 198},
{724, 946, 392, 1003, 852, 571, 198}}

10-Bit 16-Point DCT-2:

{a, a, a, a, a, a, a, a, a, a, a, a, a, a, a, a}
{h, i, j, k, l, m, n, o, −o, −n, −m, −l, −k, −j, −h}
{d, e, f, g, −g, −f, −e, −d, −d, −e, −f, −g, g, f, e, d}
{i, l, o, −m, −j, −h, −k, −n, n, k, h, j, m, −o, −l, −i}
{b, c, −c, −b, −b, −c, c, b, b, c, −c, −b, −b, −c, c, b}
{j, o, −k, −n, l, h, m, −m, −h, −l, n, i, k, −o, −j}
{e, −g, −d, −f, f, d, g, −e, −e, g, d, f, −f, −d, −g, e}
{k, −m, o, h, n, −j, −l, l, j, −n, −h, −o, i, m, −k}
{a, −a, −a, a, a, −a, −a, a, a, −a, −a, a, a, −a, −a, a}
{l, −j, −n, h, −o, m, k, −k, −m, i, o, −h, n, j, −l}
{f, −d, g, e, −e, −g, d, −f, −f, d, −g, −e, e, g, −d, f}
{m, −h, l, n, k, o, −j, j, −o, −k, i, −n, −l, h, −m}
{c, −b, b, −c, −c, b, −b, c, c, −b, b, −c, −c, b, −b, c}
{n, −k, h, −j, m, o, −l, i, −i, l, −o, −m, j, −h, k, −n}
{g, −f, e, −d, d, −e, f, −g, −g, f, −e, d, −d, e, −f, g}
{o, −n, m, −l, k, −j, i, −h, h, j, −k, l, −m, n, −o} where {a, b, c, d, e, f, g, h, i, j, k, l, m, n, o} can be any element of the set {{724, 946, 392, 1003, 852, 571, 198, 1019, 980, 903, 792, 650, 483, 297, 100},
{724, 946, 392, 1003, 852, 571, 198, 1017, 978, 905, 791, 652, 481, 296, 101},
{724, 946, 392, 1003, 852, 571, 198, 1017, 979, 903, 791, 652, 481, 299, 101},
{724, 946, 392, 1003, 852, 571, 198, 1017, 979, 904, 791, 652, 481, 298, 101},
{724, 946, 392, 1003, 852, 571, 198, 1017, 979, 904, 791, 652, 482, 296, 101},
{724, 946, 392, 1003, 852, 571, 198, 1017, 979, 904, 792, 651, 481, 298, 102},
{724, 946, 392, 1003, 852, 571, 198, 1017, 979, 904, 792, 652, 481, 299, 102},
{724, 946, 392, 1003, 852, 571, 198, 1017, 979, 905, 792, 652, 481, 297, 102},
{724, 946, 392, 1003, 852, 571, 198, 1017, 979, 905, 792, 652, 481, 298, 102},
{724, 946, 392, 1003, 852, 571, 198, 1017, 979, 905, 792, 652, 482, 296, 102}, {724, 946, 392, 1003, 852, 571, 198, 1017, 980, 903, 792, 652, 483, 297, 102},
{724, 946, 392, 1003, 852, 571, 198, 1017, 980, 903, 792, 652, 484, 295, 102},
{724, 946, 392, 1003, 852, 571, 198, 1017, 981, 901, 792, 652, 484, 298, 102},
{724, 946, 392, 1003, 852, 571, 198, 1018, 980, 903, 791, 652, 483, 297, 100},
{724, 946, 392, 1003, 852, 571, 198, 1018, 980, 903, 791, 652, 484, 295, 100},
{724, 946, 392, 1003, 852, 571, 198, 1018, 981, 901, 791, 652, 484, 298, 100},
{724, 946, 392, 1003, 852, 571, 198, 1019, 980, 903, 790, 652, 483, 297, 98},
{724, 946, 392, 1003, 852, 571, 198, 1019, 980, 903, 790, 652, 484, 295, 98},
{724, 946, 392, 1003, 852, 571, 198, 1019, 980, 903, 792, 649, 484, 295, 101},
{724, 946, 392, 1003, 852, 571, 198, 1019, 981, 901, 790, 652, 484, 298, 98},
{724, 946, 392, 1003, 852, 571, 198, 1020, 980, 903, 791, 649, 484, 295, 99},
{724, 946, 392, 1003, 852, 571, 198, 1020, 981, 901, 791, 649, 484, 298, 99}}

10-Bit 32-Point DCT-2:

{a, a, a, a, a, a, a, a, a, a, a, a, a, a, a, a, a, a, a, a, a, a, a, a, a, a, a, a, a, a, a, a}
{p, q, r, s, t, u, v, w, x, y, z, A, B, C, D, E, −E, −D, −C, −B, −A, −z, −y, −x, −w, −v, −u, −t, −s, −r, −q, −p}
{h, i, j, k, l, m, n, o, −o, −n, −m, −l, −k, −j, −h, −h, −j, −k, −l, −m, −n, −o, o, n, m, l, k, j, i, h}
{q, t, w, z, C, −E, −B, −y, −v, −s, −p, −r, −u, −x, −A, −D, D, A, x, u, r, p, s, v, y, B, E, −C, −z, −w, −t, −q}
{d, e, f, g, −g, −f, −e, −d, −d, −e, −f, −g, g, f, e, d, d, e, f, g, −g, −f, −e, −d, −d, −e, −f, −g, g, f, e, d}
{r, w, B, −D, −y, −t, −p, −u, −z, −E, A, v, q, s, x, C, −C, −x, −s, −q, −v, −A, E, z, u, p, t, y, D, −B, −w, −r}
{i, l, o, −m, −j, −h, −k, −n, n, k, h, j, m, −o, −l, −l, −o, m, j, h, k, n, −n, −k, −h, −j, −m, o, l, i}
{s, z, −D, −w, −p, −v, −C, A, t, r, y, −E, −x, −q, −u, −B, B, u, q, x, E, −y, −r, −t, −A, C, v, p, w, D, −z, −s}
{b, c, −c, −b, −b, −c, c, b, b, c, −c, −b, −b, −c, c, b, b, c, −c, −b, −b, −c, c, b, b, c, −c, −b, −b, −c, c, b}
{t, C, −y, −p, −x, D, u, s, B, −z, −q, −w, E, v, r, A, −A, −r, −v, −E, w, q, z, −B, −s, −u, −D, x, p, y, −C, −t}
{j, o, −k, −n, l, h, m, −m, −h, −l, n, i, k, −o, −j, −j, −o, k, i, n, −l, −h, −m, m, h, l, −n, −k, o, j}
{u, −E, −t, −v, D, s, w, −C, −r, −x, B, q, y, −A, −p, −z, z, p, A, −y, −q, −B, x, r, C, −w, −s, −D, v, t, E, −u}
{e, −g, −d, −f, f, d, g, −e, −e, g, d, f, −f, −d, −g, e, e, −g, −d, −f, f, d, g, −e, −e, g, d, f, −f, −d, −g, e}
{v, −B, −p, −C, u, w, −A, −q, −D, t, x, −z, −r, −E, s, y, −y, −s, E, r, z, −x, −t, D, q, A, −w, −u, C, p, B, −v}
{k, −m, o, h, n, −j, −l, l, j, −n, −h, −o, i, m, −k, −k, m, i, −o, −h, −n, j, l, −l, −j, n, h, o, −m, k}
{w, −y, −u, A, s, −C, −q, E, p, D, −r, −B, t, z, −v, −x, x, v, −z, −t, B, r, −D, −p, −E, q, C, −s, −A, u, y, −w}
{a, −a, −a, a, a, −a, −a, a, a, −a, −a, a, a, −a, −a, a, a, −a, −a, a, a, −a, −a, a, a, −a, −a, a, a, −a, −a, a}
{x, −v, −z, t, B, −r, −D, p, −E, −q, C, s, −A, −u, y, w, −w, −y, u, A, −s, −C, q, E, −p, D, r, −B, −t, z, v, −x}
{l, −j, −n, h, −o, m, k, −k, −m, i, o, −h, n, j, −l, −l, j, n, −h, o, i, −m, −k, k, m, −o, h, −n, −j, 1}
{y, −s, −E, r, −z, −x, t, D, −q, A, w, −u, −C, p, −B, −v, v, B, −p, C, u, −w, −A, q, −D, −t, x, z, −r, E, s, −y}
{f, −d, g, e, −e, −g, d, −f, −f, d, −g, −e, e, g, −d, f, f, −d, g, e, −e, −g, d, −f, −f, d, −g, −e, e, g, −d, f}
{z, −p, A, y, −q, B, x, −r, C, w, −s, D, v, −t, E, u, −u, −E, t, −v, −D, s, −w, −C, r, −x, −B, q, −y, −A, p, −z}
{m, −h, l, n, k, o, −j, j, −o, −k, i, −n, −l, h, −m, −m, h, −l, −n, i, −k, −o, j, −j, o, k, n, l, −h, m}
{A, −r, v, −E, −w, q, −z, −B, s, −u, D, x, −p, y, C, −t, t, −C, −y, p, −x, −D, u, −s, B, z, −q, w, E, −v, r, −A}
{c, −b, b, −c, −c, b, −b, c, c, −b, b, −c, −c, b, −b, c, c, −b, b, −c, −c, b, −b, c, c, −b, b, −c, −c, b, −b, c}
{B, −u, q, −x, E, y, −r, t, −A, −C, v, −p, w, −D, −z, s, −s, z, D, −w, p, −v, C, A, −t, r, −y, −E, x, −q, u, −B}
{n, −k, h, −j, m, o, −l, l, −o, −m, j, −h, k, −n, −n, k, −h, j, −m, −o, l, −l, o, m, −j, h, −k, n}
{C, −x, s, −q, v, −A, −E, z, −u, p, −t, y, −D, −B, w, −r, r, −w, B, D, −y, t, −p, u, −z, E, A, −v, q, −s, x, −C}
{g, −f, e, −d, d, −e, f, −g, −g, f, −e, d, −d, e, −f, g, g, −f, e, −d, d, −e, f, −g, −g, f, −e, d, −d, e, −f, g}
{D, −A, x, −u, r, −p, s, −v, y, −B, E, C, −z, w, −t, q, −q, t, −w, z, −C, −E, B, −y, v, −s, p, −r, u, −x, A, −D}
{o, −n, m, −l, k, −j, i, −h, h, j, −k, l, −m, n, −o, −o, n, −m, l, −k, j, h, −h, i, −j, k, −l, m, −n, o}
{E, −D, C, −B, A, −z, y, −x, w, −v, u, −t, s, −r, q, −p, p, −q, r, −s, t, −u, v, −w, x, −y, z, −A, B, −C, D, −E} where {a, b, c, d, e, f, g, h, i, j, k, l, m, n, o, p, q, r, s, t, u, v, w, x, y, z, A, B, C, D, E} can be elements of the set {{724, 946, 392, 1003, 852, 571, 198, 1020, 981, 901, 791, 649, 484, 298, 99, 1023, 1013, 993, 964, 926, 878, 822, 759, 688, 610, 526, 438, 345, 249, 150, 50},
{724, 946, 392, 1003, 852, 571, 198, 1020, 981, 901, 791, 649, 484, 298, 99, 1021, 1011, 995, 965, 925, 880, 821, 760, 688, 610, 526, 438, 345, 249, 150, 50},
{724, 946, 392, 1003, 852, 571, 198, 1020, 981, 901, 791, 649, 484, 298, 99, 1021, 1012, 994, 964, 926, 879, 821, 760, 688, 610, 526, 438, 345, 249, 150, 50},
{724, 946, 392, 1003, 852, 571, 198, 1020, 981, 901, 791, 649, 484, 298, 99, 1021, 1012, 994, 965, 925, 879, 822, 760, 688, 610, 526, 438, 345, 249, 150, 50},
{724, 946, 392, 1003, 852, 571, 198, 1020, 981, 901, 791, 649, 484, 298, 99, 1021, 1012, 995, 964, 926, 880, 821, 761, 688, 610, 526, 438, 345, 249, 150, 50},
{724, 946, 392, 1003, 852, 571, 198, 1020, 981, 901, 791, 649, 484, 298, 99, 1021, 1012, 995, 965, 926, 880, 820, 760, 688, 610, 526, 438, 345, 249, 150, 50},
{724, 946, 392, 1003, 852, 571, 198, 1020, 981, 901, 791, 649, 484, 298, 99, 1021, 1012, 995, 965, 926, 880, 821, 760, 688, 610, 526, 438, 345, 249, 150, 50},
{724, 946, 392, 1003, 852, 571, 198, 1020, 981, 901, 791, 649, 484, 298, 99, 1022, 1012, 995, 964, 926, 880, 820, 759, 688, 610, 526, 438, 345, 249, 150, 50},
{724, 946, 392, 1003, 852, 571, 198, 1020, 981, 901, 791, 649, 484, 298, 99, 1022, 1012, 995, 964, 926, 880, 821, 760, 688, 610, 526, 438, 345, 249, 150, 50},
{724, 946, 392, 1003, 852, 571, 198, 1020, 981, 901, 791, 649, 484, 298, 99, 1023, 1012, 995, 963, 926, 880, 821, 759, 688, 610, 526, 438, 345, 249, 150, 50},
{724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50}}

10-Bit 64-Point DCT-2:

{aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa}
{bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck, −ck, −cj, −ci, −ch, −cg, −cf, −ce, −cd, −cc, −cb, −ca, −bz, −by, −bx, −bw, −by, −bu, −bt, −bs, −br, −bq, −bp, −bo, −bn, −bm, −bl, −bk, −bj, −bi, −bh, −bg, −bf}

{ap, aq, ar, as, at, au, av, aw, ax, ay, az, ba, bb, bc, bd, be, −be, −bd, −bc, −bb, −ba, −az, −ay, −ax, −aw, −av, −au, −at, −as, −ar, −aq, −ap, −ap, −aq, −ar, −as, −at, −au, −av, −aw, −ax, −ay, −az, −ba, −bb, −bc, −bd, −be, be, bd, bc, bb, ba, az, ay, ax, aw, av, au, at, as, ar, aq, ap}

{bg, bj, bm, bp, bs, by, by, cb, ce, ch, ck, −ci, −cf, −cc, −bz, −bw, −bt, −bq, −bn, −bk, −bh, −bf, −bi, −bl, −bo, −br, −bu, −bx, −ca, −cd, −cg, −cj, cj, cg, cd, ca, bx, bu, br, bo, bl, bi, bf, bh, bk, bn, bq, bt, bw, bz, cc, cf, ci, −ck, −ch, −ce, −cb, −by, −by, −bs, −bp, −bm, −bj, −bg}

{ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah, ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah}

{bh, bm, br, bw, cb, cg, −ck, −cf, −ca, −by, −bq, −bl, −bg, −bi, −bn, −bs, −bx, −cc, −ch, cj, ce, bz, bu, bp, bk, bf, bj, bo, bt, by, cd, ci, −ci, −cd, −by, −bt, −bo, −bj, −bf, −bk, −bp, −bu, −bz, −ce, −cj, ch, cc, bx, bs, bn, bi, bg, bl, bq, bv, ca, cf, ck, −cg, −cb, −bw, −br, −bm, −bh}

{aq, at, aw, az, bc, −be, −bb, −ay, −av, −as, −ap, −ar, −au, −ax, −ba, −bd, bd, ba, ax, au, ar, ap, as, av, ay, bb, be, −bc, −az, −aw, −at, −aq, −aq, −at, −aw, −az, −bc, be, bb, ay, av, as, ap, ar, au, ax, ba, bd, −bd, −ba, −ax, −au, −ar, −ap, −as, −av, −ay, −bb, −be, bc, az, aw, at, aq}

{bi, bp, bw, cd, ck, −ce, −bx, −bq, −bj, −bh, −bo, −by, −cc, −cj, cf, by, br, bk, bg, bn, bu, cb, ci, −cg, −bz, −bs, −bl, −bf, −bm, −bt, −ca, −ch, ch, ca, bt, bm, bf, bl, bs, bz, cg, −ci, −cb, −bu, −bn, −bg, −bk, −br, −by, −cf, cj, cc, by, bo, bh, bj, bq, bx, ce, −ck, −cd, −bw, −bp, −bi}

{ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad}

{bj, bs, cb, ck, −cc, −bt, −bk, −bi, −br, −ca, −cj, cd, bu, bl, bh, bq, bz, ci, −ce, −by, −bm, −bg, −bp, −by, −ch, cf, bw, bn, bf, bo, bx, cg, −cg, −bx, −bo, −bf, −bn, −bw, −cf, ch, by, bp, bg, bm, by, ce, −ci, −bz, −bq, −bh, −bl, −bu, −cd, cj, ca, br, bi, bk, bt, cc, −ck, −cb, −bs, −bj}

{ar, aw, bb, −bd, −ay, −at, −ap, −au, −az, −be, ba, av, aq, as, ax, bc, −bc, −ax, −as, −aq, −av, −ba, be, az, au, ap, at, ay, bd, −bb, −aw, −ar, −ar, −aw, −bb, bd, ay, at, ap, au, az, be, −ba, −av, −aq, −as, −ax, −bc, bc, ax, as, aq, av, ba, −be, −az, −au, −ap, −at, −ay, −bd, bb, aw, ar}

{bk, by, cg, −ce, −bt, −bi, −bm, −bx, −ci, cc, br, bg, bo, bz, ck, −ca, −bp, −bf, −bq, −cb, cj, by, bn, bh, bs, cd, −ch, −bw, −bl, −bj, −bu, −cf, cf, bu, bj, bl, bw, ch, −cd, −bs, −bh, −bn, −by, −cj, cb, bq, bf, bp, ca, −ck, −bz, −bo, −bg, −br, −cc, ci, bx, bm, bi, bt, ce, −cg, −by, −bk}

{ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai, ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai}

{bl, by, −ck, −bx, −bk, −bm, −bz, cj, bw, bj, bn, ca, −ci, −by, −bi, −bo, −cb, ch, bu, bh, bp, cc, −cg, −bt, −bg, −bq, −cd, cf, bs, bf, br, ce, −ce, −br, −bf, −bs, −cf, cd, bq, bg, bt, cg, −cc, −bp, −bh, −bu, −ch, cb, bo, bi, by, ci, −ca, −bn, −bj, −bw, −cj, bz, bm, bk, bx, ck, −by, −bl}

{as, az, −bd, −aw, −ap, −av, −bc, ba, at, ar, ay, −be, −ax, −aq, −au, −bb, bb, au, aq, ax, be, −ay, −ar, −at, −ba, bc, av, ap, aw, bd, −az, −as, −as, −az, bd, aw, ap, av, bc, −ba, −at, −ar, −ay, be, ax, aq, au, bb, −bb, −au, −aq, −ax, −be, ay, ar, at, ba, −bc, −av, −ap, −aw, −bd, az, as}

{bm, cb, −cf, −bq, −bi, −bx, cj, bu, bf, bt, ci, −by, −bj, −bp, −ce, cc, bn, bl, ca, −cg, −br, −bh, −bw, ck, by, bg, bs, ch, −bz, −bk, −bo, −cd, cd, bo, bk, bz, −ch, −bs, −bg, −by, −ck, bw, bh, br, cg, −ca, −bl, −bn, −cc, ce, bp, bj, by, −ci, −bt, −bf, −bu, −cj, bx, bi, bq, cf, −cb, −bm}

{ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab}

{bn, ce, −ca, −bj, −br, −ci, bw, bf, by, −cj, −bs, −bi, −bz, cf, bo, bm, cd, −cb, −bk, −bq, −ch, bx, bg, bu, −ck, −bt, −bh, −by, cg, bp, bl, cc, −cc, −bl, −bp, −cg, by, bh, bt, ck, −bu, −bg, −bx, ch, bq, bk, cb, −cd, −bm, −bo, −cf, bz, bi, bs, cj, −by, −bf, −bw, ci, br, bj, ca, −ce, −bn}

{at, bc, −ay, −ap, −ax, bd, au, as, bb, −az, −aq, −aw, be, av, ar, ba, −ba, −ar, −av, −be, aw, aq, az, −bb, −as, −au, −bd, ax, ap, ay, −bc, −at, −at, −bc, ay, ap, ax, −bd, −au, −as, −bb, az, aq, aw, −be, −av, −ar, −ba, ba, ar, av, be, −aw, −aq, −az, bb, as, au, bd, −ax, −ap, −ay, bc, at}

{bo, ch, −by, −bh, −ca, cc, bj, bt, −cj, −bq, −bm, −cf, bx, bf, by, −ce, −bl, −br, −ck, bs, bk, cd, −bz, −bg, −bw, cg, bn, bp, ci, −bu, −bi, −cb, cb, bi, bu, −ci, −bp, −bn, −cg, bw, bg, bz, −cd, −bk, −bs, ck, br, bl, ce, −by, −bf, −bx, cf, bm, bq, cj, −bt, −bj, −cc, ca, bh, by, −ch, −bo}

{aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj, aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj}

{bp, ck, −bq, −bo, −cj, br, bn, ci, −bs, −bm, −ch, bt, bl, cg, −bu, −bk, −cf, by, bj, ce, −bw, −bi, −cd, bx, bh, cc, −by, −bg, −cb, bz, bf, ca, −ca, −bf, −bz, cb, bg, by, −cc, −bh, −bx, cd, bi, bw, −ce, −bj, −by, cf, bk, bu, −cg, −bl, −bt, ch, bm, bs, −ci, −bn, −br, cj, bo, bq, −ck, −bp}

{au, −be, −at, −av, bd, as, aw, −bc, −ar, −ax, bb, aq, ay, −ba, −ap, −az, az, ap, ba, −ay, −aq, −bb, ax, ar, bc, −aw, −as, −bd, av, at, be, −au, −au, be, at, av, −bd, −as, −aw, bc, ar, ax, −bb, −aq, −ay, ba, ap, az, −az, −ap, −ba, ay, aq, bb, −ax, −ar, −bc, aw, as, bd, −av, −at, −be, au}

{bq, −ci, −bl, −by, cd, bg, ca, −by, −bi, −cf, bt, bn, ck, −bo, −bs, cg, bj, bx, −cb, −bf, −cc, bw, bk, ch, −br, −bp, cj, bm, bu, −ce, −bh, −bz, bz, bh, ce, −bu, −bm, −cj, bp, br, −ch, −bk, −bw, cc, bf, cb, −bx, −bj, −cg, bs, bo, −ck, −bn, −bt, cf, bi, by, −ca, −bg, −cd, by, bl, ci, −bq}

{ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae}

{br, −cf, −bg, −cc, bu, bo, −ci, −bj, −bz, bx, bl, ck, −bm, −bw, ca, bi, ch, −bp, −bt, cd, bf, ce, −bs, −bq, cg, bh, cb, −by, −bn, cj, bk, by, −by, −bk, −cj, bn, by, −cb, −bh, −cg, bq, bs, −ce, −bf, −cd, bt, bp, −ch, −bi, −ca, bw, bm, −ck, −bl, −bx, bz, bj, ci, −bo, −bu, cc, bg, cf, −br}

{av, −bb, −ap, −bc, au, aw, −ba, −aq, −bd, at, ax, −az, −ar, −be, as, ay, −ay, −as, be, ar, az, −ax, −at, bd, aq, ba, −aw, −au, bc, ap, bb, −av, −av, bb, ap, bc, −au, −aw, ba, aq, bd, −at, −ax, az, ar, be, −as, −ay, ay, as, −be, −ar, −az, ax, at, −bd, −aq, −ba, aw, au, −bc, −ap, −bb, av}

{bs, −cc, −bi, −cj, bl, bz, −by, −bp, cf, bf, cg, −bo, −bw, by, bm, −ci, −bh, −cd, br, bt, −cb, −bj, −ck, bk, ca, −bu, −bq, ce, bg, ch, −bn, −bx, bx, bn, −ch, −bg, −ce, bq, bu, −ca, −bk, ck, bj, cb, −bt, −br, cd, bh, ci, −bm, −by, bw, bo, −cg, −bf, −cf, bp, by, −bz, −bl, cj, bi, cc, −bs}

{ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak, ak, −am, −ai, ao, ah, an, −aj,

−al, al, aj, −an, −ah, −ao, ai, am, −ak, −ak, am, ai, −ao, −ah, −an, aj, al, −al, −aj, an, ah, ao, −ai, −am, ak}

{bt, −bz, −bn, cf, bh, ck, −bi, −ce, bo, by, −bu, −bs, ca, bm, −cg, −bg, −cj, bj, cd, −bp, −bx, by, br, −cb, −bl, ch, bf, ci, −bk, −cc, bq, bw, −bw, −bq, cc, bk, −ci, −bf, −ch, bl, cb, −br, −by, bx, bp, −cd, −bj, cj, bg, cg, −bm, −ca, bs, bu, −by, −bo, ce, bi, −ck, −bh, −cf, bn, bz, −bt}

{aw, −ay, −au, ba, as, −bc, −aq, be, ap, bd, −ar, −bb, at, az, −av, −ax, ax, av, −az, −at, bb, ar, −bd, −ap, −be, aq, bc, −as, −ba, au, ay, −aw, −aw, ay, au, −ba, −as, bc, aq, −be, −ap, −bd, ar, bb, −at, −az, av, ax, −ax, −av, az, at, −bb, −ar, bd, ap, be, −aq, −bc, as, ba, −au, −ay, aw}

{bu, −bw, −bs, by, bq, −ca, −bo, cc, bm, −ce, −bk, cg, bi, −ci, −bg, ck, bf, cj, −bh, −ch, bj, cf, −bl, −cd, bn, cb, −bp, −bz, br, bx, −bt, −by, by, bt, −bx, −br, bz, bp, −cb, −bn, cd, bl, −cf, −bj, ch, bh, −cj, −bf, −ck, bg, ci, −bi, −cg, bk, ce, −bm, −cc, bo, ca, −bq, −by, bs, bw, −bu}

{aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa}

{bv, −bt, −bx, br, bz, −bp, −cb, bn, cd, −bl, −cf, bj, ch, −bh, −cj, bf, −ck, −bg, ci, bi, −cg, −bk, ce, bm, −cc, −bo, ca, bq, −by, −bs, bw, bu, −bu, −bw, bs, by, −bq, −ca, bo, cc, −bm, −ce, bk, cg, −bi, −ci, bg, ck, −bf, cj, bh, −ch, −bj, cf, bl, −cd, −bn, cb, bp, −bz, −br, bx, bt, −by}

{ax, −av, −az, at, bb, −ar, −bd, ap, −be, −aq, bc, as, −ba, −au, ay, aw, −aw, −ay, au, ba, −as, −bc, aq, be, −ap, bd, ar, −bb, −at, az, av, −ax, −ax, av, az, −at, −bb, ar, bd, −ap, be, aq, −bc, −as, ba, au, −ay, −aw, aw, ay, −au, −ba, as, bc, −aq, −be, ap, −bd, −ar, bb, at, −az, −av, ax}

{bw, −bq, −cc, bk, ci, −bf, ch, bl, −cb, −br, by, bx, −bp, −cd, bj, cj, −bg, cg, bm, −ca, −bs, bu, by, −bo, −ce, bi, ck, −bh, cf, bn, −bz, −bt, bt, bz, −bn, −cf, bh, −ck, −bi, ce, bo, −by, −bu, bs, ca, −bm, −cg, bg, −cj, −bj, cd, bp, −bx, −by, br, cb, −bl, −ch, bf, −ci, −bk, cc, bq, −bw}

{al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al, al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al}

{bx, −bn, −ch, bg, −ce, −bq, bu, ca, −bk, −ck, bj, −cb, −bt, br, cd, −bh, ci, bm, −by, −bw, bo, cg, −bf, cf, bp, −by, −bz, bl, cj, −bi, cc, bs, −bs, −cc, bi, −cj, −bl, bz, by, −bp, −cf, bf, −cg, −bo, bw, by, −bm, −ci, bh, −cd, −br, bt, cb, −bj, ck, bk, −ca, −bu, bq, ce, −bg, ch, bn, −bx}

{ay, −as, −be, ar, −az, −ax, at, bd, −aq, ba, aw, −au, −bc, ap, −bb, −av, av, bb, −ap, bc, au, −aw, −ba, aq, −bd, −at, ax, az, −ar, be, as, −ay, −ay, as, be, −ar, az, ax, −at, −bd, aq, −ba, −aw, au, bc, −ap, bb, av, −av, −bb, ap, −bc, −au, aw, ba, −aq, bd, at, −ax, −az, ar, −be, −as, ay}

{by, −bk, cj, bn, −by, −cb, bh, −cg, −bq, bs, ce, −bf, cd, bt, −bp, −ch, bi, −ca, −bw, bm, ck, −bl, bx, bz, −bj, ci, bo, −bu, −cc, bg, −cf, −br, br, cf, −bg, cc, bu, −bo, −ci, bj, −bz, −bx, bl, −ck, −bm, bw, ca, −bi, ch, bp, −bt, −cd, bf, −ce, −bs, bq, cg, −bh, cb, by, −bn, −cj, bk, −by}

{af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af}

{bz, −bh, ce, bu, −bm, cj, bp, −br, −ch, bk, −bw, −cc, bf, −cb, −bx, bj, −cg, −bs, bo, ck, −bn, bt, cf, −bi, by, ca, −bg, cd, by, −bl, ci, bq, −bq, −ci, bl, −by, −cd, bg, −ca, −by, bi, −cf, −bt, bn, −ck, −bo, bs, cg, −bj, bx, cb, −bf, cc, bw, −bk, ch, br, −bp, −cj, bm, −bu, −ce, bh, −bz}

{az, −ap, ba, ay, −aq, bb, ax, −ar, bc, aw, −as, bd, av, −at, be, au, −au, −be, at, −av, −bd, as, −aw, −bc, ar, −ax, −bb, aq, −ay, −ba, ap, −az, −az, ap, −ba, −ay, aq, −bb, −ax, ar, −bc, −aw, as, −bd, −av, at, −be, −au, au, be, −at, av, bd, −as, aw, bc, −ar, ax, bb, −aq, ay, ba, −ap, az}

{ca, −bf, bz, cb, −bg, by, cc, −bh, bx, cd, −bi, bw, ce, −bj, by, cf, −bk, bu, cg, −bl, bt, ch, −bm, bs, ci, −bn, br, cj, −bo, bq, ck, −bp, bp, −ck, −bq, bo, −cj, −br, bn, −ci, −bs, bm, −ch, −bt, bl, −cg, −bu, bk, −cf, −by, bj, −ce, −bw, bi, −cd, −bx, bh, −cc, −by, bg, −cb, −bz, bf, −ca}

{am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am, am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am}

{cb, −bi, bu, ci, −bp, bn, −cg, −bw, bg, −bz, −cd, bk, −bs, −ck, br, −bl, ce, by, −bf, bx, cf, −bm, bq, −cj, −bt, bj, −cc, −ca, bh, −by, −ch, bo, −bo, ch, by, −bh, ca, cc, −bj, bt, cj, −bq, bm, −cf, −bx, bf, −by, −ce, bl, −br, ck, bs, −bk, cd, bz, −bg, bw, cg, −bn, bp, −ci, −bu, bi, −cb}

{ba, −ar, av, −be, −aw, aq, −az, −bb, as, −au, bd, ax, −ap, ay, bc, −at, at, −bc, −ay, ap, −ax, −bd, au, −as, bb, az, −aq, aw, be, −av, ar, −ba, −ba, ar, −av, be, aw, −aq, az, bb, −as, au, −bd, −ax, ap, −ay, −bc, at, −at, bc, ay, −ap, ax, bd, −au, as, −bb, −az, aq, −aw, −be, av, −ar, ba}

{cc, −bl, bp, −cg, −by, bh, −bt, ck, bu, −bg, bx, ch, −bq, bk, −cb, −cd, bm, −bo, cf, bz, −bi, bs, −cj, −by, bf, −bw, −ci, br, −bj, ca, ce, −bn, bn, −ce, −ca, bj, −br, ci, bw, −bf, by, cj, −bs, bi, −bz, −cf, bo, −bm, cd, cb, −bk, bq, −ch, −bx, bg, −bu, −ck, bt, −bh, by, cg, −bp, bl, −cc}

{ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac}

{cd, −bo, bk, −bz, −ch, bs, −bg, by, −ck, −bw, bh, −br, cg, ca, −bl, bn, −cc, −ce, bp, −bj, by, ci, −bt, bf, −bu, cj, bx, −bi, bq, −cf, −cb, bm, −bm, cb, cf, −bq, bi, −bx, −cj, bu, −bf, bt, −ci, −by, bj, −bp, ce, cc, −bn, bl, −ca, −cg, br, −bh, bw, ck, −by, bg, −bs, ch, bz, −bk, bo, −cd}

{bb, −au, aq, −ax, be, ay, −ar, at, −ba, −bc, av, −ap, aw, −bd, −az, as, −as, az, bd, −aw, ap, −av, bc, ba, −at, ar, −ay, −be, ax, −aq, au, −bb, −bb, au, −aq, ax, −be, −ay, ar, −at, ba, bc, −av, ap, −aw, bd, az, −as, as, −az, −bd, aw, −ap, av, −bc, −ba, at, −ar, ay, be, −ax, aq, −au, bb}

{ce, −br, bf, −bs, cf, cd, −bq, bg, −bt, cg, cc, −bp, bh, −bu, ch, cb, −bo, bi, −by, ci, ca, −bn, bj, −bw, cj, bz, −bm, bk, −bx, ck, by, −bl, bl, −by, −ck, bx, −bk, bm, −bz, −cj, bw, −bj, bn, −ca, −ci, by, −bi, bo, −cb, −ch, bu, −bh, bp, −cc, −cg, bt, −bg, bq, −cd, −cf, bs, −bf, br, −ce}

{an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an, an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an}

{cf, −bu, bj, −bl, bw, −ch, −cd, bs, −bh, bn, −by, cj, cb, −bq, bf, −bp, ca, ck, −bz, bo, −bg, br, −cc, −ci, bx, −bm, bi, −bt, ce, cg, −by, bk, −bk, by, −cg, −ce, bt, −bi, bm, −bx, ci, cc, −br, bg, −bo, bz, −ck, −ca, bp, −bf, bq, −cb, −cj, by, −bn, bh, −bs, cd, ch, −bw, bl, −bj, bu, −cf}

{bc, −ax, as, −aq, av, −ba, −be, az, −au, ap, −at, ay, −bd, −bb, aw, −ar, ar, −aw, bb, bd, −ay, at, −ap, au, −az, be, ba, −av, aq, −as, ax, −bc, −bc, ax, −as, aq, −av, ba, be, −az, au, −ap, at, −ay, bd, bb, −aw, ar, −ar, aw, −bb, −bd, ay, −at, ap, −au, az, −be, −ba, av, −aq, as, −ax, bc}

{cg, −bx, bo, −bf, bn, −bw, cf, ch, −by, bp, −bg, bm, −by, ce, ci, −bz, bq, −bh, bl, −bu, cd, cj, −ca, br, −bi, bk, −bt, cc, ck, −cb, bs, −bj, bj, −bs, cb, −ck, −cc, bt, −bk, bi, −br, ca, −cj, −cd, bu, −bl, bh, −bq, bz, −ci, −ce, by, −bm, bg, −bp, by, −ch, −cf, bw, −bn, bf, −bo, bx, −cg}

{ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag}

{ch, −ca, bt, −bm, bf, −bl, bs, −bz, cg, ci, −cb, bu, −bn, bg, −bk, br, −by, cf, cj, −cc, by, −bo, bh, −bj, bq, −bx, ce, ck, −cd, bw, −bp, bi, −bi, bp, −bw, cd, −ck, −ce, bx, −bq, bj, −bh, bo, −by, cc, −cj, −cf, by, −br, bk, −bg, bn, −bu, cb, −ci, −cg, bz, −bs, bl, −bf, bm, −bt, ca, −ch}

{bd, −ba, ax, −au, ar, −ap, as, −av, ay, −bb, be, bc, −az, aw, −at, aq, −aq, at, −aw, az, −bc, −be, bb, −ay, av, −as, ap, −ar, au, −ax, ba, −bd, −bd, ba, −ax, au, −ar, ap, −as, av, −ay, bb, −be, −bc, az, −aw, at, −aq, aq, −at, aw, −az, bc, be, −bb, ay, −av, as, −ap, ar, −au, ax, −ba, bd}

{ci, −cd, by, −bt, bo, −bj, bf, −bk, bp, −bu, bz, −ce, cj, ch, −cc, bx, −bs, bn, −bi, bg, −bl, bq, −bv, ca, −cf, ck, cg, −cb, bw, −br, bm, −bh, bh, −bm, br, −bw, cb, −cg, −ck, cf, −ca, by, −bq, bl, −bg, bi, −bn, bs, −bx, cc, −ch, −cj, ce, −bz, bu, −bp, bk, −bf, bj, −bo, bt, −by, cd, −ci}

{ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao, ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao}

{cj, −cg, cd, −ca, bx, −bu, br, −bo, bl, −bi, bf, −bh, bk, −bn, bq, −bt, bw, −bz, cc, −cf, ci, ck, −ch, ce, −cb, by, −by, bs, −bp, bm, −bj, bg, −bg, bj, −bm, bp, −bs, by, −by, cb, −ce, ch, −ck, −ci, cf, −cc, bz, −bw, bt, −bq, bn, −bk, bh, −bf, bi, −bl, bo, −br, bu, −bx, ca, −cd, cg, −cj}

{be, −bd, bc, −bb, ba, −az, ay, −ax, aw, −av, au, −at, as, −ar, aq, −ap, ap, −aq, ar, −as, at, −au, av, −aw, ax, −ay, az, −ba, bb, −bc, bd, −be, −be, bd, −bc, bb, −ba, az, −ay, ax, −aw, av, −au, at, −as, ar, −aq, ap, −ap, aq, −ar, as, −at, au, −av, aw, −ax, ay, −az, ba, −bb, bc, −bd, be}

{ck, −cj, ci, −ch, cg, −cf, ce, −cd, cc, −cb, ca, −bz, by, −bx, bw, −by, bu, −bt, bs, −br, bq, −bp, bo, −bn, bm, −bl, bk, −bj, bi, −bh, bg, −bf, bf, −bg, bh, −bi, bj, −bk, bl, −bm, bn, −bo, bp, −bq, br, −bs, bt, −bu, by, −bw, bx, −by, bz, −ca, cb, −cc, cd, −ce, cf, −cg, ch, −ci, cj, −ck} where {aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck} can be elements of the set {{724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1024, 1021, 1016, 1009, 999, 987, 972, 955, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1022, 1021, 1016, 1008, 1000, 987, 972, 956, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1022, 1021, 1017, 1008, 1000, 987, 973, 956, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1023, 1020, 1017, 1008, 1000, 987, 973, 955, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1023, 1020, 1017, 1008, 1000, 987, 973, 956, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1023, 1021, 1016, 1008, 999, 987, 972, 956, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1023, 1021, 1016, 1008, 1000, 987, 972, 956, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1023, 1021, 1017, 1008, 999, 987, 973, 956, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1023, 1021, 1017, 1008, 1000, 986, 973, 956, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1023, 1021, 1017, 1008, 1000, 987, 973, 955, 936, 915, 891, 865, 837, 807, 775, 742, 706, 669, 630, 590, 548, 505, 460, 415, 369, 321, 273, 224, 175, 125, 75, 25}, {724, 946, 392, 1003, 852, 571, 198, 1020, 981, 901, 791, 649, 484, 298, 99, 1023, 1013, 993, 963, 926, 878, 823, 759, 688, 610, 527, 438, 345, 249, 150, 50, 1024, 1021, 1016, 1009, 999, 987, 972, 955, 936, 915, 891, 8 65, 837, 807, 775, 741, 706, 669, 630, 589, 548, 504, 460, 415, 369, 321, 273, 224, 175, 125, 75, 25}}

10-Bit 32-Point LGT (DST-7):

{a, b, c, d, e, f, g, h, i, j, k, l, m, n, o, p, q, r, s, t, u, v, w, x, y, z, A, B, C, D, E, F,}

{c, f, i, l, o, r, u, x, A, D, F, C, z, w, t, q, n, k, h, e, b, −a, −d, −g, −j, −m, −p, −s, −v, −y, −B, −E,}

{e, j, o, t, y, D, D, y, t, o, j, e, 0, −e, −j, −o, −t, −y, −D, −D, −y, −t, −o, −j, −e, 0, e, j, o, t, y, D,}

{g, n, u, B, D, w, p, i, b, −e, −l, −s, −z, −F, −y, −r, −k, −d, c, j, q, x, E, A, t, m, f, −a, −h, −o, −v, −C,}

{i, r, A, C, t, k, b, −g, −p, −y, −E, −v, −m, −d, e, n, w, F, x, o, f, −c, −l, −u, −D, −z, −q, −h, a, j, s, B,}

{k, v, F, u, j, −a, −l, −w, −E, −t, b, m, x, D, s, h, −c, −n, −y, −C, −r, −g, d, o, z, B, q, f, −e, −p, −A,}

{m, z, z, m, 0, −m, −z, −z, −m, 0, m, z, z, m, 0, −m, −z, −z, −m, 0, m, z, z, m, 0, −m, −z, −z, −m, 0, m, z,}

{o, D, t, e, −j, −y, −y, −j, e, t, D, o, 0, −o, −D, −t, −e, j, y, y, j, −e, −t, −D, −o, 0, o, D, t, e, −j, −y,}
{q, E, n, −c, −t, −B, −k, f, w, y, h, −z, −v, −e, l, C, s, b, −o, −F, −p, a, r, D, m, −d, −u, −A, −j, g, x,}
{s, A, h, −k, −D, −p, c, v, x, e, −n, −F, −m, f, y, u, b, −q, −C, −j, i, B, r, −a, −t, −z, −g, l, E, o, −d, −w,}
{u, w, b, −s, −y, −d, q, A, f, −o, −C, −h, m, E, j, −k, −F, −l, i, D, n, −g, −B, −p, e, z, r, −c, −x, −t, a, v,}
{w, s, −d, −A, −o, h, E, k, −l, −D, −g, p, z, c, −t, −v, a, x, r, −e, −B, −n, i, F, j, −m, −C, −f, q, y, b, −u,}
{y, o, −j, −D, −e, t, t, −e, −D, −j, o, y, 0, −y, −o, j, D, e, −t, −t, e, D, j, −o, −y, 0, y, o, −j, −D, −e, t,}
{A, k, −p, −v, e, F, f, −u, −q, j, B, a, −z, −l, o, w, −d, −E, −g, t, r, −C, −b, y, m, −n, −x, c, D, h, −s,}
{C, g, −v, −n, o, u, −h, −B, a, D, f, −w, −m, p, t, −i, −A, b, E, e, −x, −l, q, s, −j, −z, c, F, d, −y, −k, r,}
{E, c, −B, −f, y, i, −v, −l, s, o, −p, −r, m, u, −j, −x, g, A, −d, −D, a, F, b, −C, −e, z, h, −w, −k, t, n, −q,}
{F, −a, −E, b, D, −c, −C, d, B, −e, −A, f, z, −g, −y, h, x, −w, j, v, −k, −u, l, t, −m, −s, n, r, −o, −q, p,}
{D, −e, −y, j, t, −o, −o, t, j, −y, −e, D, 0, −D, e, y, −j, −t, o, o, −t, −j, y, e, −D, 0, D, −e, −y, j, t, −o,}
{B, −s, r, j, −A, −a, C, −h, −t, q, k, −z, −b, D, −g, −u, p, l, −y, −c, E, −f, −v, o, m, −x, −d, F, −e, −w, n,}
{z, −m, −m, z, 0, −z, m, m, −z, 0, z, −m, −m, z, 0, −z, m, m, −z, 0, z, −m, −m, z, 0, −z, m, m, −z, 0, z, −m,}
{x, −q, −g, E, −j, −n, A, −c, −u, t, d, −B, m, k, −D, f, r, −w, −a, y, −p, −h, F, −o, z, −b, −v, s, e, −C, l,}
{v, −u, −a, w, −t, −b, x, −s, −c, y, −r, −d, z, −q, −e, A, −p, −f, B, −o, −g, C, −n, −h, D, −m, E, −1, −j, F, −k,}
{t, −y, e, o, −D, j, j, −D, o, e, −y, t, 0, −t, y, −e, −o, D, −j, −j, D, −o, −e, y, −t, 0, t, −y, e, o, −D, j,}
{r, −C, k, g, −y, v, −d, −n, F, −o, −c, u, −z, h, j, −B, s, −a, −q, D, −l, −f, x, −w, e, m, −E, p, b, −t, A, −i,}
{p, −F, q, −a, −o, E, −r, b, n, −D, s, −c, −m, C, −t, d, l, −B, u, −e, −k, A, −v, f, j, −z, w, −g, y, −x, h,}
{n, −B, w, −e, s, −F, r, −d, −j, x, −A, m, a, −o, C, −v, h, f, −t, E, −q, c, k, −y, z, −l, −b, p, −D, u, −g,}
{l, −x, C, −q, e, g, −s, E, −v, j, b, −n, z, −A, o, −c, u, −F, t, −h, −d, p, −B, y, −m, a, k, −w, D, −r, f,}
{j, −t, D, −y, o, −e, −e, o, −y, D, −t, j, 0, −j, t, −D, y, −o, e, e, −o, y, −D, t, −j, 0, j, −t, D, −y, o, −e,}
{h, −p, x, −F, y, −q, i, −a, −g, o, −w, E, −z, r, −j, b, f, −n, v, −D, A, −s, k, −c, −e, m, −u, C, −B, t, −l, d,}
{f, −l, r, −x, D, −C, w, −q, k, −e, −a, g, −m, s, −y, E, −B, v, −p, j, −d, −b, h, −n, t, −z, F, −A, u, −o, i, −c,}
{d, −h, l, −p, t, −x, B, −F, C, −y, u, −q, m, e, −a, −c, g, −k, o, −s, w, −A, E, −D, z, −v, r, −n, j, −f, b,}
{b, −d, f, −h, j, −l, n, −p, r, −t, v, −x, z, −B, D, −F, E, −C, A, −y, w, −u, s, −q, o, −m, k, g, −e, c, −a,}.

In one embodiment, {a, b, c, d, e, f, g, h, i, j, k, l, m, n, o, p, q, r, s, t, u, v, w, x, y, z, A, B, C, D, E, F} can be any element of the set:

{{49, 98, 147, 195, 243, 291, 337, 383, 428, 472, 515, 557, 597, 636, 674, 710, 744, 777, 807, 836, 863, 888, 9 11, 932, 950, 966, 980, 992, 1002, 1009, 1013, 1016},
{48, 98, 147, 195, 243, 291, 337, 383, 428, 472, 515, 557, 597, 636, 674, 710, 744, 777, 807, 836, 863, 888, 91 1, 932, 950, 966, 980, 992, 1002, 1009, 1013, 1016},
{49, 98, 147, 196, 243, 291, 338, 383, 428, 472, 515, 557, 597, 636, 674, 710, 744, 777, 807, 836, 863, 888, 91 1, 932, 950, 966, 980, 992, 1002, 1009, 1013, 1016},
{49, 98, 147, 195, 243, 291, 337, 383, 428, 472, 515, 556, 598, 637, 674, 709, 744, 777, 807, 836, 863, 888, 91 1, 932, 950, 966, 980, 992, 1002, 1009, 1013, 1016},
{49, 98, 147, 195, 243, 291, 337, 383, 428, 472, 515, 557, 597, 636, 674, 709, 744, 777, 807, 836, 863, 888, 91 1, 932, 950, 966, 980, 992, 1002, 1009, 1013, 1016},
{49, 98, 147, 195, 243, 291, 337, 383, 428, 472, 515, 557, 598, 636, 674, 709, 744, 777, 807, 836, 863, 888, 91 1, 932, 950, 966, 980, 992, 1002, 1009, 1013, 1016},
{49, 98, 147, 195, 243, 291, 337, 383, 428, 472, 515, 557, 597, 636, 674, 710, 744, 777, 807, 836, 863, 888, 91 1, 932, 950, 967, 981, 992, 1002, 1008, 1014, 1016}}.

Figure 4:
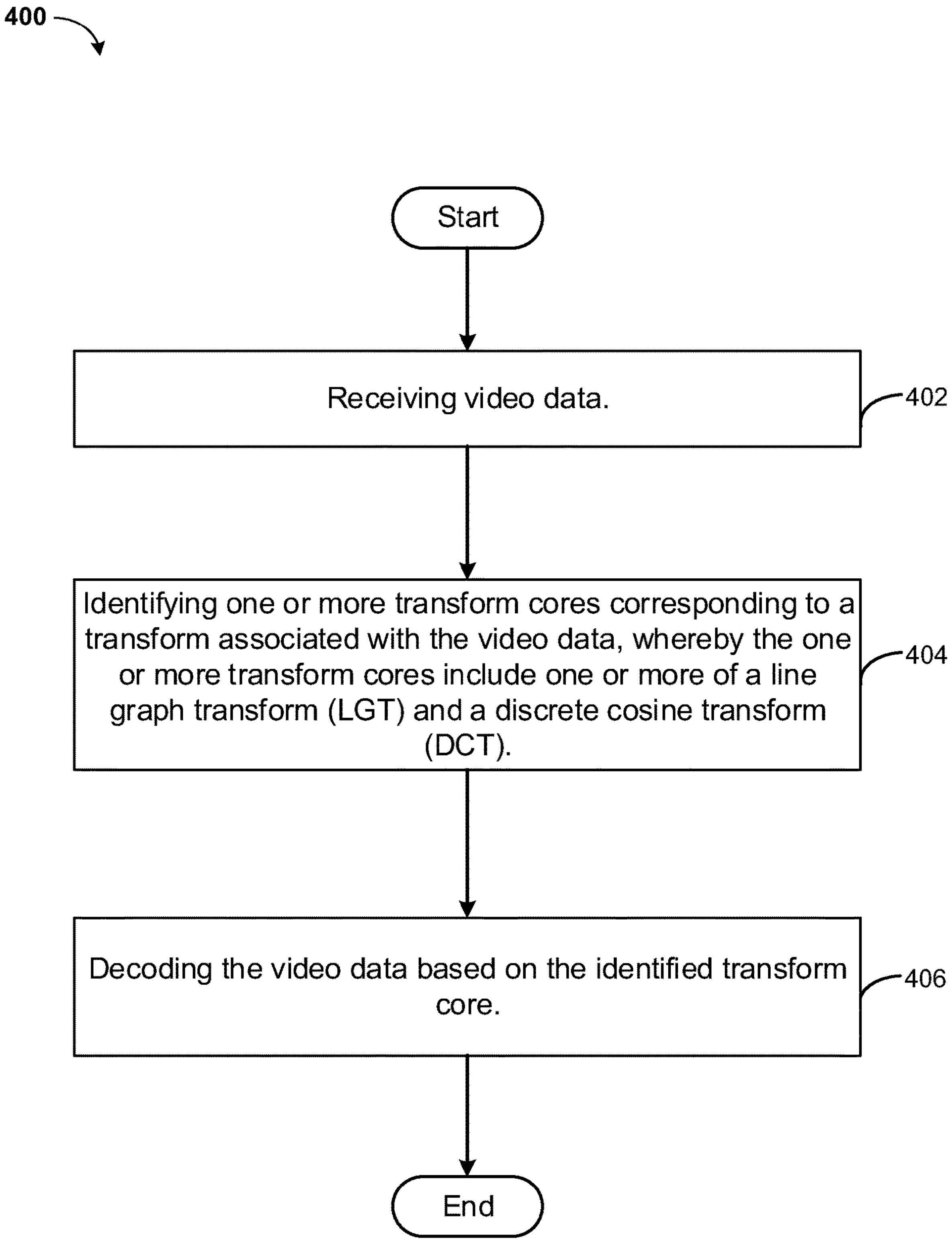
FIG. 4 is an operational flowchart illustrating the steps carried out by a program that codes video data, according to at least one embodiment.

Referring now to FIG. 4, an operational flowchart illustrating the steps of a method 400 for video coding is depicted. In some implementations, one or more process blocks of FIG. 4 may be performed by the computer 102 (FIG. 1) and the server computer 114 (FIG. 1). In some implementations, one or more process blocks of FIG. 4 may be performed by another device or a group of devices separate from or including the computer 102 and the server computer 114.

At 402, the method 400 includes receiving video data.

At 404, the method 400 includes identifying one or more transform cores corresponding to a transform associated with the video data. The one or more transform cores include one or more of a line graph transform (LGT) and a discrete cosine transform (DCT).

At 406, the method 400 includes decoding the video data based on the identified transform core.

It may be appreciated that FIG. 4 provides only an illustration of one implementation and does not imply any limitations with regard to how different embodiments may be implemented. Many modifications to the depicted environments may be made based on design and implementation requirements. For example, a method, without departing from the spirit of the instant application, may include identifying one or more transform cores corresponding to a transform associated with the video data, wherein the one or more transform cores include one or more of a line graph transform (LGT) and a discrete sine transform (DST). Furthermore, the method may include encoding the video data based on the identified transform core and transmitting the encoded video data.

Figure 5:
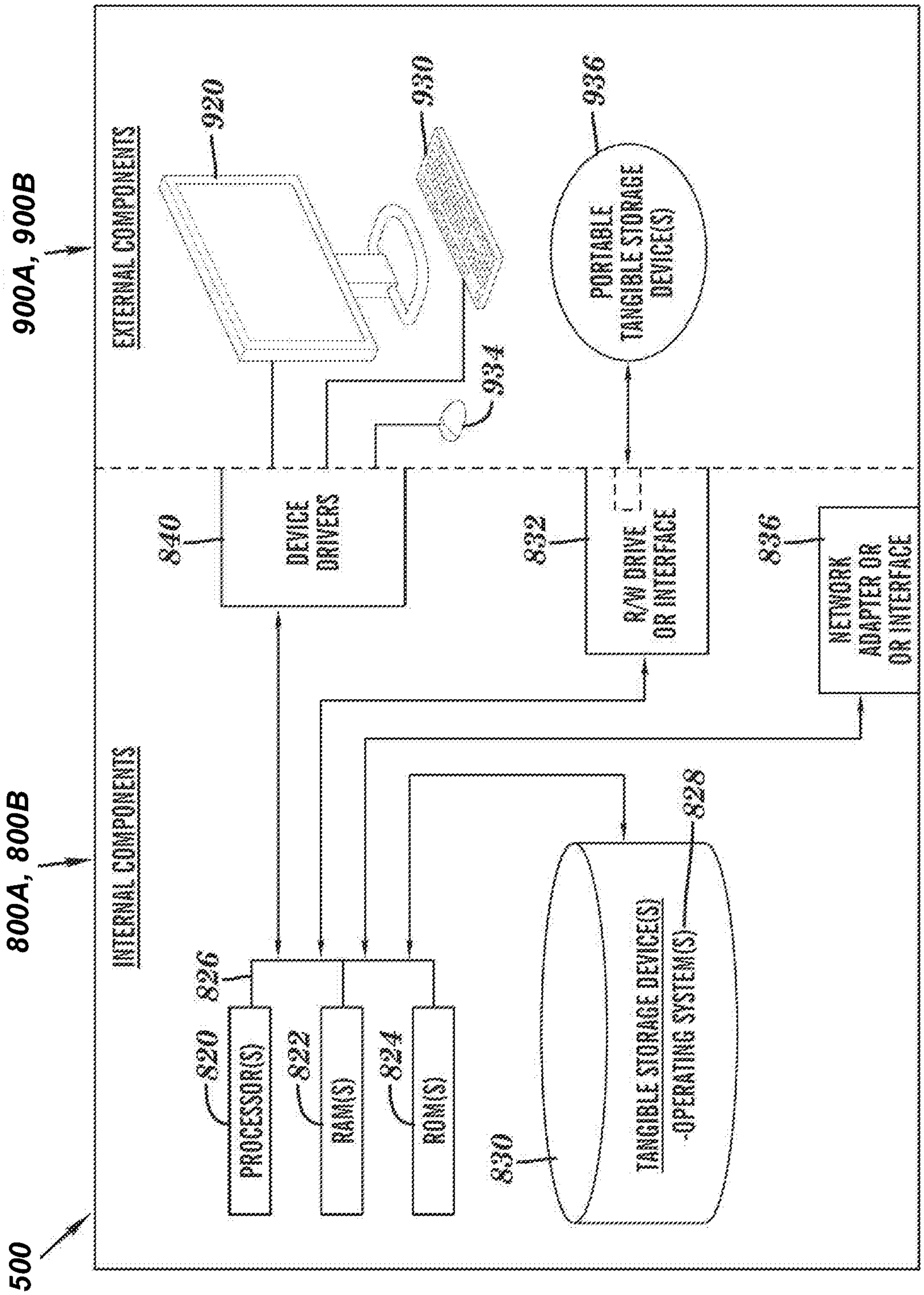
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Coding Program 116 (FIG. 1) on server computer 114 (FIG. 1) are stored on one or more of the respective computer-readable tangible storage devices 830 for execution by one or more of the respective processors 820 via one or more of the respective RAMS 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Coding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
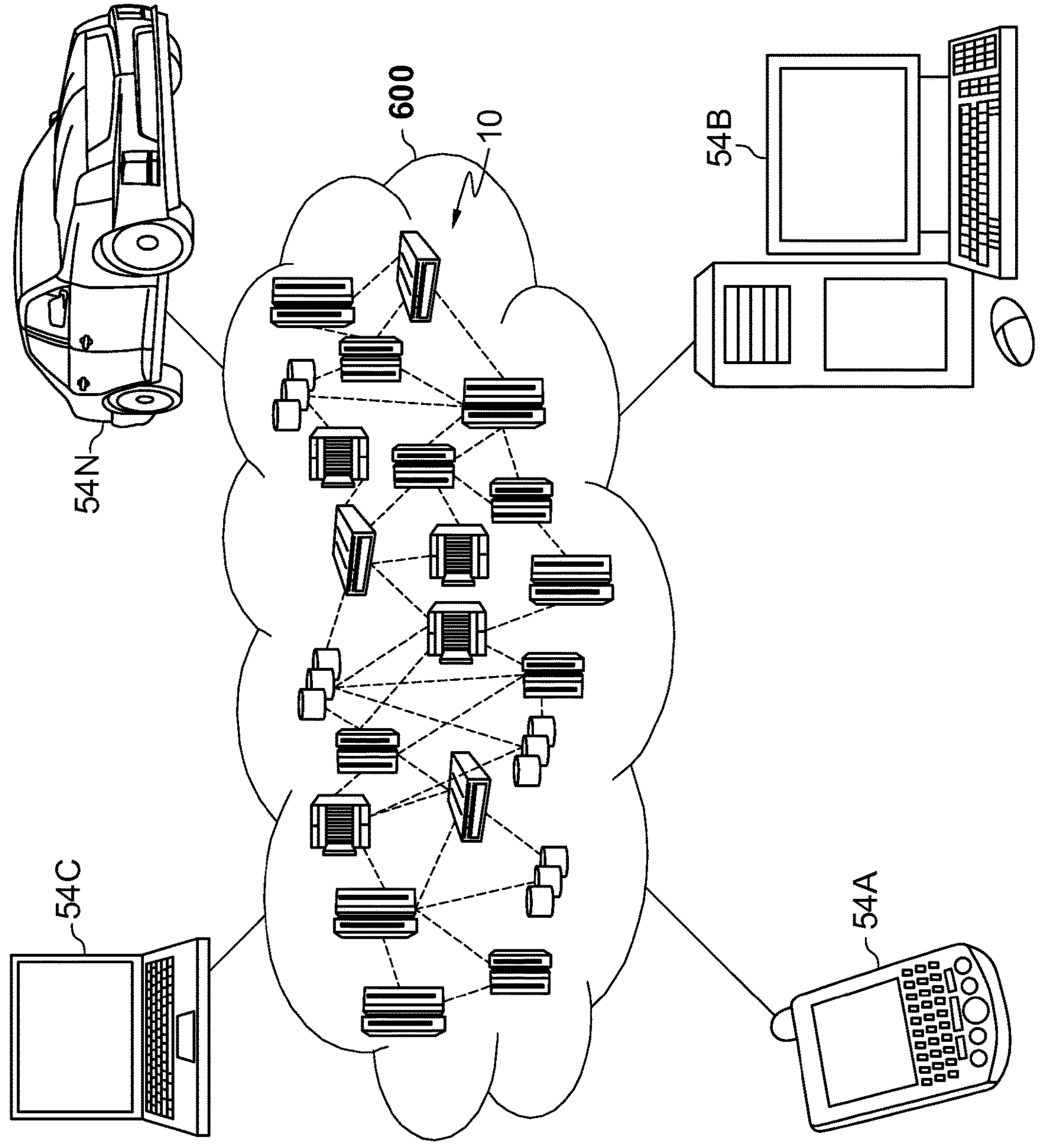
FIG. 6 is a block diagram of an illustrative cloud computing environment including the computer system depicted in FIG. 1, according to at least one embodiment.

Referring to FIG. 6, illustrative cloud computing environment 600 is depicted. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
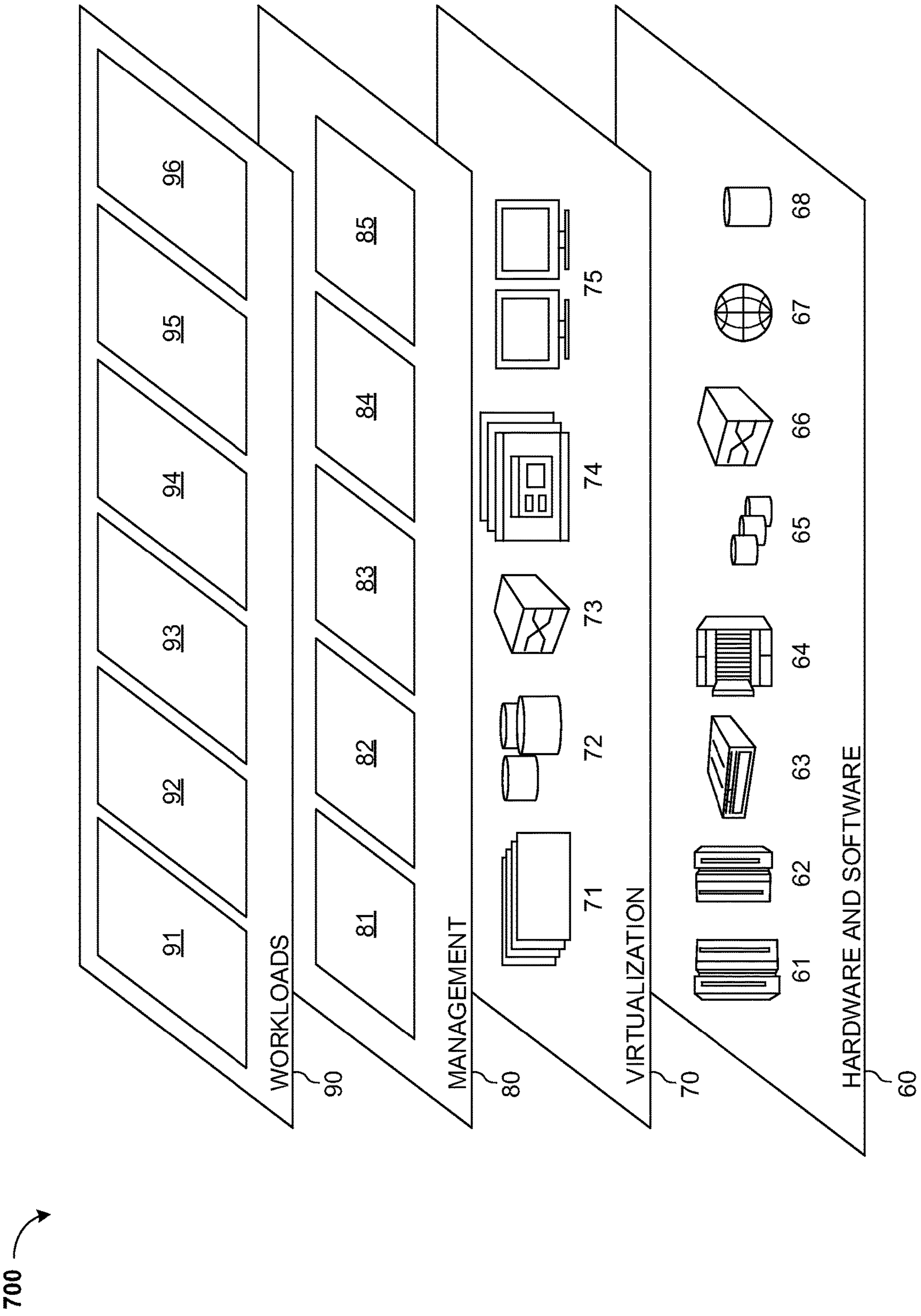
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Coding 96. Video Coding 96 may code video data based on line graph transforms.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for coding video data, executable by a processor, comprising:

receiving video data;

identifying one or more transform cores associated with the video data, wherein the one or more transform cores comprise one or more of a line graph transform (LGT) and a discrete cosine transform (DCT); and decoding the video data based on the identified one or more transform cores, wherein the transform cores correspond to one or more from among an 8-bit transform core and a 10-bit transform core, wherein the one or more transform cores correspond to one or more from among a 2-point transform, a 4-point transform, an 8-point transform, a 16-point transform, a 32-point transform, and a 64-point transform, wherein the one or more transform cores correspond to one or more from among a 2-point transform, a 4-point transform, an 8-point transform, a 16-point transform, a 32-point transform, and a 64-point transform, wherein the 4-point transform corresponding to the 8-bit transform core is a discrete cosine transform comprising the matrix:

{a, a, a, a}
{b, c, −c, −b}
{a, −a, −a, a}
{c, −b, b, −c}, and wherein {a, b, c} corresponds to one or more from among: {91, 118, 49}, {90, 118, 50}, {90, 119, 47}, {91, 118, 50}, and {91, 119, 47}.

2. The method of claim 1, wherein the 8 point-transform corresponding to the 8-bit transform core is a discrete cosine transform comprising the matrix:

{a, a, a, a, a, a, a, a}
{d, e, f, g, −g, −f, −e, −d}
{b, c, −c, −b, −b, −c, c, b}
{e, −g, −d, −f, f, d, g, −e}
{a, −a, −a, a, a, −a, −a, a}
{f, −d, g, e, −e, −g, d, −f}
{c, −b, b, −c, −c, b, −b, c}
{g, −f, e, −d, d, −e, f, −g}, wherein {a, b, c, d, e, f, g} corresponds to one or more from among:

{91, 118, 49, 126, 106, 71, 25},
{90, 118, 50, 126, 106, 71, 25},
{90, 119, 47, 125, 106, 73, 23},
{90, 119, 47, 126, 106, 71, 25},
{91, 118, 50, 126, 106, 71, 25},
{91, 119, 47, 125, 106, 73, 23}, and
{91, 119, 47, 126, 106, 71, 25}.

3. The method of claim 1, wherein the 16-point transform corresponding to the 8-bit transform core is a discrete cosine transform comprising the matrix:

{a, a, a, a, a, a, a, a, a, a, a, a, a, a, a, a}
{h, i, j, k, l, m, n, o, −o, −n, −m, −l, −k, −j, −h}
{d, e, f, g, −g, −f, −e, −d, −d, −e, −f, −g, g, f, e, d}
{i, l, o, −m, −j, −h, −k, −n, n, k, h, j, m, −o, −l, −i}
{b, c, −c, −b, −b, −c, c, b, b, c, −c, −b, −b, −c, c, b}
{j, o, −k, −n, l, h, m, −m, −h, −1, n, i, k, −o, −j}
{e, −g, −d, −f, f, d, g, −e, −e, g, d, f, −f, −d, −g, e}
{k, −m, o, h, n, −j, −l, l, j, −n, −h, −o, m, −k}
{a, −a, −a, a, a, −a, −a, a, a, −a, −a, a, a, −a, −a, a}
{l, −j, −n, h, −o, m, k, −k, −m, o, −h, n, j, −l}
{f, −d, g, e, −e, −g, d, −f, −f, d, −g, −e, e, g, −d, f}
{m, −h, l, n, k, o, −j, j, −o, −k, −n, −l, h, −m}
{c, −b, b, −c, −c, b, −b, c, c, −b, b, −c, −c, b, −b, c}
{n, −k, h, −j, m, o, −l, l, −o, −m, j, −h, k, −n}
{g, −f, e, −d, d, −e, f, −g, −g, f, −e, d, −d, e, −f, g}
{o, −n, m, −l, k, −j, −h, h, j, −k, l, −m, n, −o}, wherein {a, b, c, d, e, f, g, h, i, j, k, l, m, n, o} corresponds to one or more from among:

{91, 119, 47, 126, 106, 71, 25, 127, 122, 113, 99, 81, 60, 37, 13},
{91, 119, 47, 126, 106, 71, 25, 125, 123, 112, 100, 83, 62, 35, 15},
{91, 119, 47, 126, 106, 71, 25, 126, 121, 115, 100, 81, 58, 38, 15},
{91, 119, 47, 126, 106, 71, 25, 126, 121, 115, 100, 82, 58, 38, 15},
{91, 119, 47, 126, 106, 71, 25, 126, 122, 114, 100, 82, 59, 38, 15}, and
{91, 118, 49, 126, 106, 71, 25, 127, 122, 113, 99, 81, 60, 37, 13}.

4. The method of claim 1, wherein the 32-point transform corresponding to the 8-bit transform core is a discrete cosine transform comprising the matrix:

{a, a, a, a, a, a, a, a, a, a, a, a, a, a, a, a, a, a, a, a, a, a, a, a, a, a, a, a, a, a, a}
{p, q, r, s, t, u, v, w, x, y, z, A, B, C, D, E, −E, −D, −C, −B, −A, −z, −y, −x, −w, −v, −u, −t, −s, −r, −q, −p}
{h, j, k, l, m, n, o, −o, −n, −m, −1, −k, −j, −h, −h, −j, −k, −l, −m, −n, −o, o, n, m, l, k, j, h}
{q, t, w, z, C, −E, −B, −y, −v, −s, −p, −r, −u, −x, −A, −D, D, A, x, u, r, p, s, v, y, B, E, −C, −z, −w, −t, −q}
{d, e, f, g, −g, −f, −e, −d, −d, −e, −f, −g, g, f, e, d, d, e, f, g, −g, −f, −e, −d, −d, −e, −f, −g, g, f, e, d}
{r, w, B, −D, −y, −t, −p, −u, −z, −E, A, v, q, s, x, C, −C, −x, −s, −q, −v, −A, E, z, u, p, t, y, D, −B, −w, −r}
{i, l, o, −m, −j, −h, −k, −n, n, k, h, j, m, −o, −1, −i, −i, −1, −o, m, j, h, k, n, −n, −k, −h, −j, −m, o, l, i}
{s, z, −D, −w, −p, −v, −C, A, t, r, y, −E, −x, −q, −u, −B, B, u, q, x, E, −y, −r, −t, −A, C, v, p, w, D, −z, −s}
{b, c, −c, −b, −b, −c, c, b, b, c, −c, −b, −b, −c, c, b, b, c, −c, −b, −b, −c, c, b, b, c, −c, −b, −b, −c, c, b}
{t, C, −y, −p, −x, D, u, s, B, −z, −q, −w, E, v, r, A, −A, −r, −v, −E, w, q, z, −B, −s, −u, −D, x, p, y, −C, −t}
{j, o, −k, −i, −n, l, h, m, −m, −h, −1, n, i, k, −o, −j, −j, −o, k, i, n, −l, −h, −m, m, h, l, −n, −i, −k, o, j}
{u, −E, −t, −v, D, s, w, −C, −r, −x, B, q, y, −A, −p, −z, z, p, A, −y, −q, −B, x, r, C, −w, −s, −D, v, t, E, −u}
{e, −g, −d, −f, f, d, g, −e, −e, g, d, f, −f, −d, −g, e, e, −g, −d, −f, f, d, g, −e, −e, g, d, f, −f, −d, −g, e}
{v, −B, −p, −C, u, w, −A, −q, −D, t, x, −z, −r, −E, s, y, −y, −s, E, r, z, −x, −t, D, q, A, −w, −u, C, p, B, −v}
{k, −m, −i, o, h, n, −j, −l, l, j, −n, −h, −o, i, m, −k, −k, m, i, −o, −h, −n, j, l, −l, −j, n, h, o, −i, −m, k}
{w, −y, −u, A, s, −C, −q, E, p, D, −r, −B, t, z, −v, −x, x, v, −z, −t, B, r, −D, −p, −E, q, C, −s, −A, u, y, −w}
{a, −a, −a, a, a, −a, −a, a, a, −a, −a, a, a, −a, −a, a, a, −a, −a, a, a, −a, −a, a, a, −a, −a, a, a, −a, −a, a}
{x, −v, −z, t, B, −r, −D, p, −E, −q, C, s, −A, −u, y, w, −w, −y, u, A, −s, −C, q, E, −p, D, r, −B, −t, z, v, −x}
{l, −j, −n, h, −o, −i, m, k, −k, −m, i, o, −h, n, j, −l, −l, j, n, −h, o, i, −m, −k, k, m, −i, −o, h, −n, −j, l}
{y, −s, −E, r, −z, −x, t, D, −q, A, w, −u, −C, p, −B, −v, v, B, −p, C, u, −w, −A, q, −D, −t, x, z, −r, E, s, −y}
{f, −d, g, e, −e, −g, d, −f, −f, d, −g, −e, e, g, −d, f, f, −d, g, e, −e, −g, d, −f, −f, d, −g, −e, e, g, −d, f}
{z, −p, A, y, −q, B, x, −r, C, w, −s, D, v, −t, E, u, −u, −E, t, −v, −D, s, −w, −C, r, −x, −B, q, −y, −A, p, −z}
{m, −h, l, n, −i, k, o, −j, j, −o, −k, i, −n, −l, h, −m, −m, h, −l, −n, i, −k, −o, j, −j, o, k, −i, n, l, −h, m}
{A, −r, v, −E, −w, q, −z, −B, s, −u, D, x, −p, y, C, −t, t, −C, −y, p, −x, −D, u, −s, B, z, −q, w, E, −v, r, −A}
{c, −b, b, −c, −c, b, −b, c, c, −b, b, −c, −c, b, −b, c, c, −b, b, −c, −c, b, −b, c, c, −b, b, −c, −c, b, −b, c}

{B, −u, q, −x, E, y, −r, t, −A, −C, v, −p, w, −D, −z, s, −s, z, D, −w, p, −v, C, A, −t, r, −y, −E, x, −q, u, −B}
{n, −k, h, −j, m, o, −l, i, −i, l, −o, −m, j, −h, k, −n, −n, k, −h, j, −m, −o, l, −i, i, −l, o, m, −j, h, −k, n}
{C, −x, s, −q, v, −A, −E, z, −u, p, −t, y, −D, −B, w, −r, r, −w, B, D, −y, t, −p, u, −z, E, A, −v, q, −s, x, −C}
{g, −f, e, −d, d, −e, f, −g, −g, f, −e, d, −d, e, −f, g, g, −f, e, −d, d, −e, f, −g, −g, f, −e, d, −d, e, −f, g}
{D, −A, x, −u, r, −p, s, −v, y, −B, E, C, −z, w, −t, q, −q, t, −w, z, −C, −E, B, −y, v, −s, p, −r, u, −x, A, −D}
{o, −n, m, −l, k, −j, i, −h, h, −i, j, −k, l, −m, n, −o, −o, n, −m, l, −k, j, −i, h, −h, i, −j, k, −l, m, −n, o}
{E, −D, C, −B, A, −z, y, −x, w, −v, u, −t, s, −r, q, −p, p, −q, r, −s, t, −u, v, −w, x, −y, z, −A, B, −C, D, −E}, wherein {a, b, c, d, e, f, g, h, i, j, k, l, m, n, o, p, q, r, s, t, u, v, w, x, y, z, A, B, C, D, E} corresponds to one or more from among:

{91,119,47,126,106,71,25,126,122,114,100,82,59,38,15, 128,127,124,121,116,110,103,95,86,76,66,55,43,31, 19,6},
{91,119,47,126,106,71,25,126,122,114,100,82,59,38,15, 126,125,125,120,116,111,101,96,86,76,66,55,43,31, 19,6},
{91,119,47,126,106,71,25,126,122,114,100,82,59,38,15, 126,125,125,121,116,111,102,96,86,76,66,55,43,31, 19,6},
{91,119,47,126,106,71,25,126,122,114,100,82,59,38,15, 126,125,126,120,116,111,101,97,86,76,66,55,43,31, 19,6},
{91,119,47,126,106,71,25,126,122,114,100,82,59,38,15, 126,125,126,121,116,111,101,96,86,76,66,55,43,31, 19,6},
{91,119,47,126,106,71,25,126,122,114,100,82,59,38,15, 126,126,125,121,116,110,102,96,86,76,66,55,43,31, 19,6},
{91,119,47,126,106,71,25,126,122,114,100,82,59,38,15, 128,127,124,121,114,110,102,96,87,77,65,53,43,31, 19,6},
{91,118,49,126,106,71,25,127,122,113,99,81,60,37,13, 128,127,124,121,116,110,103,95, 86,76,66,55,43,31, 19,6}}.

5. The method of claim 1, wherein the 64-point transform corresponding to the 8-bit transform core is a discrete cosine transform comprising the matrix:

{aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa}
{bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck, −ck, −cj, −ci, −ch, −cg, −cf, −ce, −cd, −cc, −cb, −ca, −bz, −by, −bx, −bw, −by, −bu, −bt, −bs, −br, −bq, −bp, −bo, −bn, −bm, −bl, −bk, −bj, −bi, −bh, −bg, −bf}
{ap, aq, ar, as, at, au, av, aw, ax, ay, az, ba, bb, bc, bd, be, −be, −bd, −bc, −bb, −ba, −az, −ay, −ax, −aw, −av, −au, −at, −as, −ar, −aq, −ap, −ap, −aq, −ar, −as, −at, −au, −av, −aw, −ax, −ay, −az, −ba, −bb, −bc, −bd, −be, be, bd, bc, bb, ba, az, ay, ax, aw, av, au, at, as, ar, aq, ap}
{bg, bj, bm, bp, bs, by, by, cb, ce, ch, ck, −ci, −cf, −cc, −bz, −bw, −bt, −bq, −bn, −bk, −bh, −bf, −bi, −bl, −bo, −br, −bu, −bx, −ca, −cd, −cg, −cj, cj, cg, cd, ca, bx, bu, br, bo, bl, bi, bf, bh, bk, bn, bq, bt, bw, bz, cc, cf, ci, −ck, −ch, −ce, −cb, −by, −by, −bs, −bp, −bm, −bj, −bg}
{ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah, ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah}
{bh, bm, br, bw, cb, cg, −ck, −cf, −ca, −by, −bq, −bl, −bg, −bi, −bn, −bs, −bx, −cc, −ch, cj, ce, bz, bu, bp, bk, bf, bj, bo, bt, by, cd, ci, −ci, −cd, −by, −bt, −bo, −bj, −bf, −bk, −bp, −bu, −bz, −ce, −cj, ch, cc, bx, bs, bn, bi, bg, bl, bq, by, ca, cf, ck, −cg, −cb, −bw, −br, −bm, −bh}
{aq, at, aw, az, bc, −be, −bb, −ay, −av, −as, −ap, −ar, −au, −ax, −ba, −bd, bd, ba, ax, au, ar, ap, as, av, ay, bb, be, −bc, −az, −aw, −at, −aq, −aq, −at, −aw, −az, −bc, be, bb, ay, av, as, ap, ar, au, ax, ba, bd, −bd, −ba, −ax, −au, −ar, −ap, −as, −av, −ay, −bb, −be, bc, az, aw, at, aq}
{bi, bp, bw, cd, ck, −ce, −bx, −bq, −bj, −bh, −bo, −by, −cc, −cj, cf, by, br, bk, bg, bn, bu, cb, ci, −cg, −bz, −bs, −bl, −bf, −bm, −bt, −ca, −ch, ch, ca, bt, bm, bf, bl, bs, bz, cg, −ci, −cb, −bu, −bn, −bg, −bk, −br, −by, −cf, cj, cc, by, bo, bh, bj, bq, bx, ce, −ck, −cd, −bw, −bp, −bi}
{ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad}
{bj, bs, cb, ck, −cc, −bt, −bk, −bi, −br, −ca, −cj, cd, bu, bl, bh, bq, bz, ci, −ce, −by, −bm, −bg, −bp, −by, −ch, cf, bw, bn, bf, bo, bx, cg, −cg, −bx, −bo, −bf, −bn, −bw, −cf, ch, by, bp, bg, bm, by, ce, −ci, −bz, −bq, −bh, −bl, −bu, −cd, cj, ca, br, bi, bk, bt, cc, −ck, −cb, −bs, −bj}
{ar, aw, bb, −bd, −ay, −at, −ap, −au, −az, −be, ba, av, aq, as, ax, bc, −bc, −ax, −as, −aq, −av, −ba, be, az, au, ap, at, ay, bd, −bb, −aw, −ar, −ar, −aw, −bb, bd, ay, at, ap, au, az, be, −ba, −av, −aq, −as, −ax, −bc, bc, ax, as, aq, av, ba, −be, −az, −au, −ap, −at, −ay, −bd, bb, aw, ar}
{bk, by, cg, −ce, −bt, −bi, −bm, −bx, −ci, cc, br, bg, bo, bz, ck, −ca, −bp, −bf, −bq, −cb, cj, by, bn, bh, bs, cd, −ch, −bw, −bl, −bj, −bu, −cf, cf, bu, bj, bl, bw, ch, −cd, −bs, −bh, −bn, −by, −cj, cb, bq, bf, bp, ca, −ck, −bz, −bo, −bg, −br, −cc, ci, bx, bm, bi, bt, ce, −cg, −by, −bk}
{ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai, ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai}
{bl, by, −ck, −bx, −bk, −bm, −bz, cj, bw, bj, bn, ca, −ci, −by, −bi, −bo, −cb, ch, bu, bh, bp, cc, −cg, −bt, −bg, −bq, −cd, cf, bs, bf, br, ce, −ce, −br, −bf, −bs, −cf, cd, bq, bg, bt, cg, −cc, −bp, −bh, −bu, −ch, cb, bo, bi, by, ci, −ca, −bn, −bj, −bw, −cj, bz, bm, bk, bx, ck, −by, −bl}
{as, az, −bd, −aw, −ap, −av, −bc, ba, at, ar, ay, −be, −ax, −aq, −au, −bb, bb, au, aq, ax, be, −ay, −ar, −at, −ba, bc, av, ap, aw, bd, −az, −as, −as, −az, bd, aw, ap, av, bc, −ba, −at, −ar, −ay, be, ax, aq, au, bb, −bb, −au, −aq, −ax, −be, ay, ar, at, ba, −bc, −av, −ap, −aw, −bd, az, as}
{bm, cb, −cf, −bq, −bi, −bx, cj, bu, bf, bt, ci, −by, −bj, −bp, −ce, cc, bn, bl, ca, −cg, −br, −bh, −bw, ck, by, bg, bs, ch, −bz, −bk, −bo, −cd, cd, bo, bk, bz, −ch, −bs, −bg, −by, −ck, bw, bh, br, cg, −ca, −bl, −bn, −cc, ce, bp, bj, by, −ci, −bt, −bf, −bu, −cj, bx, bi, bq, cf, −cb, −bm}
ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab}
{bn, ce, −ca, −bj, −br, −ci, bw, bf, by, −cj, −bs, −bi, −bz, cf, bo, bm, cd, −cb, −bk, −bq, −ch, bx, bg, bu, −ck, −bt, −bh, −by, cg, bp, bl, cc, −cc, −bl, −bp, −cg, by, bh, bt, ck, −bu, −bg, −bx, ch, bq, bk, cb, −cd, −bm, −bo, −cf, bz, bi, bs, cj, −by, −bf, −bw, ci, br, bj, ca, −ce, −bn}

{at, bc, −ay, −ap, −ax, bd, au, as, bb, −az, −aq, −aw, be, av, ar, ba, −ba, −ar, −av, −be, aw, aq, az, −bb, −as, −au, −bd, ax, ap, ay, −bc, −at, −at, −bc, ay, ap, ax, −bd, −au, −as, −bb, az, aq, aw, −be, −av, −ar, −ba, ba, ar, av, be, −aw, −aq, −az, bb, as, au, bd, −ax, −ap, −ay, bc, at}

{bo, ch, −by, −bh, −ca, cc, bj, bt, −cj, −bq, −bm, −cf, bx, bf, by, −ce, −bl, −br, −ck, bs, bk, cd, −bz, −bg, −bw, cg, bn, bp, ci, −bu, −bi, −cb, cb, bi, bu, −ci, −bp, −bn, −cg, bw, bg, bz, −cd, −bk, −bs, ck, br, bl, ce, −by, −bf, −bx, cf, bm, bq, cj, −bt, −bj, −cc, ca, bh, by, −ch, −bo}

{aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj, aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj}

{bp, ck, −bq, −bo, −cj, br, bn, ci, −bs, −bm, −ch, bt, bl, cg, −bu, −bk, −cf, by, bj, ce, −bw, −bi, −cd, bx, bh, cc, −by, −bg, −cb, bz, bf, ca, −ca, −bf, −bz, cb, bg, by, −cc, −bh, −bx, cd, bi, bw, −ce, −bj, −by, cf, bk, bu, −cg, −bl, −bt, ch, bm, bs, −ci, −bn, −br, cj, bo, bq, −ck, −bp}

{au, −be, −at, −av, bd, as, aw, −bc, −ar, −ax, bb, aq, ay, −ba, −ap, −az, az, ap, ba, −ay, −aq, −bb, ax, ar, bc, −aw, −as, −bd, av, at, be, −au, −au, be, at, av, −bd, −as, −aw, bc, ar, ax, −bb, −aq, −ay, ba, ap, az, −az, −ap, −ba, ay, aq, bb, −ax, −ar, −bc, aw, as, bd, −av, −at, −be, au}

{bq, −ci, −bl, −by, cd, bg, ca, −by, −bi, −cf, bt, bn, ck, −bo, −bs, cg, bj, bx, −cb, −bf, −cc, bw, bk, ch, −br, −bp, cj, bm, bu, −ce, −bh, −bz, bz, bh, ce, −bu, −bm, −cj, bp, br, −ch, −bk, −bw, cc, bf, cb, −bx, −bj, −cg, bs, bo, −ck, −bn, −bt, cf, bi, by, −ca, −bg, −cd, by, bl, ci, −bq}

{ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae}

{br, −cf, −bg, −cc, bu, bo, −ci, −bj, −bz, bx, bl, ck, −bm, −bw, ca, bi, ch, −bp, −bt, cd, bf, ce, −bs, −bq, cg, bh, cb, −by, −bn, cj, bk, by, −by, −bk, −cj, bn, by, −cb, −bh, −cg, bq, bs, −ce, −bf, −cd, bt, bp, −ch, −bi, −ca, bw, bm, −ck, −bl, −bx, bz, bj, ci, −bo, −bu, cc, bg, cf, −br}

{av, −bb, −ap, −bc, au, aw, −ba, −aq, −bd, at, ax, −az, −ar, −be, as, ay, −ay, −as, be, ar, az, −ax, −at, bd, aq, ba, −aw, −au, bc, ap, bb, −av, −av, bb, ap, bc, −au, −aw, ba, aq, bd, −at, −ax, az, ar, be, −as, −ay, ay, as, −be, −ar, −az, ax, at, −bd, −aq, −ba, aw, au, −bc, −ap, −bb, av}

{bs, −cc, −bi, −cj, bl, bz, −by, −bp, cf, bf, cg, −bo, −bw, by, bm, −ci, −bh, −cd, br, bt, −cb, −bj, −ck, bk, ca, −bu, −bq, ce, bg, ch, −bn, −bx, bx, bn, −ch, −bg, −ce, bq, bu, −ca, −bk, ck, bj, cb, −bt, −br, cd, bh, ci, −bm, −by, bw, bo, −cg, −bf, −cf, bp, by, −bz, −bl, cj, bi, cc, −bs}

{ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak, ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak}

{bt, −bz, −bn, cf, bh, ck, −bi, −ce, bo, by, −bu, −bs, ca, bm, −cg, −bg, −cj, bj, cd, −bp, −bx, by, br, −cb, −bl, ch, bf, ci, −bk, −cc, bq, bw, −bw, −bq, cc, bk, −ci, −bf, −ch, bl, cb, −br, −by, bx, bp, −cd, −bj, cj, bg, cg, −bm, −ca, bs, bu, −by, −bo, ce, bi, −ck, −bh, −cf, bn, bz, −bt}

{aw, −ay, −au, ba, as, −bc, −aq, be, ap, bd, −ar, −bb, at, az, −av, −ax, ax, av, −az, −at, bb, ar, −bd, −ap, −be, aq, bc, −as, −ba, au, ay, −aw, −aw, ay, au, −ba, −as, bc, aq, −be, −ap, −bd, ar, bb, −at, −az, av, ax, −ax, −av, az, at, −bb, −ar, bd, ap, be, −aq, −bc, as, ba, −au, −ay, aw}

{bu, −bw, −bs, by, bq, −ca, −bo, cc, bm, −ce, −bk, cg, bi, −ci, −bg, ck, bf, cj, −bh, −ch, bj, cf, −bl, −cd, bn, cb, −bp, −bz, br, bx, −bt, −by, by, bt, −bx, −br, bz, bp, −cb, −bn, cd, bl, −cf, −bj, ch, bh, −cj, −bf, −ck, bg, ci, −bi, −cg, bk, ce, −bm, −cc, bo, ca, −bq, −by, bs, bw, −bu}

{aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa}

{by, −bt, −bx, br, bz, −bp, −cb, bn, cd, −bl, −cf, bj, ch, −bh, −cj, bf, −ck, −bg, ci, bi, −cg, −bk, ce, bm, −cc, −bo, ca, bq, −by, −bs, bw, bu, −bu, −bw, bs, by, −bq, −ca, bo, cc, −bm, −ce, bk, cg, −bi, −ci, bg, ck, −bf, cj, bh, −ch, −bj, cf, bl, −cd, −bn, cb, bp, −bz, −br, bx, bt, −by}

{ax, −av, −az, at, bb, −ar, −bd, ap, −be, −aq, bc, as, −ba, −au, ay, aw, −aw, −ay, au, ba, −as, −bc, aq, be, −ap, bd, ar, −bb, −at, az, av, −ax, −ax, av, az, −at, −bb, ar, bd, −ap, be, aq, −bc, −as, ba, au, −ay, −aw, aw, ay, −au, −ba, as, bc, −aq, −be, ap, −bd, −ar, bb, at, −az, −av, ax}

{bw, −bq, −cc, bk, ci, −bf, ch, bl, −cb, −br, by, bx, −bp, −cd, bj, cj, −bg, cg, bm, −ca, −bs, bu, by, −bo, −ce, bi, ck, −bh, cf, bn, −bz, −bt, bt, bz, −bn, −cf, bh, −ck, −bi, ce, bo, −by, −bu, bs, ca, −bm, −cg, bg, −cj, −bj, cd, bp, −bx, −by, br, cb, −bl, −ch, bf, −ci, −bk, cc, bq, −bw}

{al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al, al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al}

{bx, −bn, −ch, bg, −ce, −bq, bu, ca, −bk, −ck, bj, −cb, −bt, br, cd, −bh, ci, bm, −by, −bw, bo, cg, −bf, cf, bp, −by, −bz, bl, cj, −bi, cc, bs, −bs, −cc, bi, −cj, −bl, bz, by, −bp, −cf, bf, −cg, −bo, bw, by, −bm, −ci, bh, −cd, −br, bt, cb, −bj, ck, bk, −ca, −bu, bq, ce, −bg, ch, bn, −bx}

{ay, −as, −be, ar, −az, −ax, at, bd, −aq, ba, aw, −au, −bc, ap, −bb, −av, av, bb, −ap, bc, au, −aw, −ba, aq, −bd, −at, ax, az, −ar, be, as, −ay, −ay, as, be, −ar, az, ax, −at, −bd, aq, −ba, −aw, au, bc, −ap, bb, av, −av, −bb, ap, −bc, −au, aw, ba, −aq, bd, at, −ax, −az, ar, −be, −as, ay}

{by, −bk, cj, bn, −by, −cb, bh, −cg, −bq, bs, ce, −bf, cd, bt, −bp, −ch, bi, −ca, −bw, bm, ck, −bl, bx, bz, −bj, ci, bo, −bu, −cc, bg, −cf, −br, br, cf, −bg, cc, bu, −bo, −ci, bj, −bz, −bx, bl, −ck, −bm, bw, ca, −bi, ch, bp, −bt, −cd, bf, −ce, −bs, bq, cg, −bh, cb, by, −bn, −cj, bk, −by}

{af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af}

{bz, −bh, ce, bu, −bm, cj, bp, −br, −ch, bk, −bw, −cc, bf, −cb, −bx, bj, −cg, −bs, bo, ck, −bn, bt, cf, −bi, by, ca, −bg, cd, by, −bl, ci, bq, −bq, −ci, bl, −by, −cd, bg, −ca, −by, bi, −cf, −bt, bn, −ck, −bo, bs, cg, −bj, bx, cb, −bf, cc, bw, −bk, ch, br, −bp, −cj, bm, −bu, −ce, bh, −bz}

{az, −ap, ba, ay, −aq, bb, ax, −ar, bc, aw, −as, bd, av, −at, be, au, −au, −be, at, −av, −bd, as, −aw, −bc, ar, −ax, −bb, aq, −ay, −ba, ap, −az, −az, ap, −ba, −ay, aq, −bb, −ax, ar, −bc, −aw, as, −bd, −av, at, −be, −au, au, be, −at, av, bd, −as, aw, bc, −ar, ax, bb, −aq, ay, ba, −ap, az}

{ca, −bf, bz, cb, −bg, by, cc, −bh, bx, cd, −bi, bw, ce, −bj, by, cf, −bk, bu, cg, −bl, bt, ch, −bm, bs, ci, −bn, br, cj, −bo, bq, ck, −bp, bp, −ck, −bq, bo, −cj, −br, bn, −ci, −bs, bm, −ch, −bt, bl, −cg, −bu, bk, −cf, −by, bj, −ce, −bw, bi, −cd, −bx, bh, −cc, −by, bg, −cb, −bz, bf, −ca}

{am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am, am, −ah, al, an, −ai, ak, ao, −aj, aj,

−ao, −ak, ai, −an, −al, ah, −am, −am, ah, −al, −an, ai, −ak, −ao, aj, −aj, ao, ak, −ai, an, al, −ah, am}

{cb, −bi, bu, ci, −bp, bn, −cg, −bw, bg, −bz, −cd, bk, −bs, −ck, br, −bl, ce, by, −bf, bx, cf, −bm, bq, −cj, −bt, bj, −cc, −ca, bh, −by, −ch, bo, −bo, ch, by, −bh, ca, cc, −bj, bt, cj, −bq, bm, −cf, −bx, bf, −by, −ce, bl, −br, ck, bs, −bk, cd, bz, −bg, bw, cg, −bn, bp, −ci, −bu, bi, −cb}

{ba, −ar, av, −be, −aw, aq, −az, −bb, as, −au, bd, ax, −ap, ay, bc, −at, at, −bc, −ay, ap, −ax, −bd, au, −as, bb, az, −aq, aw, be, −av, ar, −ba, −ba, ar, −av, be, aw, −aq, az, bb, −as, au, −bd, −ax, ap, −ay, −bc, at, −at, bc, ay, −ap, ax, bd, −au, as, −bb, −az, aq, −aw, −be, av, −ar, ba}

{cc, −bl, bp, −cg, −by, bh, −bt, ck, bu, −bg, bx, ch, −bq, bk, −cb, −cd, bm, −bo, cf, bz, −bi, bs, −cj, −by, bf, −bw, −ci, br, −bj, ca, ce, −bn, bn, −ce, −ca, bj, −br, ci, bw, −bf, by, cj, −bs, bi, −bz, −cf, bo, −bm, cd, cb, −bk, bq, −ch, −bx, bg, −bu, −ck, bt, −bh, by, cg, −bp, bl, −cc}

{ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac}

{cd, −bo, bk, −bz, −ch, bs, −bg, by, −ck, −bw, bh, −br, cg, ca, −bl, bn, −cc, −ce, bp, −bj, by, ci, −bt, bf, −bu, cj, bx, −bi, bq, −cf, −cb, bm, −bm, cb, cf, −bq, bi, −bx, −cj, bu, −bf, bt, −ci, −by, bj, −bp, ce, cc, −bn, bl, −ca, −cg, br, −bh, bw, ck, −by, bg, −bs, ch, bz, −bk, bo, −cd}

{bb, −au, aq, −ax, be, ay, −ar, at, −ba, −bc, av, −ap, aw, −bd, −az, as, −as, az, bd, −aw, ap, −av, bc, ba, −at, ar, −ay, −be, ax, −aq, au, −bb, −bb, au, −aq, ax, −be, −ay, ar, −at, ba, bc, −av, ap, −aw, bd, az, −as, as, −az, −bd, aw, −ap, av, −bc, −ba, at, −ar, ay, be, −ax, aq, −au, bb}

{ce, −br, bf, −bs, cf, cd, −bq, bg, −bt, cg, cc, −bp, bh, −bu, ch, cb, −bo, bi, −by, ci, ca, −bn, bj, −bw, cj, bz, −bm, bk, −bx, ck, by, −bl, bl, −by, −ck, bx, −bk, bm, −bz, −cj, bw, −bj, bn, −ca, −ci, by, −bi, bo, −cb, −ch, bu, −bh, bp, −cc, −cg, bt, −bg, bq, −cd, −cf, bs, −bf, br, −ce}

{an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an, an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an}

{cf, −bu, bj, −bl, bw, −ch, −cd, bs, −bh, bn, −by, cj, cb, −bq, bf, −bp, ca, ck, −bz, bo, −bg, br, −cc, −ci, bx, −bm, bi, −bt, ce, cg, −by, bk, −bk, by, −cg, −ce, bt, −bi, bm, −bx, ci, cc, −br, bg, −bo, bz, −ck, −ca, bp, −bf, bq, −cb, −cj, by, −bn, bh, −bs, cd, ch, −bw, bl, −bj, bu, −cf}

{bc, −ax, as, −aq, av, −ba, −be, az, −au, ap, −at, ay, −bd, −bb, aw, −ar, ar, −aw, bb, bd, −ay, at, −ap, au, −az, be, ba, −av, aq, −as, ax, −bc, −bc, ax, −as, aq, −av, ba, be, −az, au, −ap, at, −ay, bd, bb, −aw, ar, −ar, aw, −bb, −bd, ay, −at, ap, −au, az, −be, −ba, av, −aq, as, −ax, be}

{cg, −bx, bo, −bf, bn, −bw, cf, ch, −by, bp, −bg, bm, −by, ce, ci, −bz, bq, −bh, bl, −bu, cd, cj, −ca, br, −bi, bk, −bt, cc, ck, −cb, bs, −bj, bj, −bs, cb, −ck, −cc, bt, −bk, bi, −br, ca, −cj, −cd, bu, −bl, bh, −bq, bz, −ci, −ce, by, −bm, bg, −bp, by, −ch, −cf, bw, −bn, bf, −bo, bx, −cg}

{ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag}

{ch, −ca, bt, −bm, bf, −bl, bs, −bz, cg, ci, −cb, bu, −bn, bg, −bk, br, −by, cf, cj, −cc, by, −bo, bh, −bj, bq, −bx, ce, ck, −cd, bw, −bp, bi, −bi, bp, −bw, cd, −ck, −ce, bx, −bq, bj, −bh, bo, −by, cc, −cj, −cf, by, −br, bk, −bg, bn, −bu, cb, −ci, −cg, bz, −bs, bl, −bf, bm, −bt, ca, −ch}

{bd, −ba, ax, −au, ar, −ap, as, −av, ay, −bb, be, bc, −az, aw, −at, aq, −aq, at, −aw, az, −bc, −be, bb, −ay, av, −as, ap, −ar, au, −ax, ba, −bd, −bd, ba, −ax, au, −ar, ap, −as, av, −ay, bb, −be, −bc, az, −aw, at, −aq, aq, −at, aw, −az, bc, be, −bb, ay, −av, as, −ap, ar, −au, ax, −ba, bd}

{ci, −cd, by, −bt, bo, −bj, bf, −bk, bp, −bu, bz, −ce, cj, ch, −cc, bx, −bs, bn, −bi, bg, −bl, bq, −by, ca, −cf, ck, cg, −cb, bw, −br, bm, −bh, bh, −bm, br, −bw, cb, −cg, −ck, cf, −ca, by, −bq, bl, −bg, bi, −bn, bs, −bx, cc, −ch, −cj, ce, −bz, bu, −bp, bk, −bf, bj, −bo, bt, −by, cd, −ci}

{ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao, ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao}

{cj, −cg, cd, −ca, bx, −bu, br, −bo, bl, −bi, bf, −bh, bk, −bn, bq, −bt, bw, −bz, cc, −cf, ci, ck, −ch, ce, −cb, by, −by, bs, −bp, bm, −bj, bg, −bg, bj, −bm, bp, −bs, by, −by, cb, −ce, ch, −ck, −ci, cf, −cc, bz, −bw, bt, −bq, bn, −bk, bh, −bf, bi, −bl, bo, −br, bu, −bx, ca, −cd, cg, −cj}

{be, −bd, bc, −bb, ba, −az, ay, −ax, aw, −av, au, −at, as, −ar, aq, −ap, ap, −aq, ar, −as, at, −au, av, −aw, ax, −ay, az, −ba, bb, −bc, bd, −be, −be, bd, −bc, bb, −ba, az, −ay, ax, −aw, av, −au, at, −as, ar, −aq, ap, −ap, aq, −ar, as, −at, au, −av, aw, −ax, ay, −az, ba, −bb, bc, −bd, be}

{ck, −cj, ci, −ch, cg, −cf, ce, −cd, cc, −cb, ca, −bz, by, −bx, bw, −by, bu, −bt, bs, −br, bq, −bp, bo, −bn, bm, −bl, bk, −bj, bi, −bh, bg, −bf, bf, −bg, bh, −bi, bj, −bk, bl, −bm, bn, −bo, bp, −bq, br, −bs, bt, −bu, by, −bw, bx, −by, bz, −ca, cb, −cc, cd, −ce, cf, −cg, ch, −ci, cj, −ck} wherein {aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck} corresponds to one or more from among:

{91,119,47,126,106,71,25,126,122,114,100,82,59,38,15, 128,127,124,121,116,110,103,95,86,76,66,55,43,31, 19,6,128,128,127,126,125,123,122,119,117,114,111, 108,105,101,97,93,88,84,79,74,68,63,58,52,46,40,34, 28,22,16,9,3},

{91,119,47,126,106,71,25,126,122,114,100,82,59,38,15, 128,127,124,121,116,110,103,95,86,76,66,55,43,31, 19,6,127,127,127,126,125,123,122,120,117,114,111, 108,105,101,97,93,88,84,79,74,68,63,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,116,115,111, 109,105,101,96,93,88,84,79,74,68,63,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,117,114,111, 108,105,101,96,93,88,84,79,74,68,63,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,117,115,111, 108,105,101,95,93,88,84,79,74,68,63,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,117,115,111, 108,105,101,96,93,88,84,79,74,68,63,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,117,114,111, 108,105,101,96,93,88,83,79,73,68,64,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,117,114,111, 108,105,101,96,93,88,83,79,74,68,64,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,117,114,111, 108,105,101,97,93,88,83,78,73,68,64,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,117,114,111, 108,105,101,97,93,88,83,79,73,68,64,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,117,114,111, 108,105,101,97,93,88,83,79,74,68,64,58,52,46,40,34, 28,22,16,9,3},

{91,119,47,126,106,71,25,126,122,114,100,82,59,38,15, 128,127,124,121,116,110,103,95,86,76,66,55,43,31, 19,6,128,128,127,126,125,123,122,119,117,114,111, 108,105,101,97,93,89,83,79,74,68,64,58,52,46,40,34, 28,22,16,9,3}, and {91,118,49,126,106,71,25,127,122,113,99,81,60,37,13, 128,127,124,121,116,110,103,95, 86,76,66,55,43,31, 19,6,128,128,127,126,125,123,122,119,117,114,111, 108,105,101,97,93,88,84, 79,74,68,63,58,52,46,40,34, 28,22,16,9,3}.

6. The method of claim 1, wherein the 32-point transform corresponding to the 8-bit transform core is a line graph transform comprising the matrix:

{a, b, c, d, e, f, g, h, j, k, l, m, n, o, p, q, r, s, t, u, v, w, x, y, z, A, B, C, D, E, F,}

{c, f, i, l, o, r, u, x, A, D, F, C, z, w, t, q, n, k, h, e, b, −a, −d, −g, −j, −m, −p, −s, −v, −y, −B, −E,}

{e, j, o, t, y, D, D, y, t, o, j, e, 0, −e, −j, −o, −t, −y, −D, −D, −y, −t, −o, −j, −e, 0, e, j, o, t, y, D,}

{g, n, u, B, D, w, p, i, b, −e, −l, −s, −z, −F, −y, −r, −k, −d, c, j, q, x, E, A, t, m, f, −a, −h, −o, −v, −C,}

{i, r, A, C, t, k, b, −g, −p, −y, −E, −v, −m, −d, e, n, w, F, x, o, f, −c, −l, −u, −D, −z, −q, −h, a, j, s, B,}

{k, v, F, u, j, −a, −l, −w, −E, −t, −i, b, m, x, D, s, h, −c, −n, −y, −C, −r, −g, d, o, z, B, q, f, −e, −p, −A,}

{m, z, z, m, 0, −m, −z, −z, −m, 0, m, z, z, m, 0, −m, −z, −z, −m, 0, m, z, z, m, 0, −m, −z, −z, −m, 0, m, z,}

{o, D, t, e, −j, −y, −y, −j, e, t, D, o, 0, −o, −D, −t, −e, j, y, y, j, −e, −t, −D, −o, 0, o, D, t, e, −j, −y,}

{q, E, n, −c, −t, −B, −k, f, w, y, h, −i, −z, −v, −e, l, C, s, b, −o, −F, −p, a, r, D, m, −d, −u, −A, −j, g, x,}

{s, A, h, −k, −D, −p, c, v, x, e, −n, −F, −m, f, y, u, b, −q, −C, −j, i, B, r, −a, −t, −z, −g, l, E, o, −d, −w,}

{u, w, b, −s, −y, −d, q, A, f, −o, −C, −h, m, E, j, −k, −F, −l, i, D, n, −g, −B, −p, e, z, r, −c, −x, −t, a, v,}

{w, s, −d, −A, −o, h, E, k, −l, −D, −g, p, z, c, −t, −v, a, x, r, −e, −B, −n, i, F, j, −m, −C, −f, q, y, b, −u,}

{y, o, −j, −D, −e, t, t, −e, −D, −j, o, y, 0, −y, −o, j, D, e, −t, −t, e, D, j, −o, −y, 0, y, o, −j, −D, −e, t,}

{A, k, −p, −v, e, F, f, −u, −q, j, B, a, −z, −l, o, w, −d, −E, −g, t, r, −i, −C, −b, y, m, −n, −x, c, D, h, −s,}

{C, g, −v, −n, o, u, −h, −B, a, D, f, −w, −m, p, t, −i, −A, b, E, e, −x, −l, q, s, −j, −z, c, F, d, −y, −k, r,}

{E, c, −B, −f, y, i, −v, −l, s, o, −p, −r, m, u, −j, −x, g, A, −d, −D, a, F, b, −C, −e, z, h, −w, −k, t, n, −q,}

{F, −a, −E, b, D, −c, −C, d, B, −e, −A, f, z, −g, −y, h, x, −i, −w, j, v, −k, −u, l, t, −m, −s, n, r, −o, −q, p,}

{D, −e, −y, j, t, −o, −o, t, j, −y, −e, D, 0, −D, e, y, −j, −t, o, o, −t, −j, y, e, −D, 0, D, −e, −y, j, t, −o,}

{B, −i, −s, r, j, −A, −a, C, −h, −t, q, k, −z, −b, D, −g, −u, p, l, −y, −c, E, −f, −v, o, m, −x, −d, F, −e, −w, n,}

{z, −m, −m, z, 0, −z, m, m, −z, 0, z, −m, −m, z, 0, −z, m, m, −z, 0, z, −m, −m, z, 0, −z, m, m, −z, 0, z, −m,}

{x, −q, −g, E, −j, −n, A, −c, −u, t, d, −B, m, k, −D, f, r, −w, −a, y, −p, −h, F, −i, −o, z, −b, −v, s, e, −C, l,}

{v, −u, −a, w, −t, −b, x, −s, −c, y, −r, −d, z, −q, −e, A, −p, −f, B, −o, −g, C, −n, −h, D, −m, −i, E, −l, −j, F, −k,}

{t, −y, e, o, −D, j, j, −D, o, e, −y, t, 0, −t, y, −e, −o, D, −j, −j, D, −o, −e, y, −t, 0, t, −y, e, o, −D, j,}

{r, −C, k, g, −y, v, −d, −n, F, −o, −c, u, −z, h, j, −B, s, −a, −q, D, −l, −f, x, −w, e, m, −E, p, b, −t, A, −i,}

{p, −F, q, −a, −o, E, −r, b, n, −D, s, −c, −m, C, −t, d, l, −B, u, −e, −k, A, −v, f, j, −z, w, −g, −i, y, −x, h,}

{n, −B, w, −i, −e, s, −F, r, −d, −j, x, −A, m, a, −o, C, −v, h, f, −t, E, −q, c, k, −y, z, −1, −b, p, −D, u, −g,}

{l, −x, C, −q, e, g, −s, E, −v, j, b, −n, z, −A, o, −c, −i, u, −F, t, −h, −d, p, −B, y, −m, a, k, −w, D, −r, f,}

{j, −t, D, −y, o, −e, −e, o, −y, D, −t, j, 0, −j, t, −D, y, −o, e, e, −o, y, −D, t, −j, 0, j, −t, D, −y, o, −e,}

{h, −p, x, −F, y, −q, i, −a, −g, o, −w, E, −z, r, −j, b, f, −n, v, −D, A, −s, k, −c, −e, m, −u, C, −B, t, −l, d,}

{f, −l, r, −x, D, −C, w, −q, k, −e, −a, g, −m, s, −y, E, −B, v, −p, j, −d, −b, h, −n, t, −z, F, −A, u, −o, i, −c,}

{d, −h, l, −p, t, −x, B, −F, C, −y, u, −q, m, e, −a, −c, g, −k, o, −s, w, −A, E, −D, z, −v, r, −n, j, −f, b,}

{b, −d, f, −h, j, −l, n, −p, r, −t, v, −x, z, −B, D, −F, E, −C, A, −y, w, −u, s, −q, o, −m, k, g, −e, c, −a,} wherein {a, b, c, d, e, f, g, h, j, k, l, m, n, o, p, q, r, s, t, u, v, w, x, y, z, A, B, C, D, E, F} corresponds to one or more from among:

{6, 12, 18, 24, 30, 36, 42, 48, 54, 59, 64, 70, 75, 80, 84, 89, 93, 97, 101, 105, 108, 111, 114, 116, 119, 121, 123, 124, 125, 126, 127, 127},

{6, 12, 19, 24, 30, 36, 42, 48, 54, 59, 64, 70, 75, 80, 84, 89, 93, 97, 101, 105, 108, 111, 114, 116, 119, 121, 123, 124, 125, 126, 127, 127}, and {6, 12, 19, 24, 30, 36, 43, 48, 54, 59, 64, 70, 75, 80, 84, 89, 93, 97, 101, 105, 108, 111, 114, 116, 119, 121, 123, 124, 125, 126, 127, 127}.

7. The method of claim 1, wherein the 4-point transform corresponding to the 10-bit transform core is a discrete cosine transform comprising the matrix:

{a, a, a, a}

{b, c, −c, −b}

{a, −a, −a, a}

{c, −b, b, −c}, wherein {a, b, c} corresponds to {724,946,392}.

8. The method of claim 1, wherein the 8-point transform corresponding to the 10-bit transform core is a discrete cosine transform comprising the matrix:

{a, a, a, a, a, a, a, a}

{d, e, f, g, −g, −f, −e, −d}

{b, c, −c, −b, −b, −c, c, b}

{e, −g, −d, −f, f, d, g, −e}

{a, −a, −a, a, a, −a, −a, a}

{f, −d, g, e, −e, −g, d, −f}

{c, −b, b, −c, −c, b, −b, c}

{g, −f, e, −d, d, −e, f, −g} wherein {a, b, c, d, e, f, g} corresponds to one or more from among:

{724,946,392,1004,851,569,200},
{724,944,394,1003,852,571,198},
{724,945,392,1003,852,571,198},
{724,945,393,1003,852,571,198},
{724,945,394,1003,852,571,198}, and
{724,946,392,1003,852,571,198}.

9. The method of claim 1, wherein the 16-point transform corresponding to the 10-bit transform core is a discrete cosine transform comprising the matrix:

{a, a, a, a, a, a, a, a, a, a, a, a, a, a, a, a}
{h, i, j, k, l, m, n, o, −o, −n, −m, −l, −k, −j, −h}
{d, e, f, g, −g, −f, −e, −d, −d, −e, −f, −g, g, f, e, d}
{i, l, o, −m, −j, −h, −k, −n, n, k, h, j, m, −o, −l, −i}
{b, c, −c, −b, −b, −c, c, b, b, c, −c, −b, −b, −c, c, b}
{j, o, −k, −n, l, h, m, −m, −h, −l, n, i, k, −o, −j}
{e, −g, −d, −f, f, d, g, −e, −e, g, d, f, −f, −d, −g, e}
{k, −m, −i, o, h, n, −j, −l, l, j, −n, −h, −o, m, −k}
{a, −a, −a, a, a, −a, −a, a, a, −a, −a, a, a, −a, −a, a}
{l, −j, −n, h, −o, m, k, −k, −m, o, −h, n, j, −l}
{f, −d, g, e, −e, −g, d, −f, −f, d, −g, −e, e, g, −d, f}
{m, −h, l, n, k, o, −j, j, −o, −k, −n, −l, h, −m}
{c, −b, b, −c, −c, b, −b, c, c, −b, b, −c, −c, b, −b, c}
{n, −k, h, −j, m, o, −l, l, −o, −m, j, −h, k, −n}
{g, −f, e, −d, d, −e, f, −g, −g, f, −e, d, −d, e, −f, g}
{o, −n, m, −l, k, −j, −h, h, j, −k, l, −m, n, −o} wherein {a, b, c, d, e, f, g, h, i, j, k, 1, m, n, o} corresponds to one or more from among:

{724,946,392,1003,852,571,198,1019,980,903,792,650, 483,297,100},
{724,946,392,1003,852,571,198,1017,978,905,791,652, 481,296,101},
{724,946,392,1003,852,571,198,1017,979,903,791,652, 481,299,101},
{724,946,392,1003,852,571,198,1017,979,904,791,652, 481,298,101},
{724,946,392,1003,852,571,198,1017,979,904,791,652, 482,296,101},
{724,946,392,1003,852,571,198,1017,979,904,792,651, 481,298,102},
{724,946,392,1003,852,571,198,1017,979,904,792,652, 481,299,102},
{724,946,392,1003,852,571,198,1017,979,905,792,652, 481,297,102},
{724,946,392,1003,852,571,198,1017,979,905,792,652, 481,298,102},
{724,946,392,1003,852,571,198,1017,979,905,792,652, 482,296,102},
{724,946,392,1003,852,571,198,1017,980,903,792,652, 483,297,102},
{724,946,392,1003,852,571,198,1017,980,903,792,652, 484,295,102},
{724,946,392,1003,852,571,198,1017,981,901,792,652, 484,298,102},
{724,946,392,1003,852,571,198,1018,980,903,791,652, 483,297,100},
{724,946,392,1003,852,571,198,1018,980,903,791,652, 484,295,100},
{724,946,392,1003,852,571,198,1018,981,901,791,652, 484,298,100},
{724,946,392,1003,852,571,198,1019,980,903,790,652, 483,297,98},
{724,946,392,1003,852,571,198,1019,980,903,790,652, 484,295,98},
{724,946,392,1003,852,571,198,1019,980,903,792,649, 484,295,101},
{724,946,392,1003,852,571,198,1019,981,901,790,652, 484,298,98},
{724,946,392,1003,852,571,198,1020,980,903,791,649, 484,295,99},
{724,946,392,1003,852,571,198,1020,981,901,791,649, 484,298,99}}.

10. The method of claim 1, wherein the 32-point transform corresponding to the 10-bit transform core is a discrete cosine transform comprising the matrix:

{a, a, a, a, a, a, a, a, a, a, a, a, a, a, a, a, a, a, a, a, a, a, a, a, a, a, a, a, a, a, a, a}
{p, q, r, s, t, u, v, w, x, y, z, A, B, C, D, E, −E, −D, −C, −B, −A, −z, −y, −x, −w, −v, −u, −t, −s, −r, −q, −p}
{h, i, j, k, l, m, n, o, −o, −n, −m, −1, −k, −j, −i, −h, −h, −i, −j, −k, −l, −m, −n, −o, o, n, m, l, k, j, i, h}
{q, t, w, z, C, −E, −B, −y, −v, −s, −p, −r, −u, −x, −A, −D, D, A, x, u, r, p, s, v, y, B, E, −C, −z, −w, −t, −q}
{d, e, f, g, −g, −f, −e, −d, −d, −e, −f, −g, g, f, e, d, d, e, f, g, −g, −f, −e, −d, −d, −e, −f, −g, g, f, e, d}
{r, w, B, −D, −y, −t, −p, −u, −z, −E, A, v, q, s, x, C, −C, −x, −s, −q, −v, −A, E, z, u, p, t, y, D, −B, −w, −r}
{i, l, o, −m, −j, −h, −k, −n, n, k, h, j, m, −o, −l, −i, −i, −l, −o, m, j, h, k, n, −n, −k, −h, −j, −m, o, l, i}
{s, z, −D, −w, −p, −v, −C, A, t, r, y, −E, −x, −q, −u, −B, B, u, q, x, E, −y, −r, −t, −A, C, v, p, w, D, −z, −s}
{b, c, −c, −b, −b, −c, c, b, b, c, −c, −b, −b, −c, c, b, b, c, −c, −b, −b, −c, c, b, b, c, −c, −b, −b, −c, c, b}
{t, C, −y, −p, −x, D, u, s, B, −z, −q, −w, E, v, r, A, −A, −r, −v, −E, w, q, z, −B, −s, −u, −D, x, p, y, −C, −t}
{j, o, −k, −i, −n, l, h, m, −m, −h, −l, n, i, k, −o, −j, −j, −o, k, i, n, −l, −h, −m, m, h, l, −n, −i, −k, o, j}
{u, −E, −t, −v, D, s, w, −C, −r, −x, B, q, y, −A, −p, −z, z, p, A, −y, −q, −B, x, r, C, −w, −s, −D, v, t, E, −u}
{e, −g, −d, −f, f, d, g, −e, −e, g, d, f, −f, −d, −g, e, e, −g, −d, −f, f, d, g, −e, −e, g, d, f, −f, −d, −g, e}
{v, −B, −p, −C, u, w, −A, −q, −D, t, x, −z, −r, −E, s, y, −y, −s, E, r, z, −x, −t, D, q, A, −w, −u, C, p, B, −v}
{k, −m, −i, o, h, n, −j, −l, l, j, −n, −h, −o, i, m, −k, −k, m, i, −o, −h, −n, j, l, −l, −j, n, h, o, −i, −m, k}
{w, −y, −u, A, s, −C, −q, E, p, D, −r, −B, t, z, −v, −x, x, v, −z, −t, B, r, −D, −p, −E, q, C, −s, −A, u, y, −w}
{a, −a, −a, a, a, −a, −a, a, a, −a, −a, a, a, −a, −a, a, a, −a, −a, a, a, −a, −a, a, a, −a, −a, a, a, −a, −a, a}
{x, −v, −z, t, B, −r, −D, p, −E, −q, C, s, −A, −u, y, w, −w, −y, u, A, −s, −C, q, E, −p, D, r, −B, −t, z, v, −x}
{l, −j, −n, h, −o, −i, m, k, −k, −m, i, o, −h, n, j, −l, −l, j, n, −h, o, i, −m, −k, k, m, −i, −o, h, −n, −j, l}
{y, −s, −E, r, −z, −x, t, D, −q, A, w, −u, −C, p, −B, −v, v, B, −p, C, u, −w, −A, q, −D, −t, x, z, −r, E, s, −y}
{f, −d, g, e, −e, −g, d, −f, −f, d, −g, −e, e, g, −d, f, f, −d, g, e, −e, −g, d, −f, −f, d, −g, −e, e, g, −d, f}
{z, −p, A, y, −q, B, x, −r, C, w, −s, D, v, −t, E, u, −u, −E, t, −v, −D, s, −w, −C, r, −x, −B, q, −y, −A, p, −z}
{m, −h, l, n, −i, k, o, −j, j, −o, −k, i, −n, −l, h, −m, −m, h, −l, −n, i, −k, −o, j, −j, o, k, −i, n, l, −h, m}
{A, −r, v, −E, −w, q, −z, −B, s, −u, D, x, −p, y, C, −t, t, −C, −y, p, −x, −D, u, −s, B, z, −q, w, E, −v, r, −A}
{c, −b, b, −c, −c, b, −b, c, c, −b, b, −c, −c, b, −b, c, c, −b, b, −c, −c, b, −b, c, c, −b, b, −c, −c, b, −b, c}
{B, −u, q, −x, E, y, −r, t, −A, −C, v, −p, w, −D, −z, s, −s, z, D, −w, p, −v, C, A, −t, r, −y, −E, x, −q, u, −B}
{n, −k, h, −j, m, o, −l, i, −i, l, −o, −m, j, −h, k, −n, −n, k, −h, j, −m, −o, l, −i, i, −l, o, m, −j, h, −k, n}
{C, −x, s, −q, v, −A, −E, z, −u, p, −t, y, −D, −B, w, −r, r, −w, B, D, −y, t, −p, u, −z, E, A, −v, q, −s, x, −C}
{g, −f, e, −d, d, −e, f, −g, −g, f, −e, d, −d, e, −f, g, g, −f, e, −d, d, −e, f, −g, −g, f, −e, d, −d, e, −f, g}
{D, −A, x, −u, r, −p, s, −v, y, −B, E, C, −z, w, −t, q, −q, t, −w, z, −C, −E, B, −y, v, −s, p, −r, u, −x, A, −D}

{o, −n, m, −l, k, −j, i, −h, h, −i, j, −k, l, −m, n, −o, −o, n, −m, l, −k, j, −i, h, −h, i, −j, k, −l, m, −n, o}

{E, −D, C, −B, A, −z, y, −x, w, −v, u, −t, s, −r, q, −p, p, −q, r, −s, t, −u, v, −w, x, −y, z, −A, B, −C, D, −E} wherein {a, b, c, d, e, f, g, h, i, j, k, 1, m, n, o, p, q, r, s, t, u, v, w, x, y, z, A, B, C, D, E} corresponds to one or more from among:

{724,946,392,1003,852,571,198,1020,981,901,791,649, 484,298,99,1023,1013,993,964,926,878,822,759,688, 610,526,438,345,249,150,50},

{724,946,392,1003,852,571,198,1020,981,901,791,649, 484,298,99,1021,1011,995,965,925,880,821,760,688, 610,526,438,345,249,150,50},

{724,946,392,1003,852,571,198,1020,981,901,791,649, 484,298,99,1021,1012,994,964,926,879,821,760,688, 610,526,438,345,249,150,50},

{724,946,392,1003,852,571,198,1020,981,901,791,649, 484,298,99,1021,1012,994,965,925,879,822,760,688, 610,526,438,345,249,150,50},

{724,946,392,1003,852,571,198,1020,981,901,791,649, 484,298,99,1021,1012,995,964,926,880,821,761,688, 610,526,438,345,249,150,50},

{724,946,392,1003,852,571,198,1020,981,901,791,649, 484,298,99,1021,1012,995,965,926,880,820,760,688, 610,526,438,345,249,150,50},

{724,946,392,1003,852,571,198,1020,981,901,791,649, 484,298,99,1021,1012,995,965,926,880,821,760,688, 610,526,438,345,249,150,50},

{724,946,392,1003,852,571,198,1020,981,901,791,649, 484,298,99,1022,1012,995,964,926,880,820,759,688, 610,526,438,345,249,150,50},

{724,946,392,1003,852,571,198,1020,981,901,791,649, 484,298,99,1022,1012,995,964,926,880,821,760,688, 610,526,438,345,249,150,50},

{724,946,392,1003,852,571,198,1020,981,901,791,649, 484,298,99,1023,1012,995,963,926,880,821,759,688, 610,526,438,345,249,150,50}, and {724,946,392,1003,852,571,198,1020,981,901,791,649, 484,298,99,1023,1013,993,963,926,878,823,759,688, 610,527,438,345,249,150,50}.

11. The method of claim 1, wherein the 64-point transform corresponding to the 10-bit transform core is a discrete cosine transform comprising the matrix:

{aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa}

{bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck, −ck, −cj, −ci, −ch, −cg, −cf, −ce, −cd, −cc, −cb, −ca, −bz, −by, −bx, −bw, −by, −bu, −bt, −bs, −br, −bq, −bp, −bo, −bn, −bm, −bl, −bk, −bj, −bi, −bh, −bg, −bf}

{ap, aq, ar, as, at, au, av, aw, ax, ay, az, ba, bb, bc, bd, be, −be, −bd, −bc, −bb, −ba, −az, −ay, −ax, −aw, −av, −au, −at, −as, −ar, −aq, −ap, −ap, −aq, −ar, −as, −at, −au, −av, −aw, −ax, −ay, −az, −ba, −bb, −bc, −bd, −be, be, bd, bc, bb, ba, az, ay, ax, aw, av, au, at, as, ar, aq, ap}

{bg, bj, bm, bp, bs, by, by, cb, ce, ch, ck, −ci, −cf, −cc, −bz, −bw, −bt, −bq, −bn, −bk, −bh, −bf, −bi, −bl, −bo, −br, −bu, −bx, −ca, −cd, −cg, −cj, cj, cg, cd, ca, bx, bu, br, bo, bl, bi, bf, bh, bk, bn, bq, bt, bw, bz, cc, cf, ci, −ck, −ch, −ce, −cb, −by, −by, −bs, −bp, −bm, −bj, −bg}

{ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah, ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah}

{bh, bm, br, bw, cb, cg, −ck, −cf, −ca, −by, −bq, −bl, −bg, −bi, −bn, −bs, −bx, −cc, −ch, cj, ce, bz, bu, bp, bk, bf, bj, bo, bt, by, cd, ci, −ci, −cd, −by, −bt, −bo, −bj, −bf, −bk, −bp, −bu, −bz, −ce, −cj, ch, cc, bx, bs, bn, bi, bg, bl, bq, by, ca, cf, ck, −cg, −cb, −bw, −br, −bm, −bh}

{aq, at, aw, az, bc, −be, −bb, −ay, −av, −as, −ap, −ar, −au, −ax, −ba, −bd, bd, ba, ax, au, ar, ap, as, av, ay, bb, be, −bc, −az, −aw, −at, −aq, −aq, −at, −aw, −az, −bc, be, bb, ay, av, as, ap, ar, au, ax, ba, bd, −bd, −ba, −ax, −au, −ar, −ap, −as, −av, −ay, −bb, −be, bc, az, aw, at, aq}

{bi, bp, bw, cd, ck, −ce, −bx, −bq, −bj, −bh, −bo, −by, −cc, −cj, cf, by, br, bk, bg, bn, bu, cb, ci, −cg, −bz, −bs, −bl, −bf, −bm, −bt, −ca, −ch, ch, ca, bt, bm, bf, bl, bs, bz, cg, −ci, −cb, −bu, −bn, −bg, −bk, −br, −by, −cf, cj, cc, by, bo, bh, bj, bq, bx, ce, −ck, −cd, −bw, −bp, −bi}

{ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad}

{bj, bs, cb, ck, −cc, −bt, −bk, −bi, −br, −ca, −cj, cd, bu, bl, bh, bq, bz, ci, −ce, −by, −bm, −bg, −bp, −by, −ch, cf, bw, bn, bf, bo, bx, cg, −cg, −bx, −bo, −bf, −bn, −bw, −cf, ch, by, bp, bg, bm, by, ce, −ci, −bz, −bq, −bh, −bl, −bu, −cd, cj, ca, br, bi, bk, bt, cc, −ck, −cb, −bs, −bj}

{ar, aw, bb, −bd, −ay, −at, −ap, −au, −az, −be, ba, av, aq, as, ax, bc, −bc, −ax, −as, −aq, −av, −ba, be, az, au, ap, at, ay, bd, −bb, −aw, −ar, −ar, −aw, −bb, bd, ay, at, ap, au, az, be, −ba, −av, −aq, −as, −ax, −bc, bc, ax, as, aq, av, ba, −be, −az, −au, −ap, −at, −ay, −bd, bb, aw, ar}

{bk, by, cg, −ce, −bt, −bi, −bm, −bx, −ci, cc, br, bg, bo, bz, ck, −ca, −bp, −bf, −bq, −cb, cj, by, bn, bh, bs, cd, −ch, −bw, −bl, −bj, −bu, −cf, cf, bu, bj, bl, bw, ch, −cd, −bs, −bh, −bn, −by, −cj, cb, bq, bf, bp, ca, −ck, −bz, −bo, −bg, −br, −cc, ci, bx, bm, bi, bt, ce, −cg, −by, −bk}

{ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai, ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai}

{bl, by, −ck, −bx, −bk, −bm, −bz, cj, bw, bj, bn, ca, −ci, −by, −bi, −bo, −cb, ch, bu, bh, bp, cc, −cg, −bt, −bg, −bq, −cd, cf, bs, bf, br, ce, −ce, −br, −bf, −bs, −cf, cd, bq, bg, bt, cg, −cc, −bp, −bh, −bu, −ch, cb, bo, bi, by, ci, −ca, −bn, −bj, −bw, −cj, bz, bm, bk, bx, ck, −by, −bl}

{as, az, −bd, −aw, −ap, −av, −bc, ba, at, ar, ay, −be, −ax, −aq, −au, −bb, bb, au, aq, ax, be, −ay, −ar, −at, −ba, bc, av, ap, aw, bd, −az, −as, −as, −az, bd, aw, ap, av, bc, −ba, −at, −ar, −ay, be, ax, aq, au, bb, −bb, −au, −aq, −ax, −be, ay, ar, at, ba, −bc, −av, −ap, −aw, −bd, az, as}

{bm, cb, −cf, −bq, −bi, −bx, cj, bu, bf, bt, ci, −by, −bj, −bp, −ce, cc, bn, bl, ca, −cg, −br, −bh, −bw, ck, by, bg, bs, ch, −bz, −bk, −bo, −cd, cd, bo, bk, bz, −ch, −bs, −bg, −by, −ck, bw, bh, br, cg, −ca, −bl, −bn, −cc, ce, bp, bj, by, −ci, −bt, −bf, −bu, −cj, bx, bi, bq, cf, −cb, −bm}

{ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab}

{bn, ce, −ca, −bj, −br, −ci, bw, bf, by, −cj, −bs, −bi, −bz, cf, bo, bm, cd, −cb, −bk, −bq, −ch, bx, bg, bu, −ck, −bt, −bh, −by, cg, bp, bl, cc, −cc, −bl, −bp, −cg, by, bh, bt, ck, −bu, −bg, −bx, ch, bq, bk, cb, −cd, −bm, −bo, −cf, bz, bi, bs, cj, −by, −bf, −bw, ci, br, bj, ca, −ce, −bn}

{at, bc, −ay, −ap, −ax, bd, au, as, bb, −az, −aq, −aw, be, av, ar, ba, −ba, −ar, −av, −be, aw, aq, az, −bb, −as, −au,

−bd, ax, ap, ay, −bc, −at, −at, −bc, ay, ap, ax, −bd, −au, −as, −bb, az, aq, aw, −be, −av, −ar, −ba, ba, ar, av, be, −aw, −aq, −az, bb, as, au, bd, −ax, −ap, −ay, bc, at}

{bo, ch, −by, −bh, −ca, cc, bj, bt, −cj, −bq, −bm, −cf, bx, bf, by, −ce, −bl, −br, −ck, bs, bk, cd, −bz, −bg, −bw, cg, bn, bp, ci, −bu, −bi, −cb, cb, bi, bu, −ci, −bp, −bn, −cg, bw, bg, bz, −cd, −bk, −bs, ck, br, bl, ce, −by, −bf, −bx, cf, bm, bq, cj, −bt, −bj, −cc, ca, bh, by, −ch, −bo}

{aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj, aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj}

{bp, ck, −bq, −bo, −cj, br, bn, ci, −bs, −bm, −ch, bt, bl, cg, −bu, −bk, −cf, by, bj, ce, −bw, −bi, −cd, bx, bh, cc, −by, −bg, −cb, bz, bf, ca, −ca, −bf, −bz, cb, bg, by, −cc, −bh, −bx, cd, bi, bw, −ce, −bj, −by, cf, bk, bu, −cg, −bl, −bt, ch, bm, bs, −ci, −bn, −br, cj, bo, bq, −ck, −bp}

{au, −be, −at, −av, bd, as, aw, −bc, −ar, −ax, bb, aq, ay, −ba, −ap, −az, az, ap, ba, −ay, −aq, −bb, ax, ar, bc, −aw, −as, −bd, av, at, be, −au, −au, be, at, av, −bd, −as, −aw, bc, ar, ax, −bb, −aq, −ay, ba, ap, az, −az, −ap, −ba, ay, aq, bb, −ax, −ar, −bc, aw, as, bd, −av, −at, −be, au}

{bq, −ci, −bl, −by, cd, bg, ca, −by, −bi, −cf, bt, bn, ck, −bo, −bs, cg, bj, bx, −cb, −bf, −cc, bw, bk, ch, −br, −bp, cj, bm, bu, −ce, −bh, −bz, bz, bh, ce, −bu, −bm, −cj, bp, br, −ch, −bk, −bw, cc, bf, cb, −bx, −bj, −cg, bs, bo, −ck, −bn, −bt, cf, bi, by, −ca, −bg, −cd, by, bl, ci, −bq}

{ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae}

{br, −cf, −bg, −cc, bu, bo, −ci, −bj, −bz, bx, bl, ck, −bm, −bw, ca, bi, ch, −bp, −bt, cd, bf, ce, −bs, −bq, cg, bh, cb, −by, −bn, cj, bk, by, −by, −bk, −cj, bn, by, −cb, −bh, −cg, bq, bs, −ce, −bf, −cd, bt, bp, −ch, −bi, −ca, bw, bm, −ck, −bl, −bx, bz, bj, ci, −bo, −bu, cc, bg, cf, −br}

{av, −bb, −ap, −bc, au, aw, −ba, −aq, −bd, at, ax, −az, −ar, −be, as, ay, −ay, −as, be, ar, az, −ax, −at, bd, aq, ba, −aw, −au, bc, ap, bb, −av, −av, bb, ap, bc, −au, −aw, ba, aq, bd, −at, −ax, az, ar, be, −as, −ay, ay, as, −be, −ar, −az, ax, at, −bd, −aq, −ba, aw, au, −bc, −ap, −bb, av}

{bs, −cc, −bi, −cj, bl, bz, −by, −bp, cf, bf, cg, −bo, −bw, by, bm, −ci, −bh, −cd, br, bt, −cb, −bj, −ck, bk, ca, −bu, −bq, ce, bg, ch, −bn, −bx, bx, bn, −ch, −bg, −ce, bq, bu, −ca, −bk, ck, bj, cb, −bt, −br, cd, bh, ci, −bm, −by, bw, bo, −cg, −bf, −cf, bp, by, −bz, −bl, cj, bi, cc, −bs}

{ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak, ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak}

{bt, −bz, −bn, cf, bh, ck, −bi, −ce, bo, by, −bu, −bs, ca, bm, −cg, −bg, −cj, bj, cd, −bp, −bx, by, br, −cb, −bl, ch, bf, ci, −bk, −cc, bq, bw, −bw, −bq, cc, bk, −ci, −bf, −ch, bl, cb, −br, −by, bx, bp, −cd, −bj, cj, bg, cg, −bm, −ca, bs, bu, −by, −bo, ce, bi, −ck, −bh, −cf, bn, bz, −bt}

{aw, −ay, −au, ba, as, −bc, −aq, be, ap, bd, −ar, −bb, at, az, −av, −ax, ax, av, −az, −at, bb, ar, −bd, −ap, −be, aq, bc, −as, −ba, au, ay, −aw, −aw, ay, au, −ba, −as, bc, aq, −be, −ap, −bd, ar, bb, −at, −az, av, ax, −ax, −av, az, at, −bb, −ar, bd, ap, be, −aq, −bc, as, ba, −au, −ay, aw}

{bu, −bw, −bs, by, bq, −ca, −bo, cc, bm, −ce, −bk, cg, bi, −ci, −bg, ck, bf, cj, −bh, −ch, bj, cf, −bl, −cd, bn, cb, −bp, −bz, br, bx, −bt, −by, by, bt, −bx, −br, bz, bp, −cb, −bn, cd, bl, −cf, −bj, ch, bh, −cj, −bf, −ck, bg, ci, −bi, −cg, bk, ce, −bm, −cc, bo, ca, −bq, −by, bs, bw, −bu}

{aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa}

{by, −bt, −bx, br, bz, −bp, −cb, bn, cd, −bl, −cf, bj, ch, −bh, −cj, bf, −ck, −bg, ci, bi, −cg, −bk, ce, bm, −cc, −bo, ca, bq, −by, −bs, bw, bu, −bu, −bw, bs, by, −bq, −ca, bo, cc, −bm, −ce, bk, cg, −bi, −ci, bg, ck, −bf, cj, bh, −ch, −bj, cf, bl, −cd, −bn, cb, bp, −bz, −br, bx, bt, −by}

{ax, −av, −az, at, bb, −ar, −bd, ap, −be, −aq, bc, as, −ba, −au, ay, aw, −aw, −ay, au, ba, −as, −bc, aq, be, −ap, bd, ar, −bb, −at, az, av, −ax, −ax, av, az, −at, −bb, ar, bd, −ap, be, aq, −bc, −as, ba, au, −ay, −aw, aw, ay, −au, −ba, as, bc, −aq, −be, ap, −bd, −ar, bb, at, −az, −av, ax}

{bw, −bq, −cc, bk, ci, −bf, ch, bl, −cb, −br, by, bx, −bp, −cd, bj, cj, −bg, cg, bm, −ca, −bs, bu, by, −bo, −ce, bi, ck, −bh, cf, bn, −bz, −bt, bt, bz, −bn, −cf, bh, −ck, −bi, ce, bo, −by, −bu, bs, ca, −bm, −cg, bg, −cj, −bj, cd, bp, −bx, −by, br, cb, −bl, −ch, bf, −ci, −bk, cc, bq, −bw}

{al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al, al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al}

{bx, −bn, −ch, bg, −ce, −bq, bu, ca, −bk, −ck, bj, −cb, −bt, br, cd, −bh, ci, bm, −by, −bw, bo, cg, −bf, cf, bp, −by, −bz, bl, cj, −bi, cc, bs, −bs, −cc, bi, −cj, −bl, bz, by, −bp, −cf, bf, −cg, −bo, bw, by, −bm, −ci, bh, −cd, −br, bt, cb, −bj, ck, bk, −ca, −bu, bq, ce, −bg, ch, bn, −bx}

{ay, −as, −be, ar, −az, −ax, at, bd, −aq, ba, aw, −au, −bc, ap, −bb, −av, av, bb, −ap, bc, au, −aw, −ba, aq, −bd, −at, ax, az, −ar, be, as, −ay, −ay, as, be, −ar, az, ax, −at, −bd, aq, −ba, −aw, au, bc, −ap, bb, av, −av, −bb, ap, −bc, −au, aw, ba, −aq, bd, at, −ax, −az, ar, −be, −as, ay}

{by, −bk, cj, bn, −by, −cb, bh, −cg, −bq, bs, ce, −bf, cd, bt, −bp, −ch, bi, −ca, −bw, bm, ck, −bl, bx, bz, −bj, ci, bo, −bu, −cc, bg, −cf, −br, br, cf, −bg, cc, bu, −bo, −ci, bj, −bz, −bx, bl, −ck, −bm, bw, ca, −bi, ch, bp, −bt, −cd, bf, −ce, −bs, bq, cg, −bh, cb, by, −bn, −cj, bk, −by}

{af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af}

{bz, −bh, ce, bu, −bm, cj, bp, −br, −ch, bk, −bw, −cc, bf, −cb, −bx, bj, −cg, −bs, bo, ck, −bn, bt, cf, −bi, by, ca, −bg, cd, by, −bl, ci, bq, −bq, −ci, bl, −by, −cd, bg, −ca, −by, bi, −cf, −bt, bn, −ck, −bo, bs, cg, −bj, bx, cb, −bf, cc, bw, −bk, ch, br, −bp, −cj, bm, −bu, −ce, bh, −bz}

{az, −ap, ba, ay, −aq, bb, ax, −ar, bc, aw, −as, bd, av, −at, be, au, −au, −be, at, −av, −bd, as, −aw, −bc, ar, −ax, −bb, aq, −ay, −ba, ap, −az, −az, ap, −ba, −ay, aq, −bb, −ax, ar, −bc, −aw, as, −bd, −av, at, −be, −au, au, be, −at, av, bd, −as, aw, bc, −ar, ax, bb, −aq, ay, ba, −ap, az}

{ca, −bf, bz, cb, −bg, by, cc, −bh, bx, cd, −bi, bw, ce, −bj, by, cf, −bk, bu, cg, −bl, bt, ch, −bm, bs, ci, −bn, br, cj, −bo, bq, ck, −bp, bp, −ck, −bq, bo, −cj, −br, bn, −ci, −bs, bm, −ch, −bt, bl, −cg, −bu, bk, −cf, −by, bj, −ce, −bw, bi, −cd, −bx, bh, −cc, −by, bg, −cb, −bz, bf, −ca}

{am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am, am, −ah, al, an, −ai, ak, ao, −aj, aj,

−ao, −ak, ai, −an, −al, ah, −am, −am, ah, −al, −an, ai, −ak, −ao, aj, −aj, ao, ak, −ai, an, al, −ah, am}

{cb, −bi, bu, ci, −bp, bn, −cg, −bw, bg, −bz, −cd, bk, −bs, −ck, br, −bl, ce, by, −bf, bx, cf, −bm, bq, −cj, −bt, bj, −cc, −ca, bh, −by, −ch, bo, −bo, ch, by, −bh, ca, cc, −bj, bt, cj, −bq, bm, −cf, −bx, bf, −by, −ce, bl, −br, ck, bs, −bk, cd, bz, −bg, bw, cg, −bn, bp, −ci, −bu, bi, −cb}

{ba, −ar, av, −be, −aw, aq, −az, −bb, as, −au, bd, ax, −ap, ay, bc, −at, at, −bc, −ay, ap, −ax, −bd, au, −as, bb, az, −aq, aw, be, −av, ar, −ba, −ba, ar, −av, be, aw, −aq, az, bb, −as, au, −bd, −ax, ap, −ay, −bc, at, −at, bc, ay, −ap, ax, bd, −au, as, −bb, −az, aq, −aw, −be, av, −ar, ba}

{cc, −bl, bp, −cg, −by, bh, −bt, ck, bu, −bg, bx, ch, −bq, bk, −cb, −cd, bm, −bo, cf, bz, −bi, bs, −cj, −by, bf, −bw, −ci, br, −bj, ca, ce, −bn, bn, −ce, −ca, bj, −br, ci, bw, −bf, by, cj, −bs, bi, −bz, −cf, bo, −bm, cd, cb, −bk, bq, −ch, −bx, bg, −bu, −ck, bt, −bh, by, cg, −bp, bl, −cc}

{ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac}

{cd, −bo, bk, −bz, −ch, bs, −bg, by, −ck, −bw, bh, −br, cg, ca, −bl, bn, −cc, −ce, bp, −bj, by, ci, −bt, bf, −bu, cj, bx, −bi, bq, −cf, −cb, bm, −bm, cb, cf, −bq, bi, −bx, −cj, bu, −bf, bt, −ci, −by, bj, −bp, ce, cc, −bn, bl, −ca, −cg, br, −bh, bw, ck, −by, bg, −bs, ch, bz, −bk, bo, −cd}

{bb, −au, aq, −ax, be, ay, −ar, at, −ba, −bc, av, −ap, aw, −bd, −az, as, −as, az, bd, −aw, ap, −av, bc, ba, −at, ar, −ay, −be, ax, −aq, au, −bb, −bb, au, −aq, ax, −be, −ay, ar, −at, ba, bc, −av, ap, −aw, bd, az, −as, as, −az, −bd, aw, −ap, av, −bc, −ba, at, −ar, ay, be, −ax, aq, −au, bb}

{ce, −br, bf, −bs, cf, cd, −bq, bg, −bt, cg, cc, −bp, bh, −bu, ch, cb, −bo, bi, −by, ci, ca, −bn, bj, −bw, cj, bz, −bm, bk, −bx, ck, by, −bl, bl, −by, −ck, bx, −bk, bm, −bz, −cj, bw, −bj, bn, −ca, −ci, by, −bi, bo, −cb, −ch, bu, −bh, bp, −cc, −cg, bt, −bg, bq, −cd, −cf, bs, −bf, br, −ce}

{an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an, an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an}

{cf, −bu, bj, −bl, bw, −ch, −cd, bs, −bh, bn, −by, cj, cb, −bq, bf, −bp, ca, ck, −bz, bo, −bg, br, −cc, −ci, bx, −bm, bi, −bt, ce, cg, −by, bk, −bk, by, −cg, −ce, bt, −bi, bm, −bx, ci, cc, −br, bg, −bo, bz, −ck, −ca, bp, −bf, bq, −cb, −cj, by, −bn, bh, −bs, cd, ch, −bw, bl, −bj, bu, −cf}

{bc, −ax, as, −aq, av, −ba, −be, az, −au, ap, −at, ay, −bd, −bb, aw, −ar, ar, −aw, bb, bd, −ay, at, −ap, au, −az, be, ba, −av, aq, −as, ax, −bc, −bc, ax, −as, aq, −av, ba, be, −az, au, −ap, at, −ay, bd, bb, −aw, ar, −ar, aw, −bb, −bd, ay, −at, ap, −au, az, −be, −ba, av, −aq, as, −ax, bc}

{cg, −bx, bo, −bf, bn, −bw, cf, ch, −by, bp, −bg, bm, −by, ce, ci, −bz, bq, −bh, bl, −bu, cd, cj, −ca, br, −bi, bk, −bt, cc, ck, −cb, bs, −bj, bj, −bs, cb, −ck, −cc, bt, −bk, bi, −br, ca, −cj, −cd, bu, −bl, bh, −bq, bz, −ci, −ce, by, −bm, bg, −bp, by, −ch, −cf, bw, −bn, bf, −bo, bx, −cg}

{ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag}

{ch, −ca, bt, −bm, bf, −bl, bs, −bz, cg, ci, −cb, bu, −bn, bg, −bk, br, −by, cf, cj, −cc, by, −bo, bh, −bj, bq, −bx, ce, ck, −cd, bw, −bp, bi, −bi, bp, −bw, cd, −ck, −ce, bx, −bq, bj, −bh, bo, −by, cc, −cj, −cf, by, −br, bk, −bg, bn, −bu, cb, −ci, −cg, bz, −bs, bl, −bf, bm, −bt, ca, −ch}

{bd, −ba, ax, −au, ar, −ap, as, −av, ay, −bb, be, bc, −az, aw, −at, aq, −aq, at, −aw, az, −bc, −be, bb, −ay, av, −as, ap, −ar, au, −ax, ba, −bd, −bd, ba, −ax, au, −ar, ap, −as, av, −ay, bb, −be, −bc, az, −aw, at, −aq, aq, −at, aw, −az, bc, be, −bb, ay, −av, as, −ap, ar, −au, ax, −ba, bd}

{ci, −cd, by, −bt, bo, −bj, bf, −bk, bp, −bu, bz, −ce, cj, ch, −cc, bx, −bs, bn, −bi, bg, −bl, bq, −by, ca, −cf, ck, cg, −cb, bw, −br, bm, −bh, bh, −bm, br, −bw, cb, −cg, −ck, cf, −ca, by, −bq, bl, −bg, bi, −bn, bs, −bx, cc, −ch, −cj, ce, −bz, bu, −bp, bk, −bf, bj, −bo, bt, −by, cd, −ci}

{ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao, ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao}

{cj, −cg, cd, −ca, bx, −bu, br, −bo, bl, −bi, bf, −bh, bk, −bn, bq, −bt, bw, −bz, cc, −cf, ci, ck, −ch, ce, −cb, by, −by, bs, −bp, bm, −bj, bg, −bg, bj, −bm, bp, −bs, by, −by, cb, −ce, ch, −ck, −ci, cf, −cc, bz, −bw, bt, −bq, bn, −bk, bh, −bf, bi, −bl, bo, −br, bu, −bx, ca, −cd, cg, −cj}

{be, −bd, bc, −bb, ba, −az, ay, −ax, aw, −av, au, −at, as, −ar, aq, −ap, ap, −aq, ar, −as, at, −au, av, −aw, ax, −ay, az, −ba, bb, −bc, bd, −be, −be, bd, −bc, bb, −ba, az, −ay, ax, −aw, av, −au, at, −as, ar, −aq, ap, −ap, aq, −ar, as, −at, au, −av, aw, −ax, ay, −az, ba, −bb, bc, −bd, be}

{ck, −cj, ci, −ch, cg, −cf, ce, −cd, cc, −cb, ca, −bz, by, −bx, bw, −by, bu, −bt, bs, −br, bq, −bp, bo, −bn, bm, −bl, bk, −bj, bi, −bh, bg, −bf, bf, −bg, bh, −bi, bj, −bk, bl, −bm, bn, −bo, bp, −bq, br, −bs, bt, −bu, by, −bw, bx, −by, bz, −ca, cb, −cc, cd, −ce, cf, −cg, ch, −ci, cj, −ck} wherein {aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck} corresponds to one or more from among:

{724,946,392,1003,852,571,198,1020,981,901,791,649, 484,298,99,1023,1013,993,963, 926,878,823,759,688, 610,527,438,345,249,150,50,1024,1021,1016,1009, 999,987,972,955,936, 915,891,865,837,807,775,742, 706,669,630,590,548,505,460,415,369,321,273,224, 175,125,75,25},

{724,946,392,1003,852,571,198,1020,981,901,791,649, 484,298,99,1023,1013,993,963, 926,878,823,759,688, 610,527,438,345,249,150,50,1022,1021,1016,1008, 1000,987,972,956,936, 915,891,865,837,807,775,742, 706,669,630,590,548,505,460,415,369,321,273,224, 175,125,75, 25},

{724,946,392,1003,852,571,198,1020,981,901,791,649, 484,298,99,1023,1013,993,963, 926,878,823,759,688, 610,527,438,345,249,150,50,1022,1021,1017,1008, 1000,987,973,956,936, 915,891,865,837,807,775,742, 706,669,630,590,548,505,460,415,369,321,273,224, 175,125,75, 25},

{724,946,392,1003,852,571,198,1020,981,901,791,649, 484,298,99,1023,1013,993,963, 926,878,823,759,688, 610,527,438,345,249,150,50,1023,1020,1017,1008, 1000,987,973,955,936, 915,891,865,837,807,775,742, 706,669,630,590,548,505,460,415,369,321,273,224, 175,125,75, 25},

{724,946,392,1003,852,571,198,1020,981,901,791,649, 484,298,99,1023,1013,993,963, 926,878,823,759,688, 610,527,438,345,249,150,50,1023,1020,1017,1008, 1000,987,973,956,936, 915,891,865,837,807,775,742, 706,669,630,590,548,505,460,415,369,321,273,224, 175,125,75, 25},

{724,946,392,1003,852,571,198,1020,981,901,791,649, 484,298,99,1023,1013,993,963, 926,878,823,759,688, 610,527,438,345,249,150,50,1023,1021,1016,1008, 999,987,972,956,936, 915,891,865,837,807,775,742, 706,669,630,590,548,505,460,415,369,321,273,224, 175,125,75, 25},

{724,946,392,1003,852,571,198,1020,981,901,791,649, 484,298,99,1023,1013,993,963, 926,878,823,759,688, 610,527,438,345,249,150,50,1023,1021,1016,1008, 1000,987,972,956,936, 915,891,865,837,807,775,742, 706,669,630,590,548,505,460,415,369,321,273,224, 175,125,75, 25},

{724,946,392,1003,852,571,198,1020,981,901,791,649, 484,298,99,1023,1013,993,963, 926,878,823,759,688, 610,527,438,345,249,150,50,1023,1021,1017,1008, 999,987,973,956,936, 915,891,865,837,807,775,742, 706,669,630,590,548,505,460,415,369,321,273,224, 175,125,75, 25},

{724,946,392,1003,852,571,198,1020,981,901,791,649, 484,298,99,1023,1013,993,963, 926,878,823,759,688, 610,527,438,345,249,150,50,1023,1021,1017,1008, 1000,986,973,956,936, 915,891,865,837,807,775,742, 706,669,630,590,548,505,460,415,369,321,273,224, 175,125,75, 25},

{724,946,392,1003,852,571,198,1020,981,901,791,649, 484,298,99,1023,1013,993,963, 926,878,823,759,688, 610,527,438,345,249,150,50,1023,1021,1017,1008, 1000,987,973,955,936, 915,891,865,837,807,775,742, 706,669,630,590,548,505,460,415,369,321,273,224, 175,125,75, 25}, and {724,946,392,1003,852,571,198,1020,981,901,791,649, 484,298,99,1023,1013,993,963, 926,878,823,759,688, 610,527,438,345,249,150,50,1024,1021,1016,1009, 999,987,972,955,936, 915,891,865,837,807,775,741, 706,669,630,589,548,504,460,415,369,321,273,224, 175,125,75, 25}.

12. The method of claim 1, wherein the 32-point transform corresponding to the 10-bit transform core is a line graph transform comprising the matrix:

{a, b, c, d, e, f, g, h, j, k, l, m, n, o, p, q, r, s, t, u, v, w, x, y, z, A, B, C, D, E, F,}

{c, f, i, l, o, r, u, x, A, D, F, C, z, w, t, q, n, k, h, e, b, −a, −d, −g, −j, −m, −p, −s, −v, −y, −B, −E,}

{e, j, o, t, y, D, D, y, t, o, j, e, 0, −e, −j, −o, −t, −y, −D, −D, −y, −t, −o, −j, −e, 0, e, j, o, t, y, D,}

{g, n, u, B, D, w, p, i, b, −e, −l, −s, −z, −F, −y, −r, −k, −d, c, j, q, x, E, A, t, m, f, −a, −h, −o, −v, −C,}

{i, r, A, C, t, k, b, −g, −p, −y, −E, −v, −m, −d, e, n, w, F, x, o, f, −c, −l, −u, −D, −z, −q, −h, a, j, s, B,}

{k, v, F, u, j, −a, −l, −w, −E, −t, b, m, x, D, s, h, −c, −n, −y, −C, −r, −g, d, o, z, B, q, f, −e, −p, −A,}

{m, z, z, m, 0, −m, −z, −z, −m, 0, m, z, z, m, 0, −m, −z, −z, −m, 0, m, z, z, m, 0, −m, −z, −z, −m, 0, m, z,}

{o, D, t, e, −j, −y, −y, −j, e, t, D, o, 0, −o, −D, −t, −e, j, y, y, j, −e, −t, −D, −o, 0, o, D, t, e, −j, −y,}

{q, E, n, −c, −t, −B, −k, f, w, y, h, −i, −z, −v, −e, l, C, s, b, −o, −F, −p, a, r, D, m, −d, −u, −A, −j, g, x,}

{s, A, h, −k, −D, −p, c, v, x, e, −n, −F, −m, f, y, u, b, −q, −C, −j, i, B, r, −a, −t, −z, −g, l, E, o, −d, −w,}

{u, w, b, −s, −y, −d, q, A, f, −o, −C, −h, m, E, j, −k, −F, −l, i, D, n, −g, −B, −p, e, z, r, −c, −x, −t, a, v,}

{w, s, −d, −A, −o, h, E, k, −l, −D, −g, p, z, c, −t, −v, a, x, r, −e, −B, −n, i, F, j, −m, −C, −f, q, y, b, −u,}

{y, o, −j, −D, −e, t, t, −e, −D, −j, o, y, 0, −y, −o, j, D, e, −t, −t, e, D, j, −o, −y, 0, y, o, −j, −D, −e, t,}

{A, k, −p, −v, e, F, f, −u, −q, j, B, a, −z, −l, o, w, −d, −E, −g, t, r, −i, −C, −b, y, m, −n, −x, c, D, h, −s,}

{C, g, −v, −n, o, u, −h, −B, a, D, f, −w, −m, p, t, −i, −A, b, E, e, −x, −l, q, s, −j, −z, c, F, d, −y, −k, r,}

{E, c, −B, −f, y, i, −v, −l, s, o, −p, −r, m, u, −j, −x, g, A, −d, −D, a, F, b, −C, −e, z, h, −w, −k, t, n, −q,}

{F, −a, −E, b, D, −c, −C, d, B, −e, −A, f, z, −g, −y, h, x, −i, −w, j, v, −k, −u, l, t, −m, −s, n, r, −o, −q, p,}

{D, −e, −y, j, t, −o, −o, t, j, −y, −e, D, 0, −D, e, y, −j, −t, o, o, −t, −j, y, e, −D, 0, D, −e, −y, j, t, −o,}

{B, −i, −s, r, j, −A, −a, C, −h, −t, q, k, −z, −b, D, −g, −u, p, l, −y, −c, E, −f, −v, o, m, −x, −d, F, −e, −w, n,}

{z, −m, −m, z, 0, −z, m, m, −z, 0, z, −m, −m, z, 0, −z, m, m, −z, 0, z, −m, −m, z, 0, −z, m, m, −z, 0, z, −m,}

{x, −q, −g, E, −j, −n, A, −c, −u, t, d, −B, m, k, −D, f, r, −w, −a, y, −p, −h, F, −i, −o, z, −b, −v, s, e, −C, l}

{v, −u, −a, w, −t, −b, x, −s, −c, y, −r, −d, z, −q, −e, A, −p, −f, B, −o, −g, C, −n, −h, D, −m, −i, E, −l, −j, F, −k,}

{t, −y, e, o, −D, j, j, −D, o, e, −y, t, 0, −t, y, −e, −o, D, −j, −j, D, −o, −e, y, −t, 0, t, −y, e, o, −D, j,}

{r, −C, k, g, −y, v, −d, −n, F, −o, −c, u, −z, h, j, −B, s, −a, −q, D, −l, −f, x, −w, e, m, −E, p, b, −t, A, −i,}

{p, −F, q, −a, −o, E, −r, b, n, −D, s, −c, −m, C, −t, d, l, −B, u, −e, −k, A, −v, f, j, −z, w, −g, −i, y, −x, h,}

{n, −B, w, −i, −e, s, −F, r, −d, −j, x, −A, m, a, −o, C, −v, h, f, −t, E, −q, c, k, −y, z, −l, −b, p, −D, u, −g,}

{l, −x, C, −q, e, g, −s, E, −v, j, b, −n, z, −A, o, −c, −i, u, −F, t, −h, −d, p, −B, y, −m, a, k, −w, D, −r, f,}

{j, −t, D, −y, o, −e, −e, o, −y, D, −t, j, 0, −j, t, −D, y, −o, e, e, −o, y, −D, t, −j, 0, j, −t, D, −y, o, −e,}

{h, −p, x, −F, y, −q, i, −a, −g, o, −w, E, −z, r, −j, b, f, −n, v, −D, A, −s, k, −c, −e, m, −u, C, −B, t, −l, d,}

{f, −l, r, −x, D, −C, w, −q, k, −e, −a, g, −m, s, −y, E, −B, v, −p, j, −d, −b, h, −n, t, −z, F, −A, u, −o, i, −c,}

{d, −h, l, −p, t, −x, B, −F, C, −y, u, −q, m, e, −a, −c, g, −k, o, −s, w, −A, E, −D, z, −v, r, −n, j, −f, b,}

{b, −d, f, −h, j, −l, n, −p, r, −t, v, −x, z, −B, D, −F, E, −C, A, −y, w, −u, s, −q, o, −m, k, g, −e, c, −a,} wherein {a, b, c, d, e, f, g, h, j, k, l, m, n, o, p, q, r, s, t, u, v, w, x, y, z, A, B, C, D, E, F} corresponds to one or more from among:

{49,98,147,195,243,291,337,383,428,472,515,557,597, 636,674,710,744,777,807,836,863,888,911,932,950, 966,980,992,1002,1009,1013,1016},

{48,98,147,195,243,291,337,383,428,472,515,557,597, 636,674,710,744,777,807,836,863,888,911,932,950, 966,980,992,1002,1009,1013,1016},

{49,98,147,196,243,291,338,383,428,472,515,557,597, 636,674,710,744,777,807,836,863,888,911,932,950, 966,980,992,1002,1009,1013,1016},

{49,98,147,195,243,291,337,383,428,472,515,556,598, 637,674,709,744,777,807,836,863,888,911,932,950, 966,980,992,1002,1009,1013,1016},

{49,98,147,195,243,291,337,383,428,472,515,557,597, 636,674,709,744,777,807,836,863,888,911,932,950, 966,980,992,1002,1009,1013,1016},

{49,98,147,195,243,291,337,383,428,472,515,557,598, 636,674,709,744,777,807,836,863,888,911,932,950, 966,980,992,1002,1009,1013,1016}, and {49,98,147,195,243,291,337,383,428,472,515,557,597, 636,674,710,744,777,807,836,863,888,911,932,950, 967,981,992,1002,1008,1014,1016}.

13. A computer system for coding video data, the computer system comprising:

one or more computer-readable non-transitory storage media configured to store computer program code; and one or more computer processors configured to access said computer program code and operate as instructed by said computer program code, said computer program code including:

receiving code configured to cause the one or more computer processors to receive video data;

identifying code configured to cause the one or more computer processors to identify one or more transform cores associated with the video data, wherein the one or more transform cores comprise one or more of a line graph transform (LGT) and a discrete cosine transform (DCT); and decoding code configured to cause the one or more computer processors to decode the video data based on the identified transform core, wherein the transform cores correspond to one or more from among an 8-bit transform core and a 10-bit transform core, wherein the one or more transform cores correspond to one or more from among a 2-point transform, a 4-point transform, an 8-point transform, a 16-point transform, a 32-point transform, and a 64-point transform, wherein the one or more transform cores correspond to one or more from among a 2-point transform, a 4-point transform, an 8-point transform, a 16-point transform, a 32-point transform, and a 64-point transform, wherein the 4-point transform corresponding to the 8-bit transform core is a discrete cosine transform comprising the matrix:

{a, a, a, a}
{b, c, −c, −b}
{a, −a, −a, a}
{c, −b, b, −c}, and wherein {a, b, c} corresponds to one or more from among: {91, 118, 49}, {90, 118, 50}, {90, 119, 47}, {91, 118, 50}, and {91, 119, 47}.

14. A non-transitory computer readable medium having stored thereon a computer program for coding video data, the computer program configured to cause one or more computer processors to:

receive video data;

identify one or more transform cores corresponding to a transform associated with the video data, wherein the one or more transform cores comprise one or more of a line graph transform (LGT) and a discrete cosine transform (DCT); and decode the video data based on the identified transform core, wherein the transform cores correspond to one or more from among an 8-bit transform core and a 10-bit transform core, wherein the one or more transform cores correspond to one or more from among a 2-point transform, a 4-point transform, an 8-point transform, a 16-point transform, a 32-point transform, and a 64-point transform, wherein the one or more transform cores correspond to one or more from among a 2-point transform, a 4-point transform, an 8-point transform, a 16-point transform, a 32-point transform, and a 64-point transform, wherein the 4-point transform corresponding to the 8-bit transform core is a discrete cosine transform comprising the matrix:

{a, a, a, a}
{b, c, −c, −b}
{a, −a, −a, a}
{c, −b, b, −c}, and wherein {a, b, c} corresponds to one or more from among: {91, 118, 49}, {90, 118, 50}, {90, 119, 47}, {91, 118, 50}, and {91, 119, 47}.

* * * * *